(12) United States Patent  (10) Patent No.: US 10,870,390 B2
Tucker et al.  (45) Date of Patent: Dec. 22, 2020

(54) ENHANCEMENT OF VEHICLE HAZARD SYSTEMS

(71) Applicant: ESS-HELP, Inc., Houston, TX (US)

(72) Inventors: David M. Tucker, Katy, TX (US); Mike Incorvaia, Hendersonville, TN (US); Stephen T. Powers, Houston, TX (US); Austin Reece Tucker, Katy, TX (US); Daniel Anthony Tucker, Santee, CA (US)

(73) Assignee: ESS-Help, Inc., Houston, TX (US)

( * ) Notice: Subject to any disclaimer, the term of this patent is extended or adjusted under 35 U.S.C. 154(b) by 0 days.

(21) Appl. No.: 16/710,659

(22) Filed: Dec. 11, 2019

(65) Prior Publication Data

US 2020/0189446 A1  Jun. 18, 2020

Related U.S. Application Data

(60) Provisional application No. 62/778,151, filed on Dec. 11, 2018.

(51) Int. Cl.
  *B60R 25/10*  (2013.01)
  *B60Q 1/46*   (2006.01)
  (Continued)

(52) U.S. Cl.
  CPC .............. *B60Q 1/46* (2013.01); *B60Q 1/0094* (2013.01); *B60Q 1/346* (2013.01); *F21S 41/60* (2018.01);
  (Continued)

(58) Field of Classification Search
  CPC ........................... B60R 25/1004; B60Q 1/346
  (Continued)

(56) References Cited

U.S. PATENT DOCUMENTS 3,553,644 A   1/1971  Elmer
4,176,340 A  11/1979  Steinmeier
(Continued)

FOREIGN PATENT DOCUMENTS

CN    203273673 U   11/2013
DE    10218652 A1   11/2003
(Continued)

OTHER PUBLICATIONS

Publisher: European Search Report dated Oct. 2, 2019 prepared for EPO Appl. No. EP19181421.
(Continued)

*Primary Examiner* — Tai T Nguyen
(74) *Attorney, Agent, or Firm* — David G. Woodral; GableGotwals

(57) ABSTRACT

A system includes a first lead connecting to existing vehicle wiring for activating a signal light of a right side of a vehicle, and a first strobing light module having a first microcontroller connected to the first lead and operating a first light capable of strobing operation. A second lead connects to existing vehicle wiring for activating a signal light of a left side of the vehicle, and a second strobing light module having a second microcontroller connects to the second lead and operating a light capable of strobing operation. The first and second microcontrollers are communicatively coupled and each provides a signal to the other when it has detected activation of its respective lead. The first and second microcontrollers both strobe their respective light capable of strobing operation upon receiving the signal from the other and the signal from their own respective lead.

16 Claims, 31 Drawing Sheets

(51) Int. Cl.
*F21S 41/60* (2018.01)
*B60Q 1/34* (2006.01)
*B60Q 1/00* (2006.01)
*F21V 23/00* (2015.01)
*F21V 23/04* (2006.01)
*F21W 103/30* (2018.01)

(52) U.S. Cl.
CPC ........ *F21V 23/001* (2013.01); *F21V 23/0407* (2013.01); *B60Q 2900/10* (2013.01); *F21W 2103/30* (2018.01)

(58) Field of Classification Search
USPC ....... 340/429, 431, 436, 467, 468, 471, 472; 362/396–398
See application file for complete search history.

(56) References Cited

U.S. PATENT DOCUMENTS

| | | | |
|---|---|---|---|
| 4,227,174 | A | 10/1980 | Belcher et al. |
| 4,357,594 | A | 11/1982 | Ehrlich et al. |
| 4,550,305 | A | 10/1985 | Bookbinder |
| 4,981,363 | A | 1/1991 | Lipman |
| 5,043,699 | A | 8/1991 | Hayden |
| 5,264,826 | A | 11/1993 | Henderson et al. |
| 5,374,920 | A | 12/1994 | Evens |
| 5,434,758 | A * | 7/1995 | Zeidler ................. B60Q 1/2611 340/472 |
| 5,481,243 | A | 1/1996 | Lurie et al. |
| 5,510,763 | A | 4/1996 | Deckard et al. |
| 5,515,026 | A | 5/1996 | Ewert |
| 5,519,389 | A | 5/1996 | Degunther et al. |
| 5,646,385 | A | 7/1997 | Bogovican et al. |
| 5,775,712 | A | 7/1998 | Link et al. |
| 5,850,177 | A | 12/1998 | Zimmerman |
| 6,023,221 | A | 2/2000 | Michelotti |
| 6,025,775 | A | 2/2000 | Erlandson |
| 6,028,512 | A | 2/2000 | Schropp et al. |
| 6,078,145 | A | 6/2000 | Tillinghast et al. |
| 6,081,188 | A | 6/2000 | Kutlucinar et al. |
| 6,181,243 | B1 | 1/2001 | Yang |
| 6,229,438 | B1 | 5/2001 | Kutlucinar et al. |
| 6,323,766 | B1 | 11/2001 | Bartlett et al. |
| 6,351,211 | B1 | 2/2002 | Bussard |
| 6,397,133 | B1 | 5/2002 | Van Der Pol et al. |
| 6,420,799 | B1 | 7/2002 | Sakamoto et al. |
| 6,445,289 | B1 | 9/2002 | Roberts |
| 6,456,206 | B1 | 9/2002 | Rocca et al. |
| 6,515,584 | B2 | 2/2003 | DeYoung |
| 6,623,151 | B2 | 9/2003 | Pederson |
| 6,674,182 | B2 | 1/2004 | Maynard et al. |
| 6,744,359 | B1 | 6/2004 | Wasilewski et al. |
| 6,842,111 | B1 | 1/2005 | Smithson |
| 6,858,986 | B2 | 2/2005 | Monk |
| 6,879,251 | B2 | 4/2005 | Robbins et al. |
| 6,922,137 | B1 | 7/2005 | Bycroft |
| 7,119,672 | B2 | 10/2006 | Subbaraman |
| 7,150,554 | B2 | 12/2006 | Calderas |
| 7,199,704 | B2 * | 4/2007 | Herrig ..................... B60Q 1/34 315/200 A |
| 7,455,139 | B2 | 11/2008 | Lee |
| 7,852,203 | B2 | 12/2010 | Herrig et al. |
| 7,961,086 | B2 | 6/2011 | Bradley |
| 8,049,610 | B2 | 11/2011 | Malik |
| 8,319,662 | B1 | 11/2012 | Bontemps et al. |
| 8,393,750 | B2 | 3/2013 | Clement |
| 8,398,284 | B1 | 3/2013 | Dvorzsak |
| 8,415,901 | B2 | 4/2013 | Recker et al. |
| 8,669,853 | B1 | 3/2014 | Gardner |
| 8,903,617 | B2 | 12/2014 | Braunberger et al. |
| 10,055,985 | B1 | 8/2018 | Hayward |
| 2002/0036908 | A1 | 3/2002 | Pederson |
| 2002/0078879 | A1 | 6/2002 | Wood |
| 2002/0105432 | A1 | 8/2002 | Pederson et al. |
| 2003/0001728 | A1 | 1/2003 | Flick |
| 2003/0132852 | A1 | 7/2003 | Povey et al. |
| 2004/0100373 | A1 | 5/2004 | Ponziani |
| 2004/0257214 | A1 | 12/2004 | Smithson |
| 2005/0099286 | A1 | 5/2005 | DeYoung |
| 2005/0134448 | A1 * | 6/2005 | Perlman ................. B60Q 1/305 340/468 |
| 2006/0022520 | A1 | 2/2006 | Matheny |
| 2006/0125616 | A1 | 6/2006 | Song |
| 2006/0209547 | A1 | 9/2006 | Biondo et al. |
| 2007/0142977 | A1 | 6/2007 | Munoz |
| 2007/0159319 | A1 | 7/2007 | Maldonado |
| 2007/0194905 | A1 | 8/2007 | Herrig et al. |
| 2008/0100432 | A1 | 5/2008 | Hoffman |
| 2009/0219150 | A1 | 9/2009 | Deyoung |
| 2009/0322508 | A1 | 12/2009 | Malik |
| 2010/0109859 | A1 | 5/2010 | Lakosky |
| 2010/0134271 | A1 | 6/2010 | Edwards et al. |
| 2010/0225465 | A1 | 9/2010 | Ekchian et al. |
| 2010/0253499 | A1 | 10/2010 | Haab et al. |
| 2012/0185130 | A1 | 7/2012 | Ekchian et al. |
| 2013/0093582 | A1 | 4/2013 | Walsh et al. |
| 2013/0190985 | A1 | 7/2013 | Nakano et al. |
| 2014/0055619 | A1 | 2/2014 | Holland et al. |
| 2014/0146552 | A1 | 5/2014 | Hui |
| 2014/0149025 | A1 | 5/2014 | Fazi |
| 2014/0300462 | A1 | 10/2014 | Russ |
| 2014/0361686 | A1 | 12/2014 | Wolfe |
| 2014/0368324 | A1 | 12/2014 | Seifert |
| 2015/0061492 | A1 | 3/2015 | Braunberger |
| 2015/0088397 | A1 | 3/2015 | Burton |
| 2015/0116133 | A1 | 4/2015 | Mawbey et al. |
| 2015/0127212 | A1 | 5/2015 | Chacon et al. |
| 2016/0144778 | A1 | 5/2016 | Tucker et al. |
| 2017/0274819 | A1 | 9/2017 | Domingo |
| 2017/0305349 | A1 | 10/2017 | Naboulsi |
| 2017/0364070 | A1 | 12/2017 | Oba |

FOREIGN PATENT DOCUMENTS

| | | |
|---|---|---|
| DE | 102009051837 A1 | 5/2011 |
| EP | 2827250 A2 | 1/2015 |
| FR | 2833903 | 6/2003 |
| JP | 2009012554 A | 1/2009 |
| JP | 2013133071 A | 7/2013 |
| KR | 2019970032975 U | 7/1997 |
| KR | 2019980031131 | 8/1998 |
| KR | 1020030015908 | 2/2003 |
| KR | 1020120048948 | 5/2012 |
| KR | 1020120106036 | 9/2012 |
| WO | 0100446 A1 | 1/2001 |
| WO | 2004018256 A1 | 3/2004 |
| WO | 2008056186 A1 | 5/2008 |
| WO | WO2011154691 A1 | 12/2011 |
| WO | 2018063253 A1 | 4/2018 |

OTHER PUBLICATIONS

Jan. 12, 2018, Publisher: Extended European Search Report.
"How to Change Hazard Flashers to STrobe Flashers—Chevy Blazer Forums", Publisher: http://blazerforum.com/forum/2nd-gen-s-series-1995-2005-tech-41/how-change-hazard-flashers-strobe-flashers-62080/.
ISA/US, "International Search Report for PCT/US2016/054489", dated Dec. 29, 2016.
PCT/ISA/US, "PCT International Search Report for PCT/US2016/015125", dated Mar. 31, 2016.
Christianson et al, "Workzone Safety Improvements through Enhanced Warning Signal Devices", "https://escholarship.org/content/qt6nm2g4tg/qt6nm2g4tg.pdf", Univerisity of California, Berkeley 2008, Published in: US.
"EPO Search Report for EPO App. No. 16917956-1 dated May 13, 2020", "Extended European Search Report prepared for EPO Appli-

(56) References Cited

OTHER PUBLICATIONS cation No. 16917956.1 dated May 13, 2020", May 13, 2020, Publisher: European Patent Office.

* cited by examiner

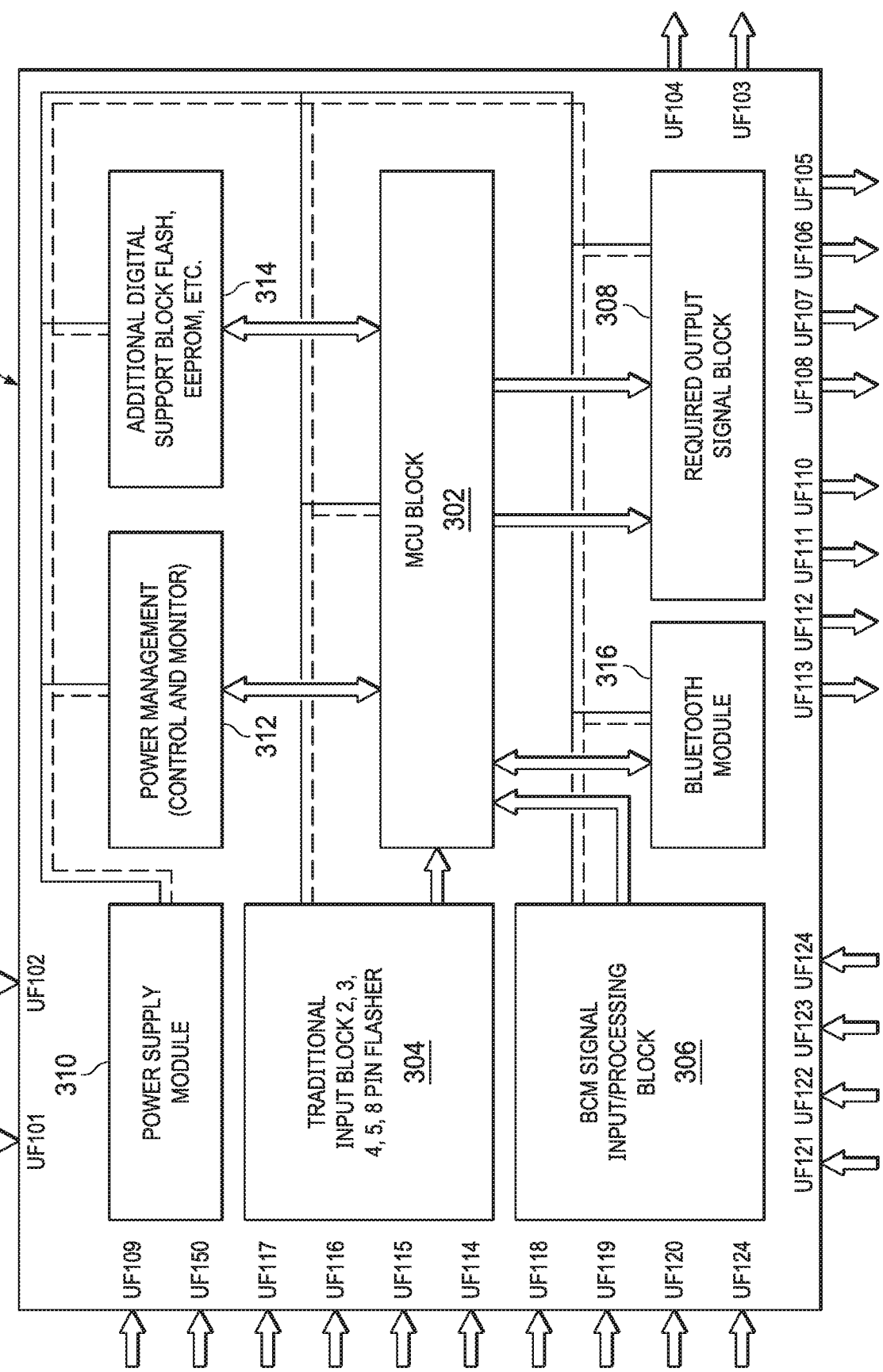

ENHANCEMENT OF VEHICLE HAZARD SYSTEMS

CROSS-REFERENCE TO RELATED CASES

This application claims the benefit of U.S. provisional patent application Ser. No. 62/778,151, filed on Dec. 11, 2018, and incorporates such provisional application by reference into this disclosure as if fully set out at this point.

FIELD OF THE INVENTION

The present disclosure relates to emergency or hazard lights for automobiles, RVs, trailers, motorcycles and vehicles in general, and, more particularly, to emergency or hazard lights that strobe and give visual direction for increased safety and visibility.

BACKGROUND OF THE INVENTION

The advent of light emitting diode (LED) technologies has enhanced lighting capabilities to a point where vehicle-based lights are becoming more effective as visual signals during emergencies and hazardous situations. Emergency services, law enforcement agencies, traffic control, and other government agencies have recognized this fact and added separate strobe lighting systems to their vehicles. These systems are added on to what would otherwise be a factory stock lighting setup and operate using a wiring and switch platform that is independent from the traditional hazard light circuit. Foreign and domestic auto manufacturers often use blinker switches based on decades-old technology in order to make automobile blinkers and hazard emergency lights blink or flash. Even where newer microcontrollers are used, they effect only the well-known signal and hazard flasher operations of decades past.

A problem with existing systems and modes of operation with respect to emergency flashers is that a double blinker flashing during an emergency, on a roadside for example, is insufficiently visible and does not provide a high level of clear visual communication to other drivers that a safety hazard exists. Many citizens are killed each year while using their flashing hazard lights during emergency situations on the road. Flashing or double blinking emergency lights are nowhere near as effective as strobing hazard lights.

Another problem with existing emergency flashers is that they are not always deployed when a genuine emergency exists. Occupants may be injured or otherwise unable to deploy the emergency flashers when they are needed most. A disabled vehicle on a roadway is a hazard to other vehicles and all vehicle occupants. In other cases, a vehicle may be off the roadway such that further collision danger is minimal. Nevertheless, hazard lights can be critical in quickly locating vehicles that have left the roadway either purposefully (e.g., to leave the flow of traffic) or as the result of an accident.

Laws related to strobing lights on vehicles address emergency or law enforcement related vehicles. For example, there are laws for emergency and police vehicles reserving a combination of strobing colors on top of vehicles, or in a light bar, or mounted elsewhere. These laws reinforce the belief that strobing lights are significantly more effective during vehicle emergencies due to their higher visibility, attention grabbing attributes, and ability to provide useful visual information and direction to others.

With the increasing use of cell phones and text messaging (while operating a vehicle) becoming more of a safety problem, a need exists to enhance a citizen's emergency visual communication abilities when on the side of the road and without getting out of their vehicle. A need also exists for an automated visual emergency communication system to enhance a citizen's ability to automatically signal to others during emergency situations when the operator is unable to activate such a visual communication signal system on his or her own.

What is needed is a system and method for addressing the above, and related, issues.

SUMMARY OF THE INVENTION

The invention of the present disclosure, in one aspect thereof, comprises a system including a first lead connecting to existing vehicle wiring for activating a signal light of a right side of a vehicle, and a first strobing light module having a first microcontroller connected to the first lead and operating a first light capable of strobing operation. The system includes a second lead connecting to existing vehicle wiring for activating a signal light of a left side of the vehicle, and a second strobing light module having a second microcontroller connected to the second lead and operating a light capable of strobing operation. The first and second microcontrollers are communicatively coupled and each provides a signal to the other when it has detected activation of its respective lead. The first and second microcontrollers both strobe their respective light capable of strobing operation upon receiving the signal from the other and the signal from their own respective lead.

In some embodiments, the first light module and second light modules replace existing signal lights of the vehicle. This may be the front and/or the rear.

The system may include a third lead connecting to the existing vehicle wiring for activating a signal light of the right side of a vehicle; a third strobing light module having a third microcontroller connected to the third lead and operating a third light capable of strobing operation; a fourth lead connecting to the existing vehicle wiring for activating a signal light of the left side of the vehicle; and a fourth strobing light module having a fourth microcontroller connected to the fourth lead and operating a light capable of strobing operation. In some embodiments the third and fourth microcontrollers are communicatively coupled together and each provides a signal to the other when it has detected activation of its respective lead. The third and fourth microcontrollers may both strobe their respective light capable of strobing operation upon receiving the signal from the other and the signal from their own respective lead.

In some cases the first and third microcontroller are communicatively coupled and the third strobe light capable of strobing operation is made to strobe when the first light capable of strobing operation is made to strobe. In some cases the second and fourth microcontroller are communicatively coupled and the fourth strobe light capable of strobing operation is made to strobe when the second light capable of strobing operation is made to strobe. In some embodiments, the third and fourth strobing light modules replace existing front signal lights of the vehicle.

The invention of the present disclosure, in another aspect thereof, comprises a system including a first set of strobing light modules comprising at least left and right rear signal light replacement lights for a vehicle, each being electrically connected to existing vehicle wiring associated with the left and right rear signal lights of the vehicle, respectively. The first set of strobing light modules provides a left signal light or a right signal light when indicated by the existing vehicle wiring associated with the left and right rear signal lights of the vehicle, respectively. The first set of strobing light modules provides a strobing light at least at a left and right rear of the vehicle when the existing vehicle wiring associated with the left and right rear signal lights of the vehicle indicates a hazard flasher operation.

In some embodiments the first set of strobing light modules comprises a first left strobing light module electrically connected to the existing vehicle wiring associated with a left rear signal light of the vehicle, and a second right strobing light module electrically connected to the existing vehicle wiring associated with a right rear signal light of the vehicle. In some cases the first and second strobing light modules have a communicative coupling between them and are each indicated to strobe by having their associated existing vehicle wiring indicate a signal light and receiving indication on the communicative coupling that the other strobing light module has received signal indication on its associated connection to the vehicle wiring.

The invention of the present disclosure, in another aspect thereof, comprises a method including providing a first strobing light module having a first microcontroller operating a first light capable of strobing and flashing operation, and providing a second strobing light module having a second microcontroller operating a light capable of strobing and flashing operation. The method includes connecting the first and second strobing light modules to existing vehicle wiring that operates left and right signal lights on the vehicle, respectively and providing a communicative coupling between the first and second microcontrollers. The first and second microcontrollers each communicate to the other when they are activating their associated light capable of strobing or flashing operations. The first and second microcontroller each flash their respective light capable of strobing or flashing operations if a signal light is indicated to be operated by the existing vehicle wiring and the other microcontroller is not activating its associated light capable of strobing of flashing operations. The first and second microcontroller both strobe their respective light capable of strobing or flashing operations if a signal light is indicated to be operated by the existing vehicle wiring and the other microcontroller is also activating its associated light capable of strobing of flashing operations.

The method may include connecting the first and second strobing light modules to existing vehicle wiring that operates front left and right signal lights on the vehicle, respectively. The method may include connecting the first and second strobing light modules to existing vehicle wiring that operates rear left and right signal lights on the vehicle, respectively.

The invention of the present disclosure, in another aspect thereof, comprises a kit including a pair of strobing light modules comprising left and right signal light replacements for a vehicle, each configured for being electrically connected to existing vehicle wiring associated with the left or right signal lights of the vehicle and an electrical lead for communicatively coupling the pair of strobing light modules. The pair of strobing light modules provides a left signal light or a right signal light when indicated by the existing vehicle wiring associated with the left and right rear signal lights of the vehicle, respectively. The first set of strobing light modules provides a strobing light when the existing vehicle wiring associated with the left and right rear signal lights of the vehicle indicates a hazard flasher operation.

The invention of the present disclosure, in another aspect thereof, comprises a kit including a left strobing light module comprising a microcontroller operating a light capable of strobing or flashing operation and a right strobing light module comprising a microcontroller operating a light capable of strobing or flashing operation. The left and right strobing light modules are each configured for being electrically connected to existing vehicle wiring associated with the left and right signal lights of the vehicle. The left strobing module provides a flashing light when only a left signal is indicated by the existing vehicle wiring. The right strobing light module provides a flashing light when only a right signal is indicated by the existing vehicle wiring. The left and right strobing light modules both provide a strobing light when a hazard light is indicated by the existing vehicle wiring by indication of both left and right signals.

BRIEF DESCRIPTION OF THE DRAWINGS

FIG. 3 is a block diagram of a strobe module for vehicle hazard lights according to aspects of the present disclosure.

DETAILED DESCRIPTION OF THE PREFERRED EMBODIMENTS

Figure 1:
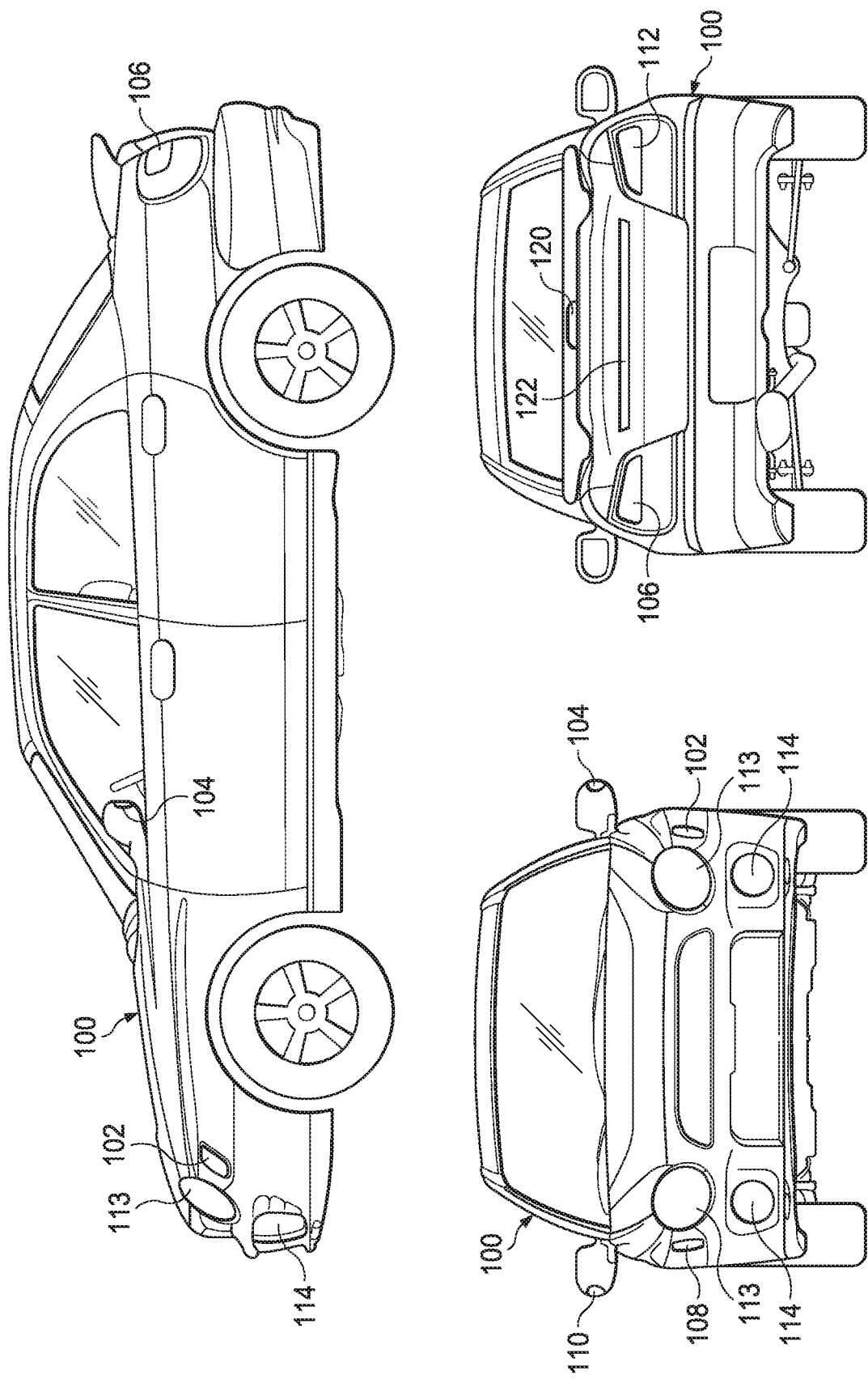
FIG. 1 illustrates an exemplary placement of signal indicators and hazard flashers on a typical vehicle.

In various embodiments of the present disclosure, devices and systems are implemented that provide enhanced visual communication cues via existing or replacement signal and/or hazard lights on an automobile. Signal and hazard lights in most cars cycle between light and dark at a rate between once and twice per second or 1-2 Hz. Such a rate is believed to be adequate for signaling lane changes and other non-emergency situations. However, existing cars and hazard light flasher systems do not take into account the need for, and benefit of, communicating an emergency situation utilizing an enhanced flash rate. A vehicle traveling 70 miles per hour will travel over 50 feet before a 2 Hz cycle has completed one time. This distance can mean the difference between an accident and a close call. Further, reaction time and ability to maneuver or stop must be taken into account. The quicker a driver takes notice of a problem, the more likely he or she can still have time to avoid a serious accident.

For purposes of the present disclosure, an enhanced flash rate is one that is perceptibly altered, or has at least a component of the flashing cycle that is increased in flashing speed, from the high end of the normal flash rate of about 2 Hz. Such flash rate may be referred to as a "strobe" instead of a flash or signal for purposes of the present disclosure. In some embodiments, a strobe has a cycle rate of 3 Hz or above (although slower rates may still be considered "enhanced" or "strobing" so long as there is a perceptible increase in rate over that of a typical signal light). In other embodiments, the strobe rate is 4 Hz or above, representing a doubling of the fastest typical vehicle signal light or hazard light flash rate. It is believed that the faster a light strobes with adequate delineation and contrast between light and dark periods, the more attention grabbing the light is perceived to be. Accordingly, in another embodiment, the strobe rate is 6 Hz, or a factor of three faster than the fastest flash rate expected to be encountered from a standard signal or hazard light. In further embodiments, the strobe rate is 8 Hz or above.

It should be understood that lighting patterns may be produced that comprise strobed illumination (e.g., light and dark cycles repeating at 2 Hz or more) interspersed with longer dark or non-illuminated periods. For purposes of the present disclosure, the term strobe encompasses patterns of flashing lights, part of which are strobing per the definition above, and part of which may be dark or non-illuminated, steady state illuminated (at full or partial maximum output), or flashed at a rate that is slower than a strobe. The term strobe should also be understood to encompass patterns that contain strobing portions of varying frequency. A non-limiting example of such a pattern would start flashing at 2 Hz and increase over time to 8 Hz or more before repeating or moving to another pattern. It should also be understood that, in various embodiments of the present disclosure, signal lights (e.g., left and right signal) are maintained at the normal 1-2 Hz, while emergency or hazard flashers are deployed at a strobing rate or in a strobing pattern. Moreover, as described in detail below, a normal slower flash rate may be optionally available when the hazard flashers are deployed.

In some embodiments, variable intensities of hazard lamps or other vehicle lamps, whether these are original or aftermarket equipment, may be used to further enhance communication and signaling capabilities. Variation in intensity may be used in addition to strobing rates and patterns to enhance safety and communication. As a non-limiting example, traditional hazard flashers or standard signal lights may be operated at a first, lower intensity. When strobing is activated, the lamps may operate at a second, higher intensity. The situation may also be reversed. For example, given that strobing is more "attention grabbing" than slower flashing, the strobing signals might be operated at a lower intensity than the standard signals or illuminations. A lower intensity on the strobing signals may also allow the total power consumed by the associated lamps to remain equal, or at least closer, to that consumed during traditional, non-strobing operation. That may mean that lamps not specifically intended for strobing (e.g., possibly OEM equipment) to be strobed without overheating, burning out, and/or shortening life span. Operation of the strobe signals at lower intensities also allows strobing on older lamps with longer recovery times (e.g., incandescent lamps).

Alteration of intensities may also allow for enhanced signaling capabilities apart from those available due to strobing/non-strobing operation. For example, lamps may be selectively strobed or flashed, with higher or lower intensities available for both types of operation. In one example, hazard lights may be strobed to indicate danger or general caution. Intensity may be increased while the vehicle is in motion (or stopped). Intensity may also be increased upon air bag deployment, for example. Intensities can also be variable from one side of the vehicle to another (or front to back). For example, a higher intensity may be used on one side of the vehicle to indicate a directional signal in addition to the strobe.

It will be appreciated that many combinations are possible between strobing, non-strobing, and variable intensity. In one embodiment, lamps may be strobed continuously or with a variable interval and/or be operated at a variable intensity that changes over time. In such a way, maximum changes within the illumination may occur within a short time span. As the human vision system is biased toward detecting changes, a maximum opportunity for a motorist to observe and become aware of a hazard or other signaled condition may be provided according to aspects of systems and methods of the present disclosure. The present disclosure also provides increased opportunities for motorists to become aware of hazards when they might be distracted (e.g., as by operation of a cell phone or the like).

Emergency vehicles have been equipped for many years with brightly and rapidly cycling lighting systems. These have been based on complex mechanical systems involving rotating reflectors and the like that increase apparent flash rate beyond what is normally achievable with traditional incandescent based circuitry. Unfortunately, such systems were specialized add on equipment to the basic underlying vehicle, and not normally available or cost effective for the general public to utilize, even for legitimate purposes. Newer systems based on light emitting diodes (LEDs) are available but, again, are specialized equipment, typically added to a vehicle after it leaves the manufacturer, and requiring separate controls, circuitry, and possibly power supplies from what is available from a factory vehicle.

A traditional signal light system for a consumer automobile, and its associated hazard flashing system, has a flash rate on the order of 1-2 Hz. This was originally based in part on the use of incandescent light bulbs in the older systems (typically 6V or 12V bulbs), which rely on internal filaments that heat up and glow in order to operate. The filaments do not glow sufficiently to be able to provide appropriate visual cues until power has been applied a sufficient amount of time. Further, they do not stop glowing instantaneously when power is removed. Thus, the rate at which the signal light or hazard flashers could be cycled was limited. Other limitations existed based on the fact that the original circuitry driving the flashing operation was based on analog thermal switches or other electromechanical components, which could not drive incandescent bulbs much beyond around 2 Hz. For purposes of the present disclosure, an existing vehicle circuit implementing the periodic activation of lights for signaling or hazard indications (whether based on thermal switches or otherwise) is referred to as a flasher module or relay, signal module or relay, or blinker module or relay.

Strobe lights based on exclusively on analog circuitry have been available for some time but require arrangements of transformers to produce voltages on the order of hundreds of volts, capacitors, and delicate gas discharge tubes to operate. Again, none are suitable for consumer use with ordinary automobiles.

LED lighting systems have now made their way to many vehicle models as standard equipment. LED upgrade kits are available for older and newer model cars as well. However, the operation of the LED lighting systems operate in the same manner and provide the same functions that were available with the incandescent lighting systems (albeit at greater efficiency and/or intensity).

In various embodiments, the present disclosure provides systems and methods that are capable of providing strobing effects in existing lighting systems for factory standard automobiles. Such systems and methods rely on existing wiring, LED lights, and controls (switches, etc.). In other embodiments, the systems and methods of the present disclosure are applicable to vehicles produced without LED lights, but which have been upgraded from the basic incandescent bulbs, at least so far lights for which strobing effects are sought. The existing wiring may be employed in such embodiments and the existing controls are utilized. In other words, embodiments of the present disclosure provide for strobing effects of vehicle signal lights, brake lights, or other existing lights to be available to a driver or vehicle occupant and to be operable with existing and familiar hazard light switches or other activation means. Automatic deployment of strobing effects can be tied to signals received from existing vehicle control or safety systems corresponding, for example, to air bag deployment, ABS activation, hard braking, rollovers, etc. It is also possible to add at least some automatic deployment features for older vehicles based on the use of separate accelerometers not present in the existing vehicle systems. Various embodiments of the present disclosure can be installed or implemented at the time of manufacture as factory standard equipment, or entirely as an aftermarket system relying on factory installed controls, wiring, and to the extent possible, existing bulbs.

Systems and methods of the present disclosure may also deploy differently depending upon the source of the activation. For example, in one embodiment, manual user deployment of a hazard light system may result in non-strobing or traditional flashing (at least on an initial press or activation of the hazard flasher switch). On the other hand, deployment of the hazard flashers as a result of air bag deployment, ABS activation, hard braking, and/or another vehicle event may result in strobing. In some embodiments, automatic strobing activation as a result of a particular event (e.g., airbag deployment) may override any previous activation of non-strobing flashers. In some embodiments, the driver will always have the ultimate ability to activate or cancel any flashing or strobing activation based upon the systems and methods described herein.

In some embodiments, whether a system of the present disclosure deploys in flashing or strobing mode depends upon external conditions that can be determined automatically by the vehicle or a system associated therewith. For example, cameras provided on a vehicle as part of adaptive cruise control, lane following, or the like, may also be able to detect the presence of fog or heavy rain. In such case, a user deployment of hazard flashers may be activated as strobing for better visibility. A camera dedicated to the detection of the presence of inclement weather could also be used.

In another embodiment, whether to deploy strobing rather than flashing hazard lights may be based on weather or traffic data. In some cases, such data is provided by or corresponds to GPS data. For example, when GPS indicates that the vehicle is in an area of heavy fog or other inclement weather, or a known crash, when a user enables hazard flashers they may strobe rather than flash (at least initially or unless/until overridden). Relevant data may also be provided via wireless (e.g., cellular) or satellite.

In further embodiments, detection of severely inclement weather or other dangerous phenomena may cause strobing lights to deploy without user intervention (although a user may still be able to cancel this action). It should be understood that the foregoing may be programmed into the control mechanisms of the systems and methods discussed in the present disclosure (e.g., provided in the microcontroller or BCM programming). Of course, it may also be necessary to provide the appropriate weather, traffic, or other information to the strobing system from the relevant vehicle system that detected the condition. This may be accomplished via an existing vehicle bus (e.g., a CAN bus), wirelessly, or via a dedicated lead.

For purposes of the present disclosure, some vehicle electronics, switches, lights, or other components and/or functions may be described as "existing." This would refer to a type of component that may already be found on certain vehicles. The embodiments of the present disclosure may extend or expand the function or operation of such existing technology as described throughout this document. In such respect once modified the device or function may no longer be "existing". As an example, some embodiments of the present disclosure extend or alter the functionality of existing vehicle lights. Existing signal lights may already be used on a vehicle to signal turns or provide emergency hazard flashing. Embodiments of the present disclosure may extend the capability of such existing lights. In some cases, the lights may remain operable to perform their previously-existing function (e.g., turn signals). In some cases, their previously-existing function may be supplanted entirely with the disclosed embodiment. Nevertheless, it should be understood that embodiments of the present disclosure may rely on and supplement certain components that may already be known in the art. In some cases, the hardware (e.g., a lamp or light) may be the same "existing" component known prior to the present disclosure, but now provides heretofore unknown and novel functionality.

Referring now to FIG. 1, exemplary placement of various signal lights and/or hazard lights is shown on a typical automobile 100. It should be understood that the terms automobile, car, and vehicle, are used interchangeably herein, and the systems and methods of the present disclosure are equally applicable to all of these. The terms, lamp, light, indicator, flasher, signal and blinker as used in the present disclosure in the context of the strobing systems presented herein should be understood to mean an LED light placed appropriately on a vehicle or automobile 100 to be visible to other drivers or observers outside the vehicle. FIG. 1 shows the automobile 100 from side, front, and rear views. A left front indicator light 102, left side indicator light 104, and left rear indicator light 106 can be seen at typical locations on the automobile 100. Similarly, along the right side of the automobile 100 are right front indicator light 108, right side indicator light 110, and right rear indicator light 112. It should be understood that the placement of the indicator lights is for illustration only, and the present disclosure is not limited to the placement shown. On most, if not all, available vehicles, the left front indicator light 102 and right front indicator light 108 will generally be toward the front of the automobile 100, visible to facing or oncoming traffic. These are generally forward of left side indicator light 104 and right side indicator light 110 (if the vehicle is so equipped) which are visible from the sides of the automobile 100. The left side indicator light 104 and/or right side indicator light 110 may also be mounted on the body of automobile 100, rather than on the mirrors, or on another location. Finally, left rear indicator light 106 and right front indicator light 108 are generally mounted rearward on the automobile 100 so as to be visible to traffic behind the automobile 100.

In addition to the vehicle lights that are normally deployed as part of the signal light or hazard flasher system, vehicles typically have additional lights that are dedicated to other purposes. For example, headlights 112 are provided as standard equipment. Fog lights 114 may be standard, optional, or after-market. Brake lights are standard equipment as well. Rear brake lights on some vehicles serve a dual purpose and function as part of the existing signal or hazard flasher system. Vehicles of recent years provide a high center mounted stop lamp (HCMSL) 120 that functions along with the other brake lights. The HCMSL 120 is not normally shared with any other vehicle function (except as provided herein). After market light bars or light strips 122 can be added to most any vehicle. Although, as explained below, certain embodiments of the present disclosure are intended to operate only through standard or factory installed vehicle lights, it should be understood that aftermarket or add-on lights can be controlled as well. An after-market or add-on light should not be confused within the present disclosure for what are later referred to as auxiliary or multi-purpose lights. Auxiliary and/or multi-purpose lights, within the present disclosure, specifically denotes lights for which a use is already designated by the vehicle (e.g., an HCMSL) but which may be additionally or supplementally deployed or activated by systems of the present disclosure.

As described above, the various indicator lights, marker lights, or other vehicles lights may be LED lights or may have originally been incandescent bulbs (or a mixture of the two) that have been changed out for LED lights in order to allow effective strobing, as provided by various embodiments of the present disclosure. In various embodiments of the present disclosure, the existing location, placement, and color of lights is retained as the vehicle was manufactured, or would be manufactured, without any of the systems of the present disclosure.

Figure 2A:
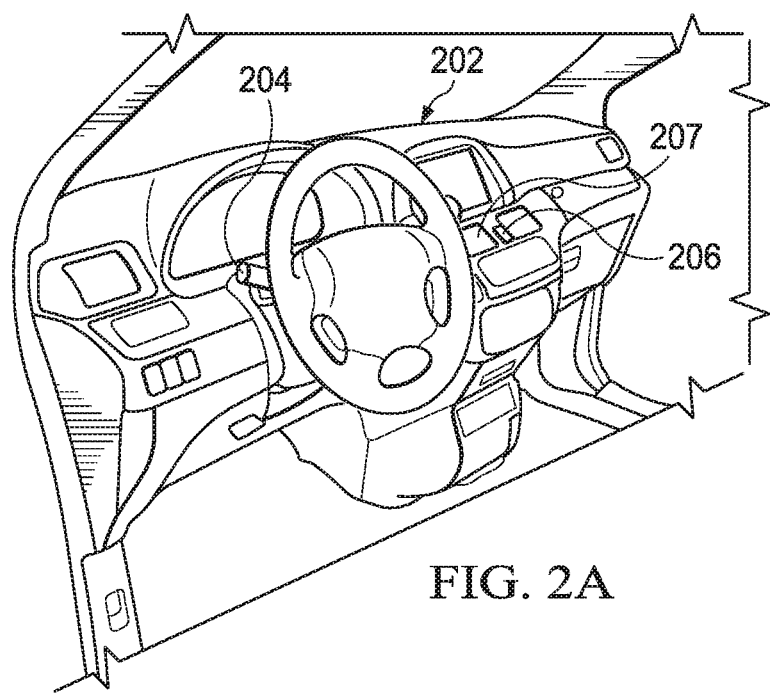
FIG. 2A illustrates an exemplary vehicle dashboard and exemplary placement of certain controls.

Referring now to FIG. 2A, a vehicle dashboard 202 is shown. The dashboard 202 is meant to represent any vehicle dashboard as are widely known to the public. A turn signal stalk 204 is generally provided to the left of the steering wheel and operated to activate signal lights. Normally, movement of the turn signal stalk 204 downward indicates a left hand signal and movement of the turn signal stalk 204 upward indicates a right hand signal. Upon activation, the appropriate signal lights are illuminated in a slow, periodic flashing manner.

A hazard flasher button 206 may be located at various locations on the interior of a vehicle. Here, the hazard flasher button 206 is shown in the center of the vehicle dashboard 202 but it could be placed on a steering column, below the vehicle dashboard 202, or elsewhere. In some embodiments, the hazard flasher button 206 is an existing button that may be known in the art as operable to activate hazard flashers.

Embodiments of the present disclosure are designed to work with the exiting signal and hazard light controls (e.g., the turn signal stalk 204 and hazard flasher button 206) such that a driver or user does not have to learn or remember any separate controls. As described below, some embodiments of the present disclosure allow a selection of various strobe or flashing lights to be implemented. These may be implemented by sequential presses of the hazard flasher button 206. No separate manual controls are needed or provided. Thus, the user is not presented with a confusing array of options or controls during an emergency and does not have to suffer any unwanted modifications that are visible on the interior of the vehicle.

In other embodiments, a second switch is provided such as a strobe switch 207. This may be located near to the hazard flasher button 206 or elsewhere in the vehicle within reach of the driver or even a passenger. As shown, it is centrally located on the dash 202. The strobe switch 207 may be used to activate strobing functions associated with various vehicle lights as described herein. In one example, a user may activate strobing, rather than flashing, of hazard lights by pressing the strobe switch 207. In some embodiments, the strobe switch 207 only activates a strobing function if the hazard flasher button 206 has already been activated (or another vehicle system has deployed the flasher lights). In other embodiments, one or the other of the hazard flasher switch 206 and the strobe switch 207 may be made to take priority. In this way, multiple safety and regulatory scenarios can be satisfied with embodiments of the present disclosure.

Figure 2B:
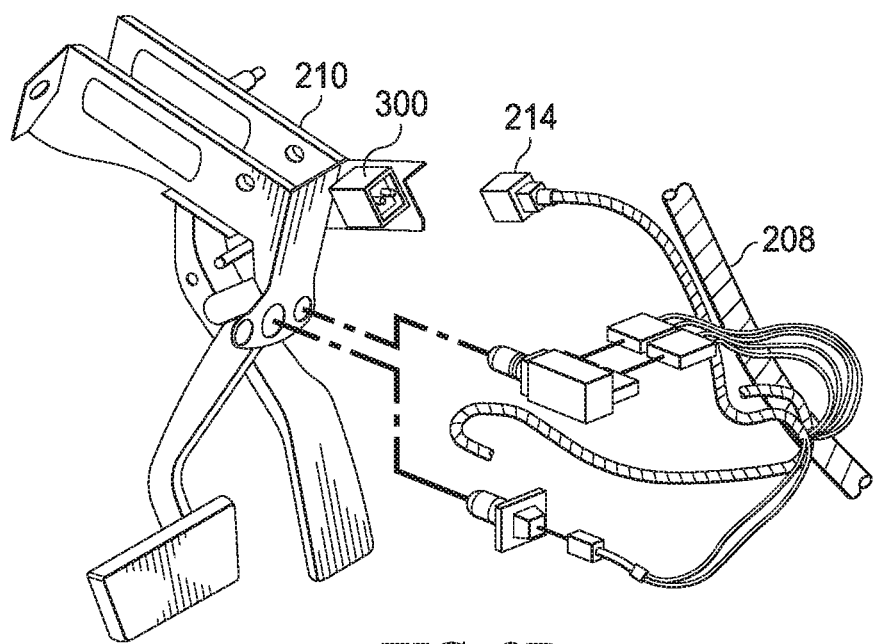
FIG. 2B illustrates an exemplary vehicle wiring harness and location for a strobe module to replace a flash relay.

Referring now to FIG. 2B, an exemplary vehicle wiring harness 208 and location for a strobe module to replace a flash relay is shown. The wiring harness 208 is shown as only that portion of the harness that interconnects with a strobe module 300 according to aspects of the present disclosure. It should be understood that the wiring harness may run throughout a vehicle and may be constructed of multiple separate pieces. According to embodiments of the present disclosure, a strobe module 300 replaces an existing flasher relay device and provides a strobing circuit for the hazard lights in an existing vehicle. The strobe module 300 may even be mounted in the same location as the original relay. In some embodiments, the strobe module 300 is pin-compatible with an existing connector 214 on the wiring harness 208 and performs all of the functionality described below relying on the power, signaling, and other connections provided via the wiring harness 208. In other embodiments, an adapter (not shown) may interpose the strobe module 300 and the wiring harness connector 214 such that a single embodiment of a strobe module 300 can be connected to a wide variety of vehicles and wiring harnesses.

In some embodiments, as explained below, the strobe module 300 may not be able to provide the full contemplated functionality interfacing to the vehicle exclusively via the wiring harness 208. In such cases, additional leads may be routed to power, ground, or wherever needed. In embodiments where a body control module (BCM) is present, the strobe module 300 may have little or no interaction to the vehicle via the connector 214, but may be spliced and wired into the vehicle at a convenient location to receive output from the BCM and drive the associated vehicle lights (as described further below).

For purposes of the present disclosure, any electronic or electromechanical mechanical device with control or programmable control (whether or not reprogrammable) over the signal lights or hazard lights of a car is considered a BCM. A BCM may incorporate one or more silicon based processors, microprocessors, controllers, microcontrollers, chips, gate arrays, or other logical devices. In some cases, the BCM may contain relatively complex multifunctional components such as system-on-a-chip devices. Additional names or designators for a BCM may include, but are not limited to, computer, control unit, electronic control unit (ECU) body computer, body computer module, body controller, body control module, and on board controller. The BCM may or may not control additional aspects of the vehicle in addition to hazard or signal lights.

An existing mounting point 210 may be provided on the vehicle for physically locating and affixing the original flasher relay. The same location 210 may be used to store and secure the strobe module 300. In embodiments where the strobe module 300 interfaces with the vehicle at least partially via the wiring harness 208, the mounting point may be near the connector 214.

Referring now to FIG. 3, a block diagram of a strobe module for vehicle hazard lights according to aspects of the present disclosure is disclosed. Arrows in FIG. 3 are indicative of direction of signaling, information, or power flow. In the embodiment of FIG. 3, the primary functionality of the strobe module 300 is provided by a microcontroller 302. The microcontroller 302 may be a general purpose microcontroller that is suitable to the environment in which is it used (e.g., a vehicle interior or engine compartment). The microcontroller 302 may be programmed using, for example, assembly language or a higher level language when suitable. In some embodiments, the microcontroller 302 may be less advanced than a general purpose microcontroller and may comprise a field programmable gate array (FPGA) or the like. An application specific integrated circuit (ASICS) may also be used.

It will also be appreciated that a system-on-a-chip device might be employed to fulfill the functions of the microcontroller 302 as well as providing integrated memory and storage, I/O ports, D/A, A/D, timing functions, and the like. In some cases, wireless communication capabilities may even be provided on a single chip. Such an embodiment is within the scope of the present disclosure and simply moves certain aspects or functions of the strobe module 300 from the various individual components as described herein and consolidates them onto a single silicon device.

In the illustrated embodiment of FIG. 3, the microcontroller 302 receives input from an analog input block 304. The analog input block 304 provides signal connections to those automobiles relying on older or traditional analog blinker or hazard flasher modules. The analog input block 304 provides the appropriate leads and connections to mimic the interface to the automobile of various legacy flasher systems (e.g., via the connector 214). These include, for example, existing 2, 3, 4, 5, or 8 pin flasher schemes. Exemplary detailed wiring diagrams for these systems are explained below. However, in each case, the functionality is similar. The strobe module 300 operates on the basis of the microcontroller 302 reading or accepting the signals or voltages that would normally be provided to the existing flasher module or relay and replicating the appropriate output signal or voltage at output signal block 308, which connects to the downstream electrical components responsible for illuminating the relevant signal light (in many cases, the only existing downstream component will be the bulb or LED that is visible to other drivers). For example, a driver may flip a signal light stalk upward to signal a right turn. This would normally send a signal in the form of a voltage to the flasher relay. In response, the existing signal or hazard module would provide the traditional periodic illumination of the relevant signal lights. A driver may also deploy a hazard light switch, and in response, the existing hazard module would provide periodic illumination of all signal lights. The strobe module 300 replicates this functionality as a replacement for the existing hazard or signal module. However, in the event that hazard lights are activated (as indicated on the analog input block 304), the microcontroller 302 is programmed to deploy the signal or hazard lights in a strobing fashion.

As described, a strobing light appears substantially different than a normal flashing light as have been seen to date on automobiles. However, since strobing lights are attention grabbing devices associated with hazardous conditions, it may be a better choice not to strobe the relevant lights when a simple signal light is indicated on the analog input block 304. Accordingly, the microcontroller 302 may be programmed to flash, rather than strobe, the relevant lights or LEDs when a turn signal is indicated when such a distinction is supported by the existing vehicle wiring.

In some embodiment, the strobe module 300 is deployed or implemented in a newer automobile that may utilize a computer or set of computers that control non-engine related functions referred to as a body control module (BCM). In such cases, the signal stalk and the hazard flasher button may be connected directly to the BCM, which then deploys the signal lights as signal lights (one side only) or as hazard lights (both sides simultaneously). It is possible to implement the systems of the present disclosure by initial programming (or reprogramming where allowed) of the BCM. However, on vehicles that are already built and on the road, access to, and reprogramming of, the BCM is generally time consuming and cost prohibitive to a degree it may not be likely to gain wide acceptance. Further BCM schematics and programming routines are rarely made public. Accordingly, the strobe module 300 may have a BCM input block 306 instead of (or in addition to) the analog input block 304.

The BCM input block 306 may comprise a series of leads that are wired to intercept the outputs from the existing BCM that drives the vehicle signal and hazard lights. When the microcontroller 302 detects that the BCM indicates a signal light, it may utilize the output signal block 308 to activate the relevant lights in the traditional signaling manner. On the other hand, if the microcontroller 302 detects on the BCM input block 306 that the BCM indicates a hazard flash, the output signal block 308 will be used to drive the strobing effect on the exterior lights as described.

The output signal block 308 provides electrical connections to each bulb or LED that forms an existing part of the signal or hazard flasher system of the automobile into which it is installed. Such connections may include connections to lights visible outside the car, as well as indicator lights visible to the driver. The microcontroller 302 may or may not have the capacity to directly drive the LEDs comprising the flasher or signal system of the car. Consequently, as is known in the art, amplifiers, relays, or other circuitry that is capable of driving the LEDs in the required manner may comprise the output signal block 308, which, in turn, drives the LEDs.

A power supply module 310 may be integrated with the strobe module 300 to power the microcontroller 302, output signal block 308, and/or other components. The power supply module may be configured to draw power from the existing 12 volt system of the vehicle. In another embodiment, it may draw power from a regulated accessory bus (e.g., 5 V, 12 V, or other).

Power management circuitry 312 may be provided for converting voltage from that received by the power supply module 310 to that utilized by the other components of the strobe module 300. The power management circuitry 312 may also prevent power surges or spikes from reaching the microcontroller 302 and other sensitive components. In some embodiments, battery back-up may be provided the microcontroller 302. Where space and/or battery capacity permit, a backup battery could even drive the LEDs via the output signal block 308 when the vehicle electrical system becomes exhausted or fails due to damage sustained, for example, in a crash.

The microcontroller 302 may be configured to communicate with various existing vehicle subsystems for automatic deployment of strobing lights. For example, in the event of an air bag deployment, the emergency lights may be set to strobe. Similarly, if a deployment of an anti-lock brake system or stability system is detected, the microcontroller 302 may activate strobing lights. In some embodiments, deactivation of the strobing lights may be automatic as well based on information received from other vehicle subsystems.

In other embodiments, the strobe module 300 has one or more on-board (not presently shown) accelerometers that detect rapid acceleration (or deceleration), skids, overturns, and other non-typical driving maneuvers and can deploy strobing lights without input from the driver. The microcontroller 302 can be programmed such that the strobing ceases automatically upon resumption of a normal speed or orientation for the vehicle, or they may remain activated until the microcontroller 302 is reset (for example, by a press of the hazard light switch by the driver or occupant).

In some cases, it may be desirable to allow reprogramming of the microcontroller 302 after installation. Accordingly, the strobe module 300 may be equipped with a wireless module 316. The wireless module 316 may be a Bluetooth module that can communicate in an ad hoc fashion with a variety of devices. The wireless module 316 could also be an IEEE 802.11 or "WiFi" enabled chip to take advantage of the WiFi network provided by some newer cars or mobile hotspots. The wireless module 316 can allow reprogramming of the microcontroller 302 even if the strobe module 300 is installed in a location in the vehicle that is difficult to access.

The wireless module 316 may also be used to interface with Bluetooth® equipped LED modules installed in place of original incandescent LED signal or flasher lights. In such embodiments, the LED lights may behave as customary flashing signal or hazard lights unless instructed via the wireless module 316 to strobe. Naturally, such a solution requires additional circuitry at each LED or bulb location and may be more cumbersome to install and maintain. However, such a configuration would have the advantage of allowing the existing signal and hazard light switch gear to remain in place. In such an embodiment, some or all of the output signal block 308 of the strobe module 300 may be eliminated and the wiring passing to the signal or hazard lights may simply be a pass-through arrangement. The input for the microcontroller 302 may then be gathered from the analog input block 304 and/or BCM input block 306. A simple determination of which line or signal was active would be all that is needed in such an embodiment since the signal is passed "downstream" to the lights. The microcontroller 302 still determines whether to deploy a strobe or traditional flash based upon detection of whether a signal or hazard light was indicated. Further, in this and other embodiments, various capacities of the strobe module 300 might be turned on or off by a user via the wireless module 316.

Figure 4:
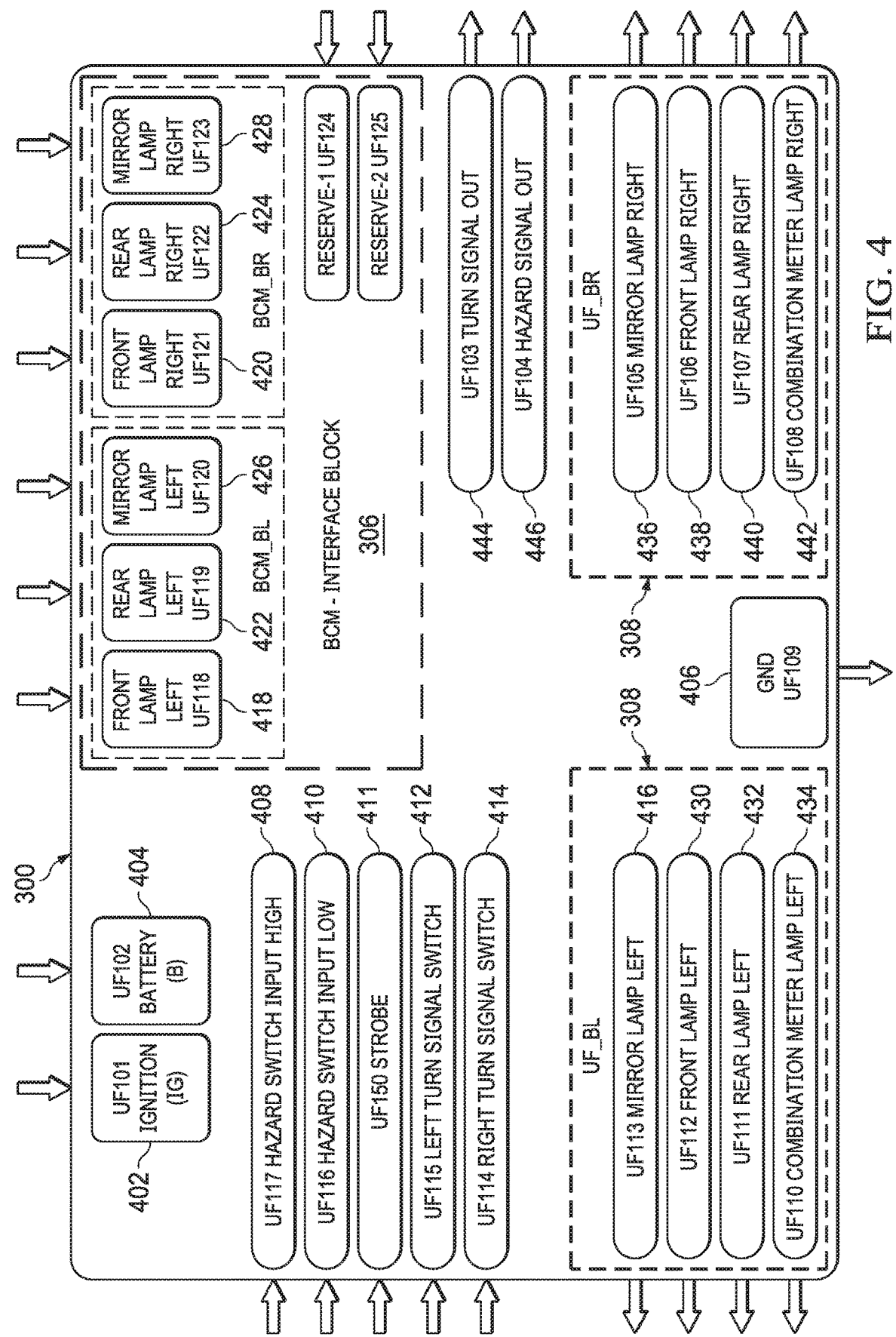
FIG. 4 is a schematic diagram input/output diagram of a strobe module according to aspects of the present disclosure.

Referring now to FIG. 4, a schematic input/output diagram of the strobe module 300 according to aspects of the present disclosure is shown. In FIG. 4, arrows around the periphery of the strobe module 300 indicate whether the associated connection is an input or output. For example, inputs received from existing vehicle controls (e.g., hazard switch input high 408) are shown with an inward facing arrow.

It will be appreciated that a number of existing vehicle signal and hazard light wiring schemes are in existence, whether on an analog basis or on the basis of utilizing a newer BCM. Accordingly, in order to work with a wide array of vehicles, various embodiments of the present disclosure may have different pinouts and wire compatibilities. In some embodiments, leads that are not used are simply ignored. However, where it is more economical to do so, various embodiments of the present disclosure may be built with only the ports, pins, and wiring needed for the immediate application for which it is intended. In such case, a fit-list might be developed alongside that specifies, for particular embodiments, those makes and models of vehicle with which it is compatible. After describing the inputs and outputs that are available, a number of examples are given below as to how various embodiments of the present disclosure are adapted to work with various wide spread wiring schemes currently in existence.

An ignition connection 402 may be provided as a part of the power supply module 310. The dashboard 202 provides indication to the microcontroller 302 that the vehicle is switched on (normally, signal lights do not deploy when the vehicle ignition is off, but hazard lights do). A separate connection to power, battery connection 404 is also provided and allows for deployment of certain functions (e.g., strobing hazard lights) when the ignition of off. The ignition connection 401 may also be part of the power supply module 310. A ground lead 406 is also provided. In some embodiments, ground is provided via the connector 214, but in other embodiments, it is a separately attached lead to the strobe module 300.

Forming a part of the analog input block 304 may be leads or connections for hazard switch input high 408, hazard switch input low 410, left turn signal switch 412, and right turn signal switch 414. Two hazard switch input options are provided to account for the fact that in some existing systems the existing relay is activated by providing a high voltage to the relay. In others, the activation lead remains high unless the relay is to be deployed to flash the hazard lights. In such case, a ground or low voltage signal indicates hazard deployment. By providing both hazard switch input high 408 and hazard switch input low 410 leads, the strobe module 300 is compatible with both types of systems.

The strobe module 300 can be programmed to be capable of multiple flashing and strobing patterns. For example, a single press of the existing hazard switch might be intended to signal the traditional slow cycling flash. A second press would be intended to select a high speed strobe. Therefore, when various embodiments of the strobe module 300 are installed, a driver or passenger can deploy hazard lights in the manner in which they are accustomed. This also eliminates the need for separate switches or controls to gain full functionality of what is considered a vehicle safety system.

Hazard switches on certain vehicles provide two discrete positions (high and low). Typically, hazard flashers in such systems are deployed when the button is pressed and then remains depressed. Such switches actually activate the existing flasher relay by operating as a power switch. A second press releases the switch to the high position and depowers the hazard lights. The strobe module 300 may still be configured to operate with such systems, even so far as providing both flashing and strobing, or multiple strobing patterns. The strobe module 300 in such case may be programmed to "count" the number of presses, or transitions from on to off and vice versa provided via the legacy two-position switch. Relying on the battery connection 404 and/or the on board battery to keep the microcontroller 302 and other components powered the strobe module 300 provides the programmed or desired operations notwithstanding that the existing relay may have been powered only by the power flowing through the existing switch.

The lead for the left turn signal switch 412 and the right turn signal switch 414 act to inform the strobe module 300 when left or right turn signals are activated. As described above, the strobe module 300 may activate the left or right turn signals in response to movement of the existing turn signal stalk in a manner that replicates the existing slower flash of the turn signals, or a strobing flash.

In embodiments where the strobe module 300 interfaces with a BCM, the BCM input block 306 provides a front left lamp input 418 and a front right lamp input 420. A rear left lamp input 422 and rear right lamp input 424 are also provided. If the vehicle is so equipped, a left mirror lamp input 426 and right mirror lamp input 428 may be provided as well. Since the BCM controls input or interface with the driver (e.g., via the turn signal stalk), the strobe module 300 may not receive any direct indication of the stalk position, nor of the position of the hazard light switch. Instead, the strobe module 300 may infer what the driver is doing based upon these inputs from the BCM. For example, if lights on one side or the other of the vehicle are activated based on the BCM inputs, the strobe module 300 simply replicates those outputs via the output signal block 308. On the other hand, where lights for both sides of the vehicle are activated at once, the hazard lights have been deployed. The strobe module 300 will then use the output signal block 308 to effect a strobe on the vehicle's signal lamps.

For ease of understanding, in FIG. 4, output signal block 308 is shown split into left and right components or left and right LED groups. Lights associated with the left side of the vehicle may be controlled by a left mirror lamp output 416, a front left lamp output 430, a rear left lamp output 432, and/or a combination meter left output 434. The output signal block 308 has a similar set of outputs for the right side of the vehicle including a right mirror lamp output 436, a right front lamp output 438, a rear right lamp output 440, and/or a combination meter right output 442. It is understood that not all of these outputs will be employed in every installation or in every embodiment of the strobe module 300. For example, if a vehicle does not have a lamp associated with the left hand mirror, the left mirror lamp output 416 will be absent, or simply left unconnected. It is also understood that each of these outputs are equipped with whatever additional circuitry is needed to adequately drive the associated LEDs being activated.

The strobe module 300 also provides two additional signal outputs that are utilized with certain existing vehicle wiring systems as will be explained below. These include a turn signal out indicator 444 and a hazard signal out indicator 446. The signals output on the turn signal out indicator 444 and hazard signal out indicator 446 are controlled by the microcontroller 302 as with the other outputs.

The strobe module 300 may also provide for a strobe input 411 that may be interfaced with, for example, strobe switch 207. The strobe switch 207 may provide an input to the strobe module indicating that the hazard lights should be operated in a strobing fashion rather than a slower flashing fashion. The strobe input 411 may also be connected to an existing vehicle safety system (e.g., ABS, anti-skid, airbags, etc.) such that strobing is automatically activated.

Figure 5:
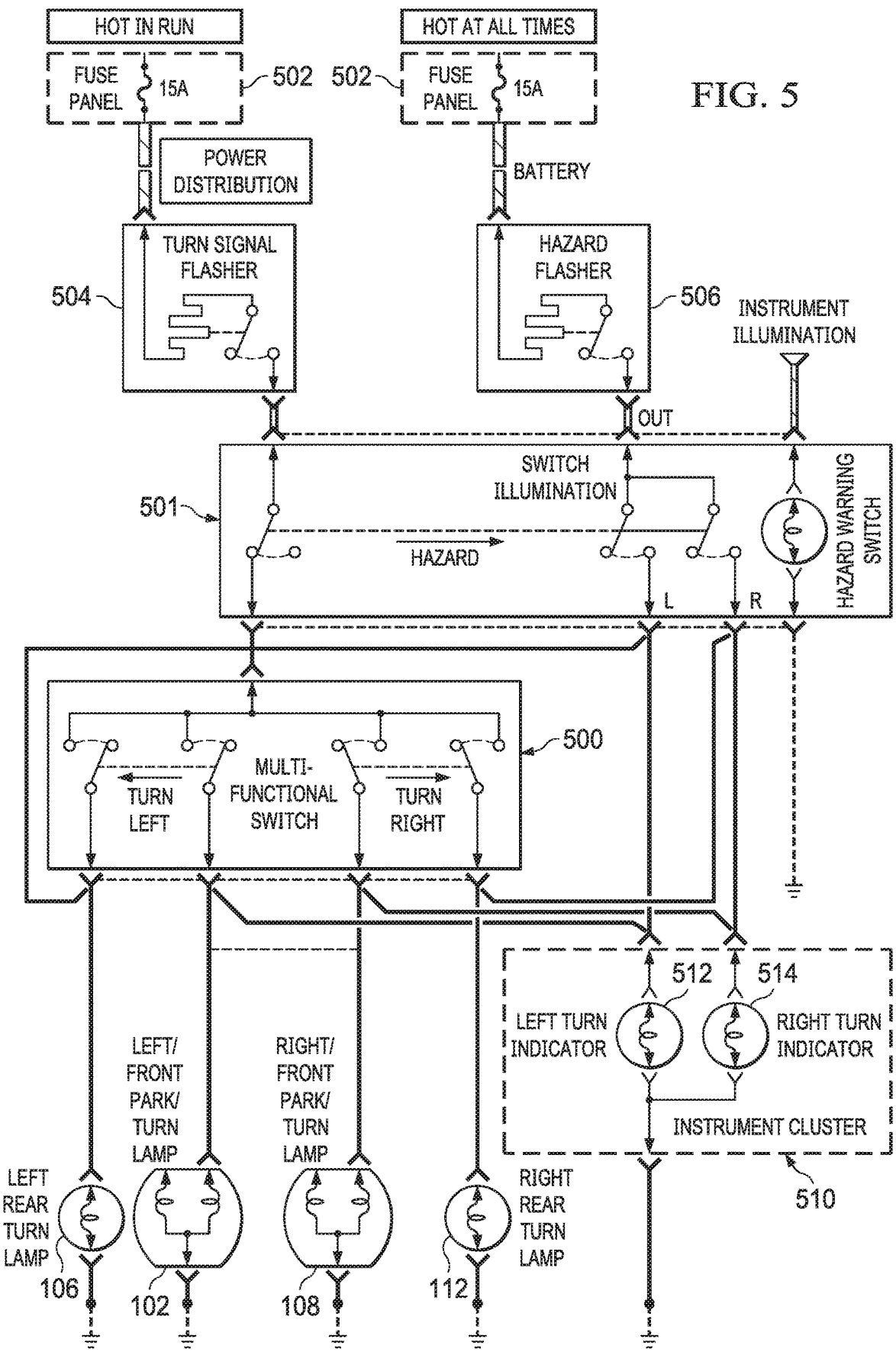
FIG. 5 is a wiring diagram of a two-pin flasher system.

Referring now to FIG. 5, a wiring diagram of a two-pin flasher system is shown. The system shown in FIG. 5 is an existing two-pin flasher system and is denoted as such in the present disclosure by virtue of the fact that the existing hazard flasher 506 interacts with the remainder of the system via only two-pins as explained herein. In the present case, the two pins represent an input from power and an output to the light or lights to be flashed. It should also be understood that other configurations for two-pin flasher systems may also exist. The system of FIG. 5 utilizes a pair of similar thermal cycling switches 504, 506 that control turn signals and hazard flashers, respectively. The turn signal flasher 504 may connect to power via fuse box 502 and be wired such that power is available only when the associated vehicle ignition switch is turned on. The hazard flasher 506 may be connected to fuse panel 502 such that power is continuously available to the hazard flasher 506. Activation of the hazard flasher may be controlled by switch 501 which begins thermal cycling of the hazard flasher 506 providing power and illumination to left rear lamp 106, left front indicator light 102, right front indicator light 108, and right rear indicator light 112. An instrument cluster 510 may be provided with a left turn indicator 512 and a right turn indicator 514. When the circuit has been placed under control of the hazard flasher 506 by the switch 501, both of the turn indicators 512, 514 may flash periodically in unison. Where the turn signals are also utilized as hazard flashers, a multifunction switch 500 may be provided for turning on and off the turn signal flasher 504 as well as directing current to the appropriate lamps on the right or left side of the vehicle.

Figure 6A:
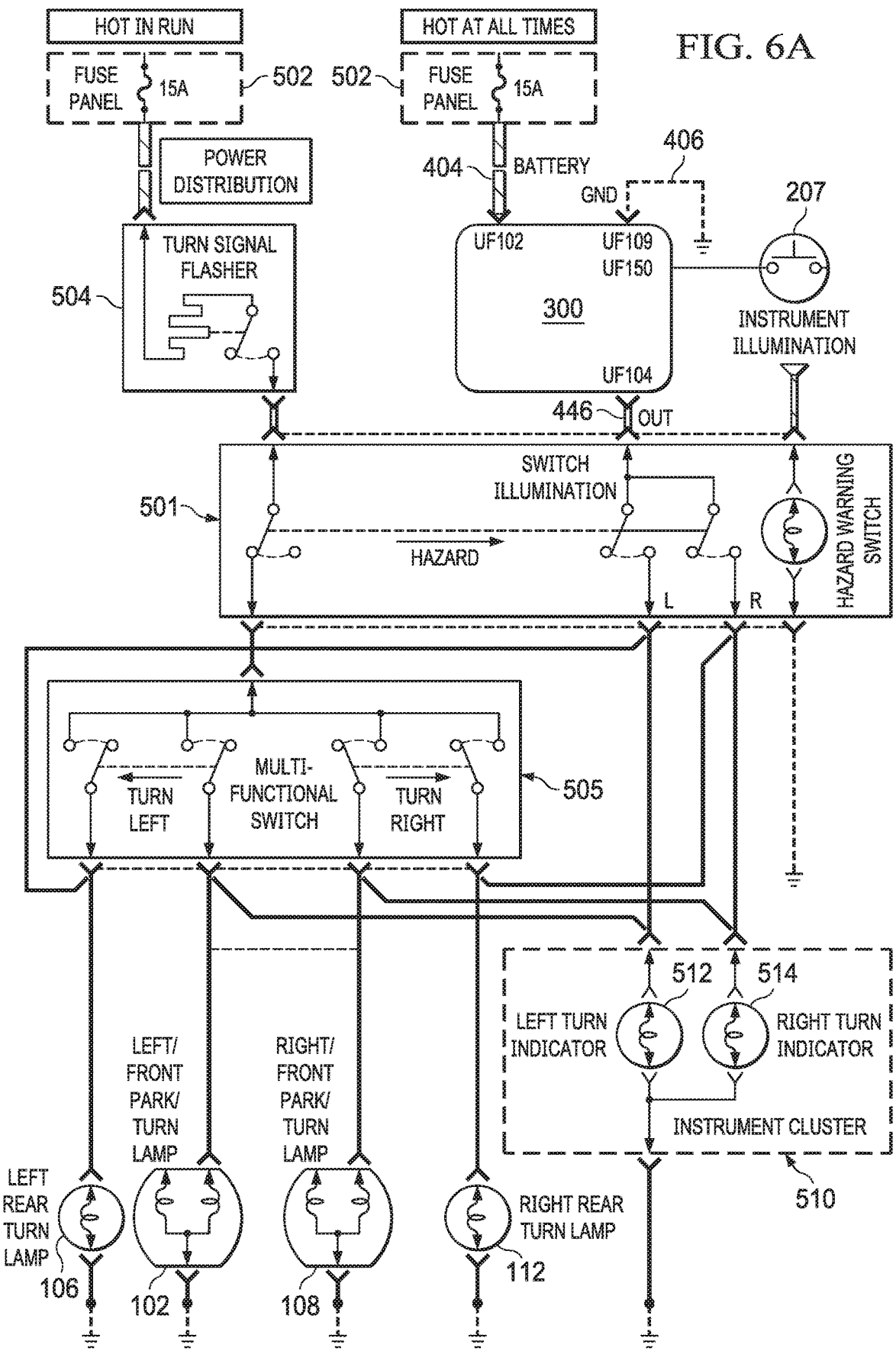
FIG. 6A is a wiring diagram showing an embodiment of a strobe module according to aspects of the present disclosure installed into the generic two-pin flasher system of FIG. 5.

Referring now to FIG. 6A, a wiring diagram showing an embodiment of a strobe module 300 according to aspects of the present disclosure installed into the two-pin flasher system of FIG. 5 is shown. Here, the existing thermal hazard flasher 506 has been replaced with the strobe module 300 of the present disclosure. As mentioned above, the strobe module 300 in the present embodiment interacts with the existing system via only two-pins. In the present embodiment, the additional the ground lead is utilized 406. The remaining inputs and outputs of the strobe module 300 (e.g., described with respect to FIG. 4) may be left unused or the strobe module 300 may be manufactured only with the inputs and outputs needed. In the configuration of FIG. 6A, when the hazard switch 501 is activated, the strobe module 300 will drive the signal lamps at a strobing rate previously described. Thus, in the present configuration, the strobe module 300 stands in for the replaced hazard flasher 506.

Figure 6B:
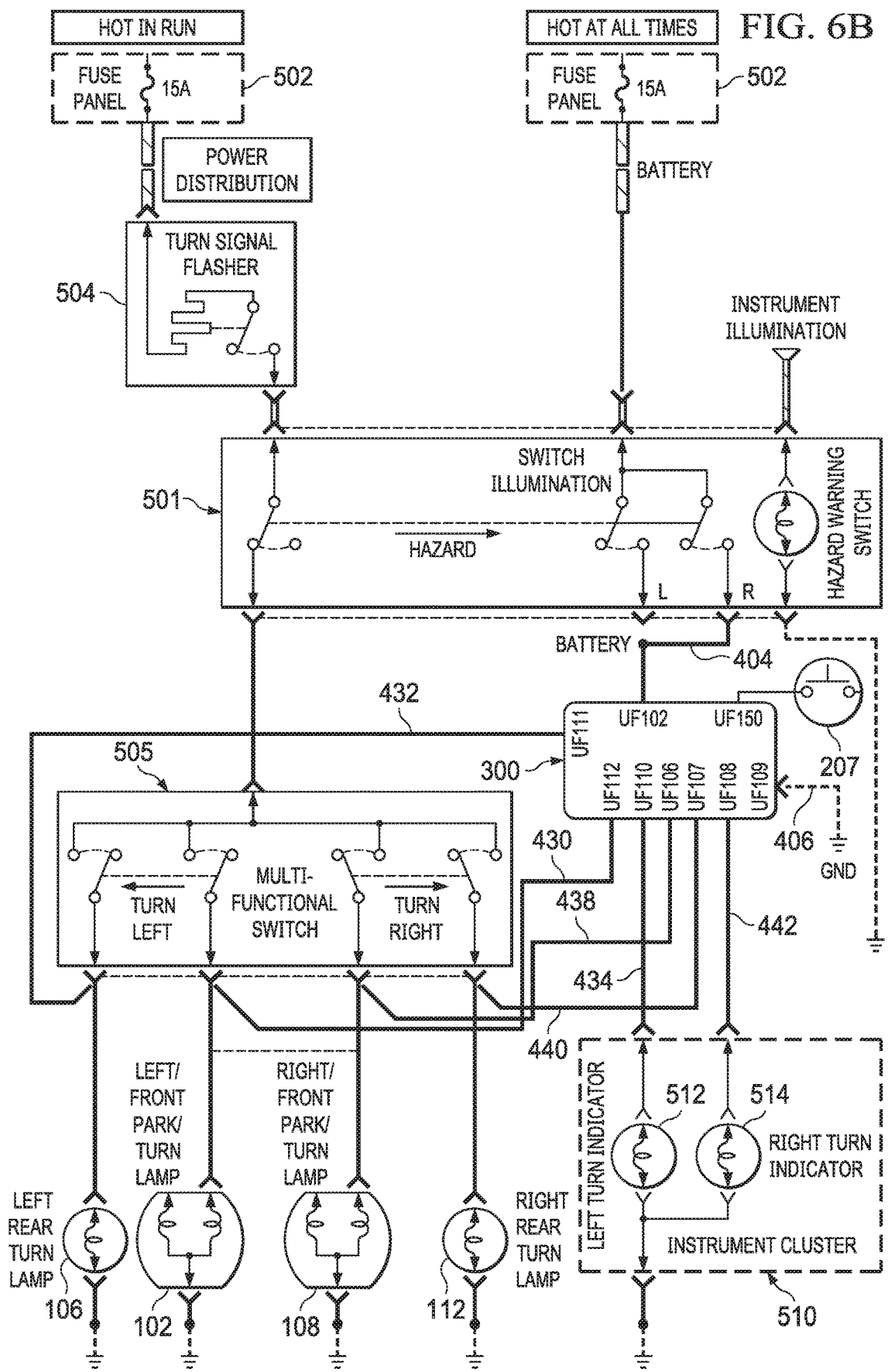
FIG. 6B is a wiring diagram showing an embodiment of a strobe module according to aspects of the present disclosure installed into the generic two-pin flasher system of FIG. 5 in a different manner.

Referring now to FIG. 6B, a wiring diagram showing an embodiment of the strobe module 300 installed differently into a two-pin flasher system is shown. One advantage of installing the strobe module 300 in the manner shown in FIG. 6B is that the strobe module 300 is only connected to battery power when activated by the hazard switch 501. This can prevent a potential drain on the vehicle battery that could result from the continuous operation of the internal microcontroller and other components of the strobe module 300. Here, outputs from the switch 501 selectively connect the battery connection 404 of the strobe module 300 to the power. When the strobe module 300 in the present configuration is provided with power, the front left lamp output 430, rear left lamp output 432, front right lamp output 438, and rear right lamp output 440 are utilized to drive the individual respective front and rear turn signals rather than driving all of them simultaneously via the hazard signal out indicator 446 (which is unused in the configuration of FIG. 6B). Left meter output 434 may be utilized to drive the left turn indicator 512 and the right meter output 442 may be used to drive the right turn indicator 540. Strobe switch 207 may be separately connected directly to the strobe module 300 from its driver or passenger accessible mounting location inside the vehicle.

Figure 7:
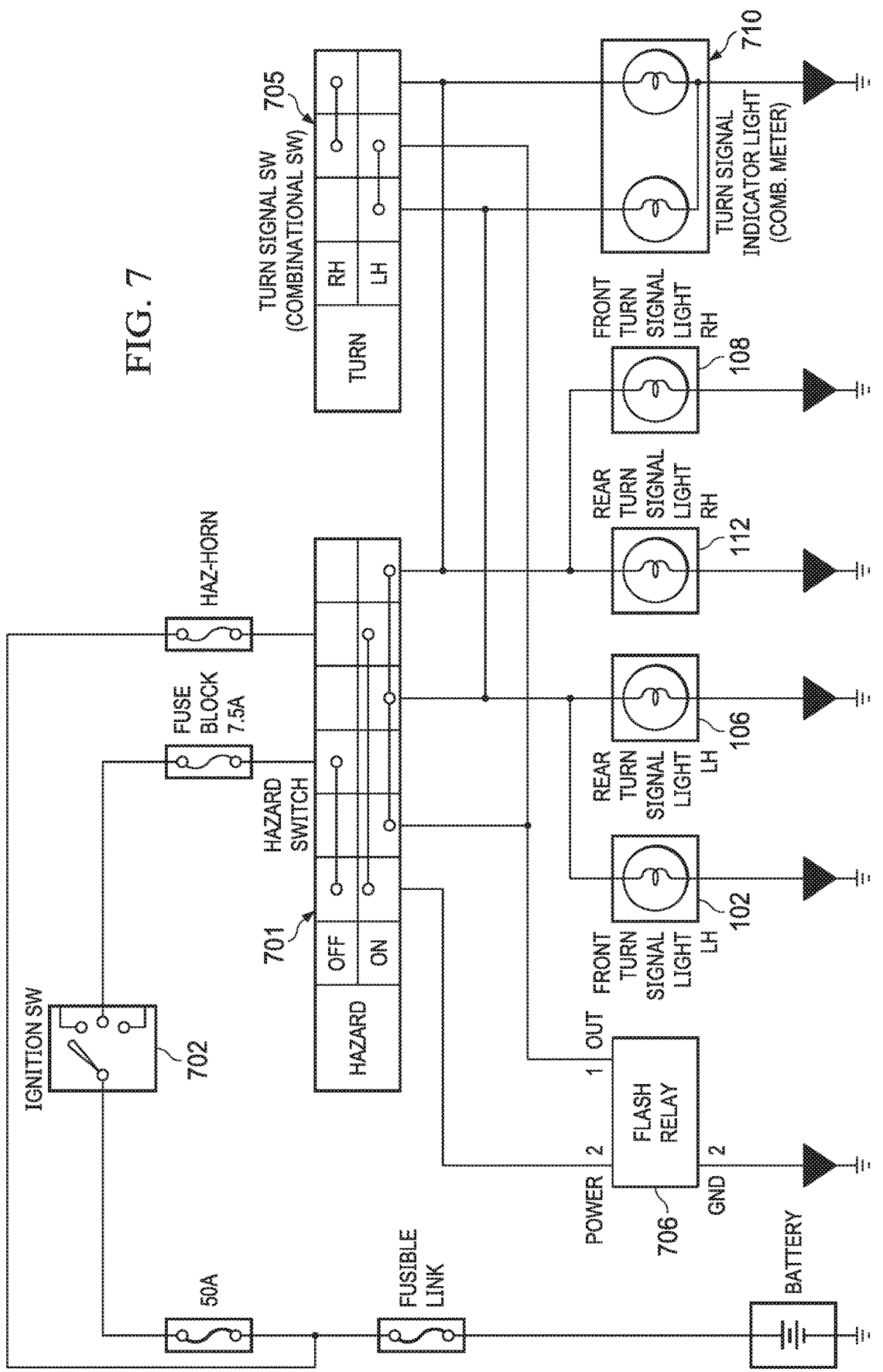
FIG. 7 is a wiring diagram of a three-pin flasher system.

Referring now to FIG. 7, a wiring diagram of a three-pin flasher system is shown. It should be understood that the three-pin flasher system of FIG. 7 is only an example and that other three-pin flasher systems may exist. In the three-pin flasher system, the existing flash relay 706 provides cycling power on an output based upon a setting of an ignition switch 702 and a hazard switch 701. Three-pin flasher systems generally provide at least a front left turn signal 102, a rear left signal 106, a front right signal 108, and a right rear signal 112. A turn signal indicator 710 may also be provided. Under normal operation the turn signals are controlled by the turn signal switch 705 which may comprise a turn signal stalk next to a steering wheel. When power is on at the ignition switch 702, the left or right side signal lights may be periodically activated via the flash relay 706. The hazard switch 701 may be utilized to provide a cyclic flash via the flash relay 706 to all of the signal lights.

Figure 8:
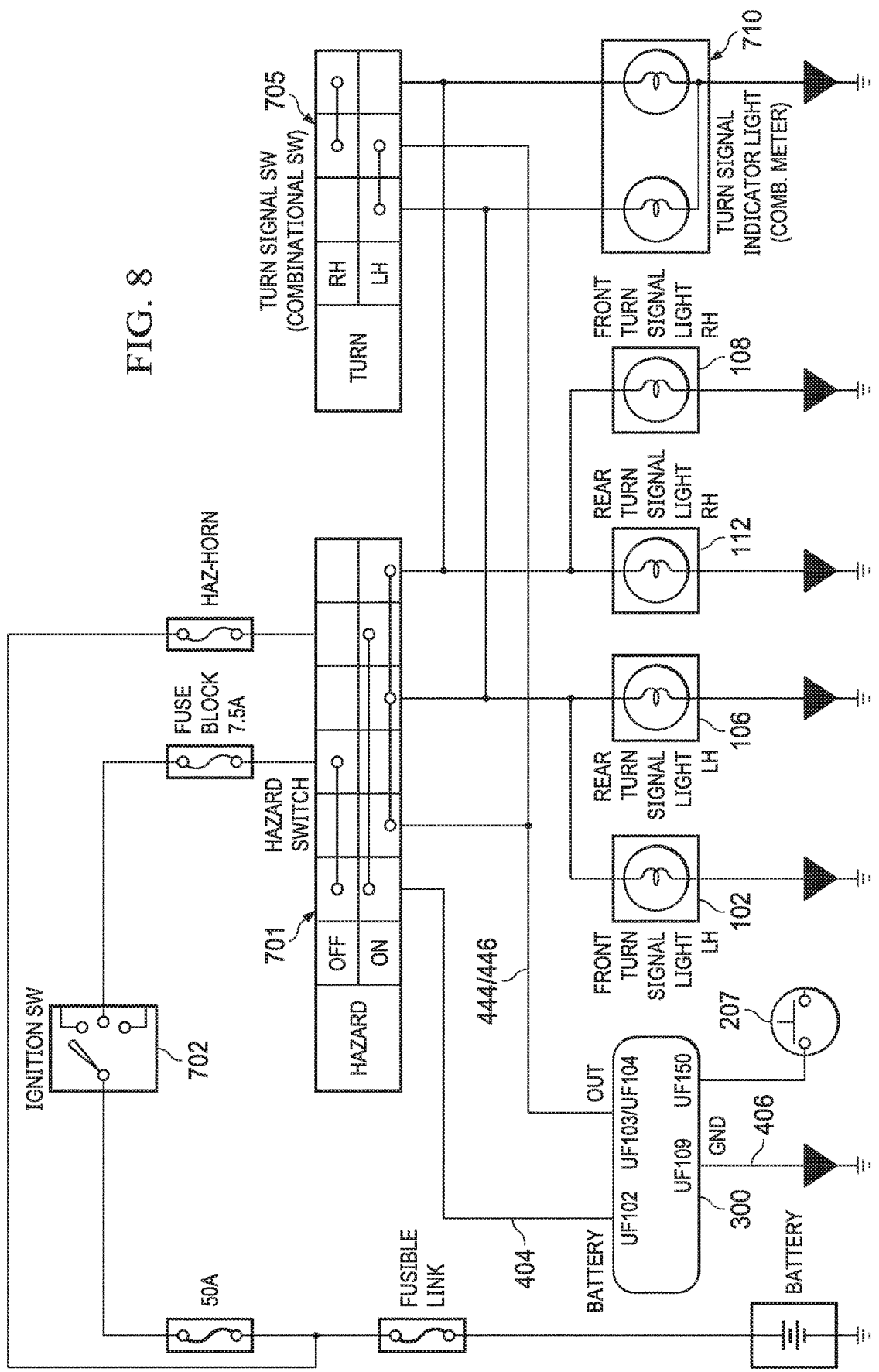
FIG. 8 is a wiring diagram showing an embodiment of a strobe module according to aspects of the present disclosure installed into the three-pin flasher system of FIG. 7.

Referring now to FIG. 8, a wiring diagram showing an embodiment of a strobe module 300 according to aspects of the present disclosure installed into the three-pin flasher system of FIG. 7 is shown. Here, the flash relay 706 has been replaced by the strobe module 300 of the present disclosure. The battery lead 404 is connected to the hazard switch 701 and the signal out indicator 444 and the hazard signal out indicator 446 are connected both into the relay system of the hazard switch 701 and the turn signal switch 705. This allows the strobe module 300 to serve as the provider of both strobing effects when the hazard switch 701 is activated and as a signaling light provider when the turn signal switch 705 is activated. Strobe switch 207 may be separately connected directly to the strobe module 300 from its driver or passenger accessible mounting location inside the vehicle.

Figure 9:
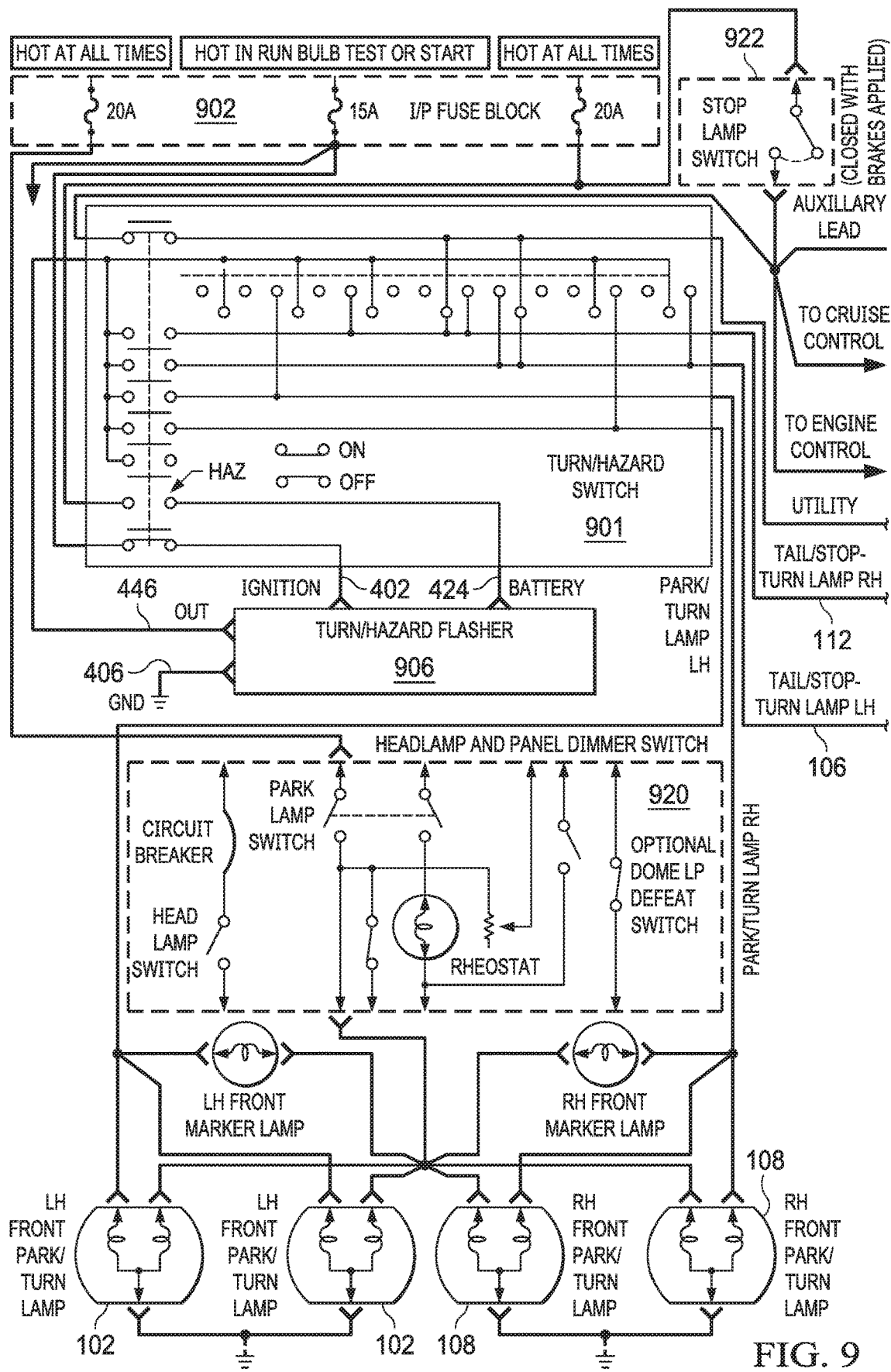
FIG. 9 is a wiring diagram of a four-pin flasher system.

Referring now to FIG. 9, a wiring diagram of a four-pin flasher system is shown. With the four-pin flasher system the existing flasher device 906 interacts with the remainder of the system via four separate pins. The system of FIG. 9 is more complex than those previously discussed and a single switch 901 may be utilized to activate both signal lights and hazard lights. This may be powered via a fuse block 902 providing both full time power and intermittent power based on the position of the ignition switch. Some four-pin flasher systems utilize two left front turn signals or indicator lights 102 and two right front turn signals or indicator lights 108. Single right rear turn signals 112 and left rear turn signals 106 are utilized. Each of these may be wired into the combination switch 901. However, the flashing of the signal lights is controlled by the existing flasher 906.

Figure 10:
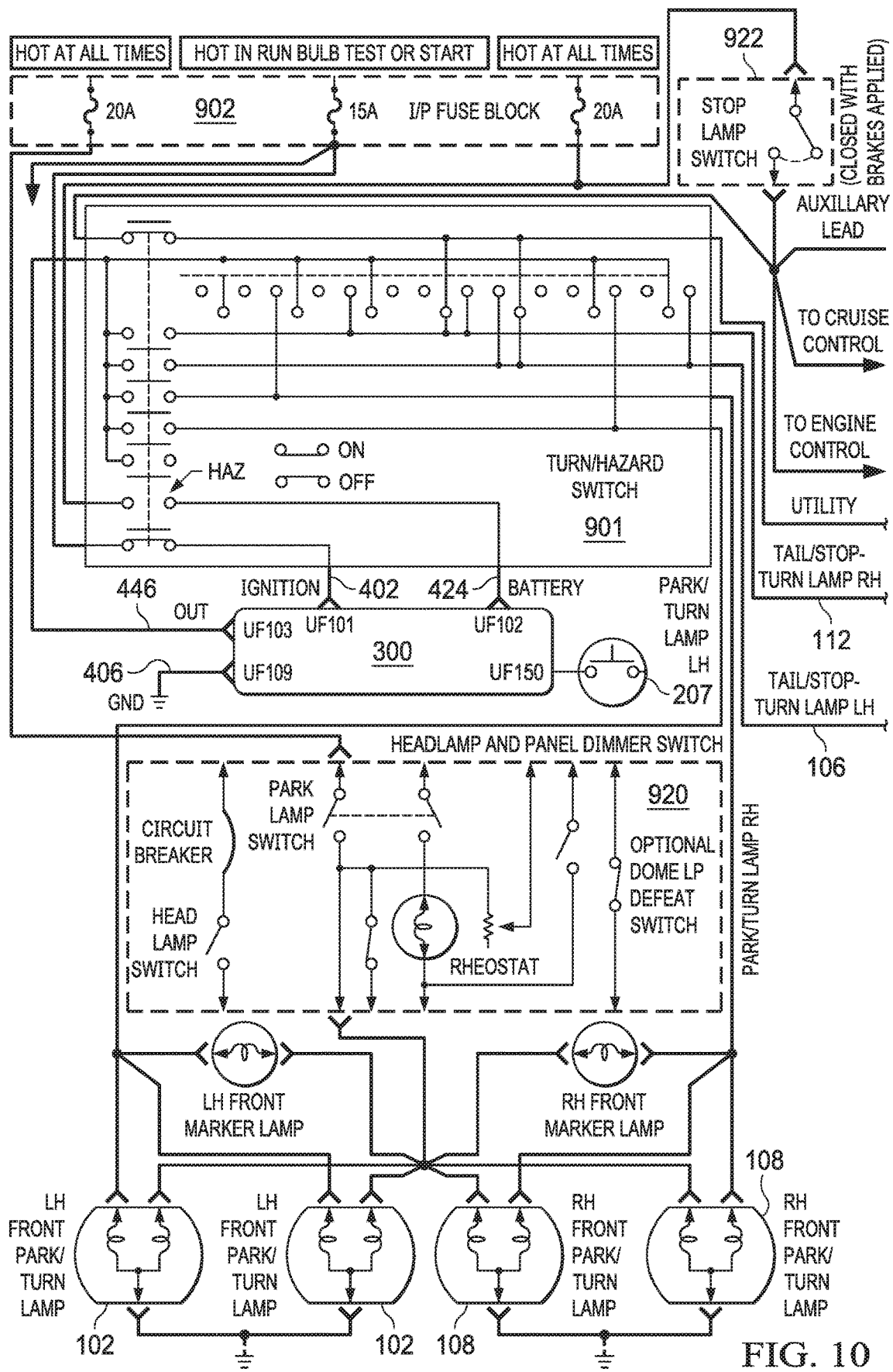
FIG. 10 is a wiring diagram showing an embodiment of a strobe module according to aspects of the present disclosure installed into the four-pin flasher system of FIG. 9.

Referring now to FIG. 10, a wiring diagram showing placement of the strobe module 300 of the present disclosure into the four-pin flasher system of FIG. 9 is shown. Here, the strobe module 300 is connected via the combination switch 901 both on the ignition connection 402 and the battery connection 404. Indication to activate hazard lights by the combination switch 901 activates both the battery connection 404 and the ignition connection 402 of the strobe module 300. In turn, the strobe module 300 provides a strobing signal on hazard signal out indicator 446. The hazard signal out indicator 446, having been connected in place of the previous flash output, will cause the associated signal lights to be driven in the previously described strobing fashion. Strobe switch 207 may be separately connected directly to the strobe module 300 from its driver or passenger accessible mounting location inside the vehicle.

Figure 11:
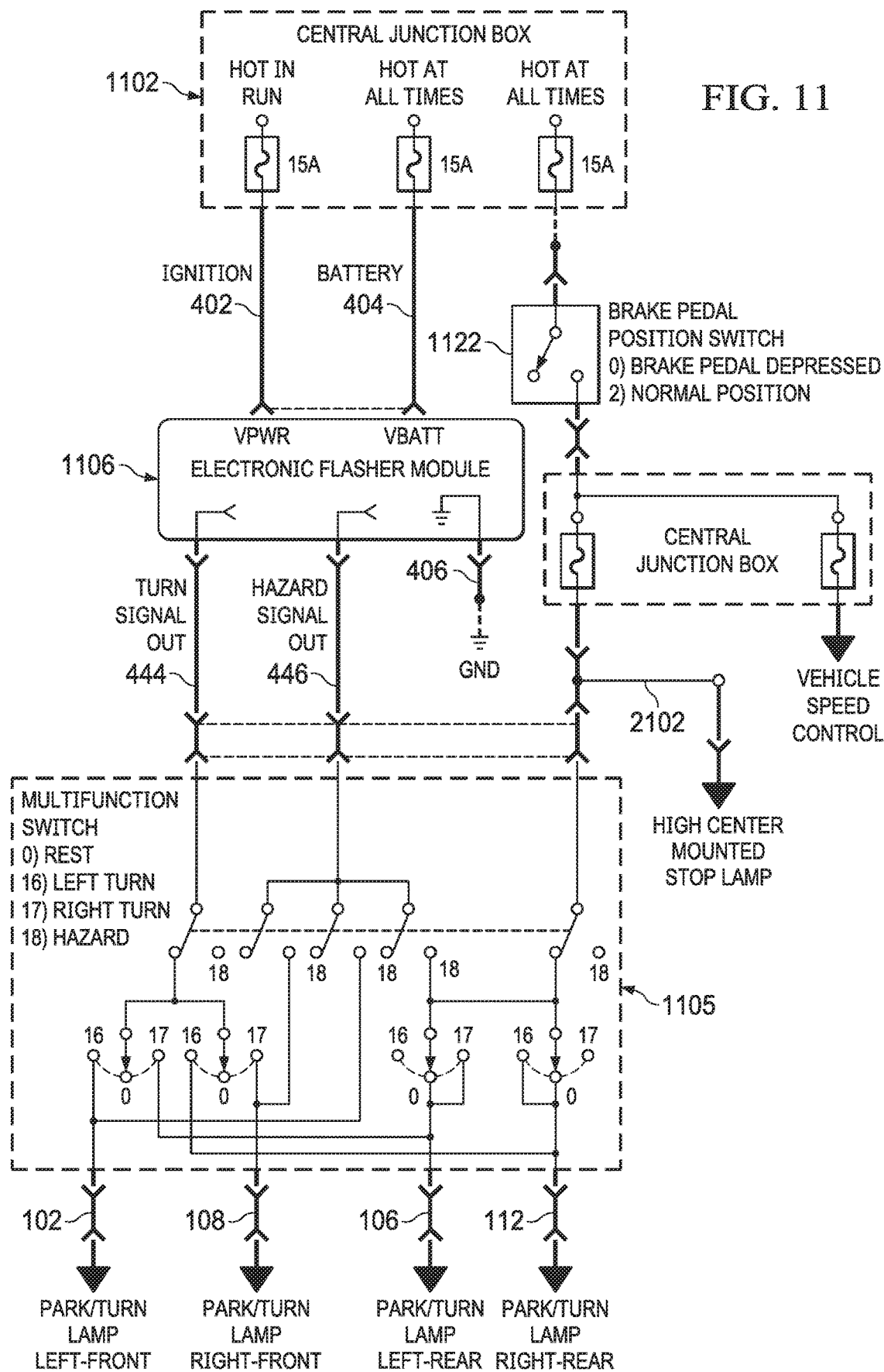
FIG. 11 is a wiring diagram of a five-pin flasher system.

Referring now to FIG. 11, a wiring diagram of a five-pin flasher system is shown. Five-pin flasher systems provide five-pin connections to an existing flasher module 1106. As of previous embodiments a fuse box 1102 may be connected to the existing flasher module 1106 to provide power both when the ignition is on, as well as a full time connection. The existing flasher module 1106 controls the flashing of both the turn signals and the hazard flashers based on position information received from a multi-function switch 1105. The multi-function switch 1105 provides selective power to some or all of the left front signal light 102, the right front signal light 108, the left rear signal light 106, and the right rear signal light 112.

Figure 12:
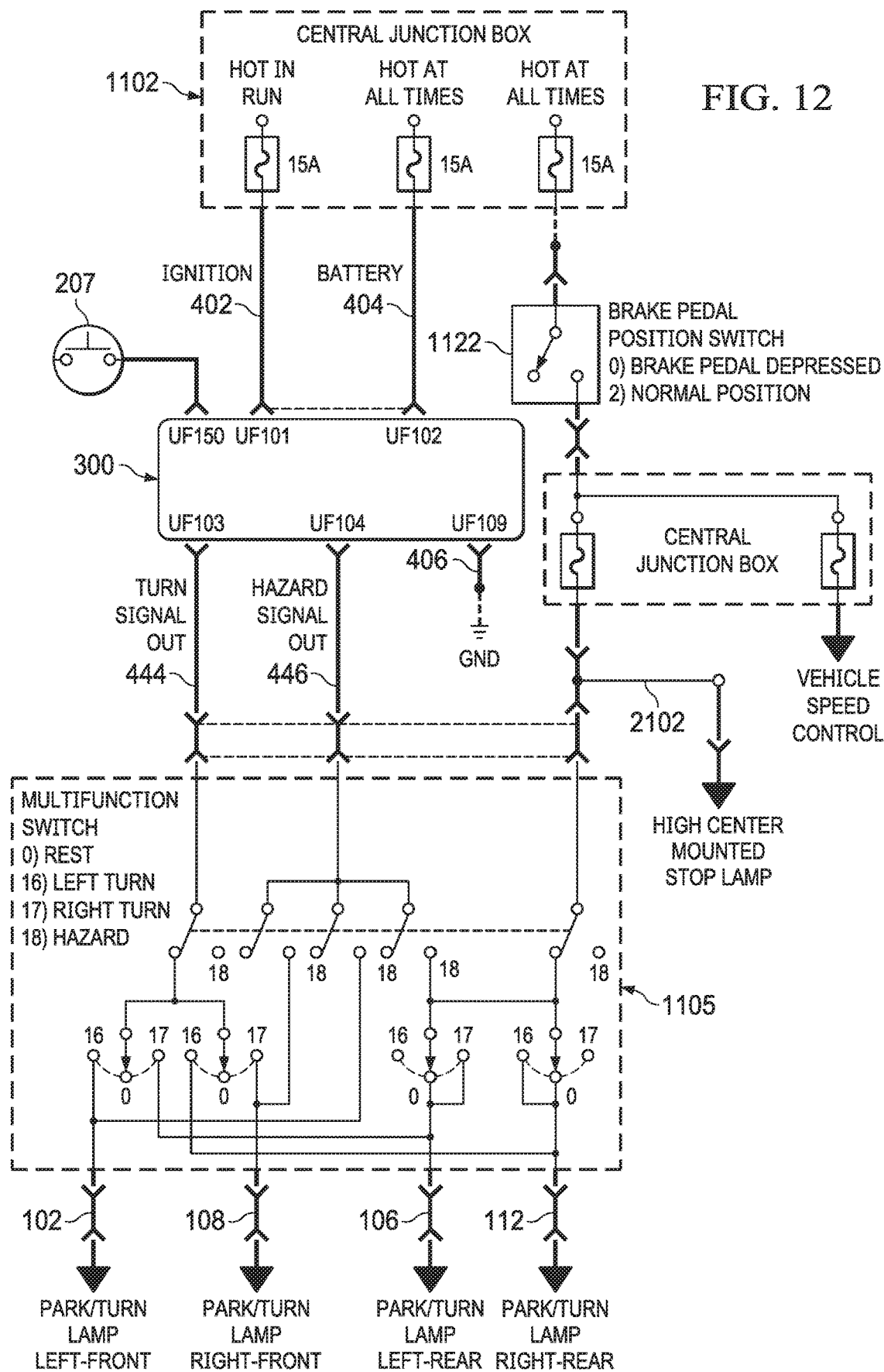
FIG. 12 is a wiring diagram showing an embodiment of a strobe module according to aspects of the present disclosure installed into the five-pin flasher system of FIG. 11.

Referring now to FIG. 12, the five-pin flasher system of FIG. 11 is shown with the strobe module 300 of the present disclosure inserted therein. The strobe module 300 takes the place of the flasher module 1106 of the existing system. When the ignition connection 402 and the battery connection 404 are both powered, the strobe module 300 provides strobing outputs on the hazard signal output 446 and may provide a signal output on the turn signal output 444. As before, the multi-function switch 1105 is wired to determine which of the signal lamps receive the respective signal from the strobe module 300. Strobe switch 207 may be separately connected directly to the strobe module 300 from its driver or passenger accessible mounting location inside the vehicle.

Figure 13:
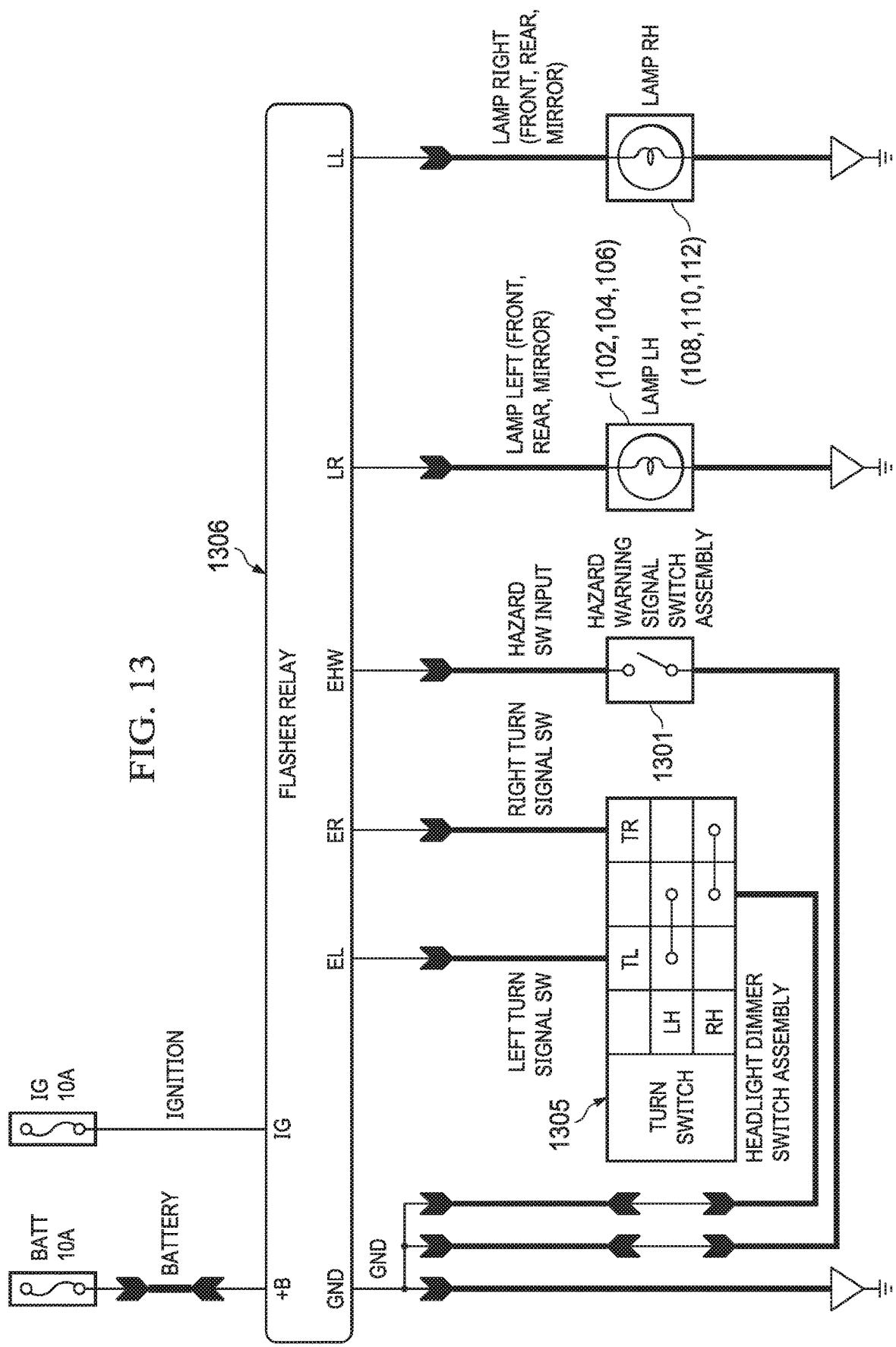
FIG. 13 is a wiring diagram of an eight-pin flasher system.

Referring now to FIG. 13, a wiring diagram of an eight-pin flasher system is shown. The eight-pin flasher system of FIG. 13 interacts with the existing flasher relay 1306 via eight separate pins. A turn switch 1305, which may be associated with a steering column mounted stalk, signals to the existing flasher relay 1306 whether a left or right turn signal has been activated. The existing relay then provides the appropriate flashing output on either the left or right side signal lights. A separate hazard flasher switch 1301 indicates to the existing flasher relay 1306 when a hazard condition has been signaled in the flasher relay 1306 illuminates all of the signal lights in the traditional flashing manner.

Figure 14:
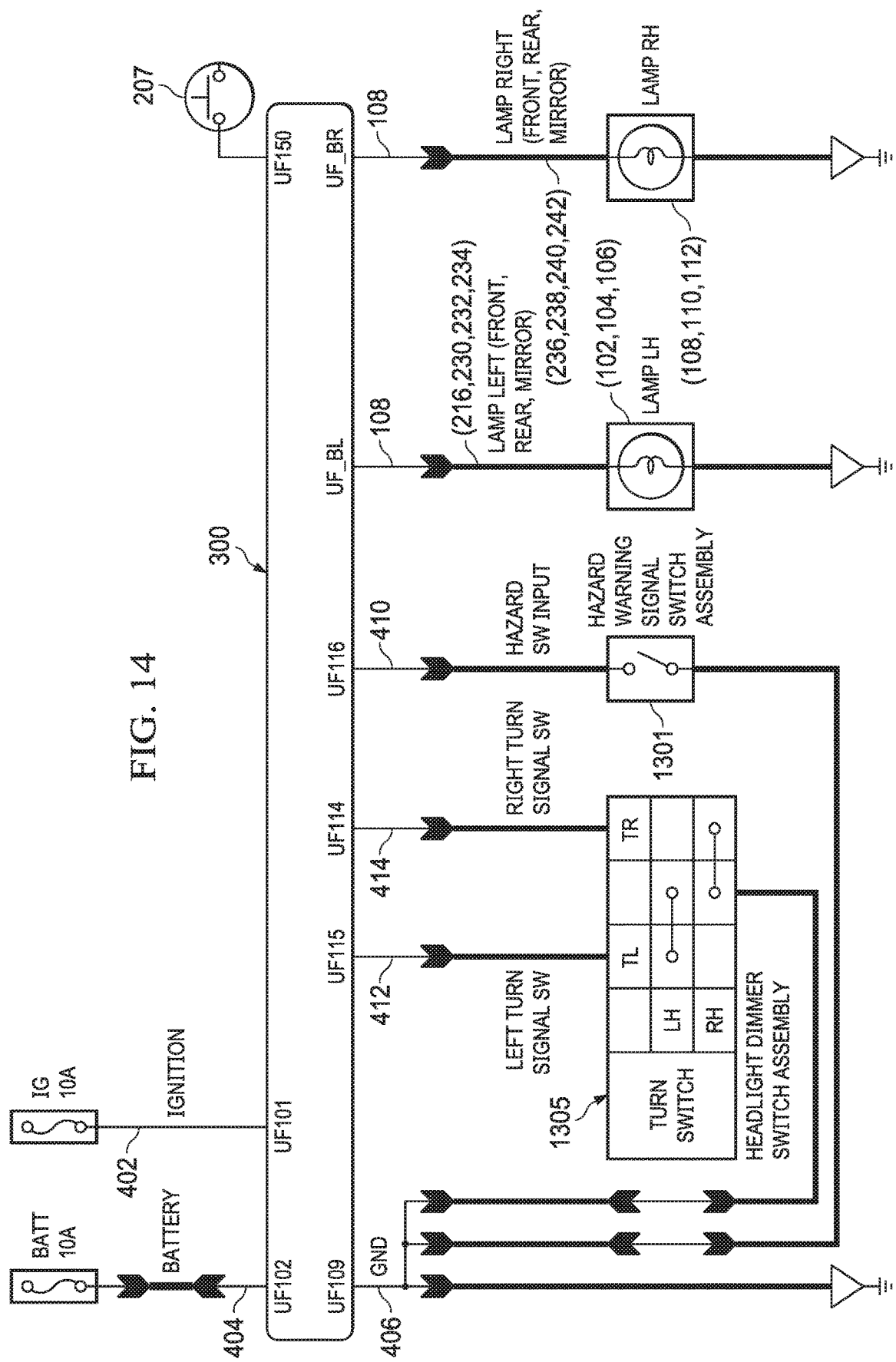
FIG. 14 is a wiring diagram showing an embodiment of a strobe module according to aspects of the present disclosure installed into the eight-pin flasher system of FIG. 13.

Referring now to FIG. 14, a wiring diagram showing the eight-pin flasher system of FIG. 13 equipped with a strobe module 300 according to aspects of the present disclosure is shown. Here, the strobe module 300 is connected to an ignition power switch via ignition connection 402 and is connected to the battery via battery connection 404. The ground connection 406 is also utilized. Outputs from the existing turn signal switch 1305 are provided in the case of the left turn signal to the left turn signal switch input 412 and in the case of the right turn signal to the right turn signal input 414. The separate hazard switch input low 410 is provided since the shown eight-pin flasher system activates the hazard flasher by grounding the pin. Based upon the signal received on inputs 412, 414, 410, the strobe module 300 acts either as a turn signal activating only the left or right side lights or acts as a flash module and provides a strobing output on all of the signal lights. These may include left side lamps 102, 104, 106 and right side lamps 108, 110, 112. It will be appreciated that the strobe module 300 may have outputs dedicated to each of the individual lamp positions as previously described. These may each be used or only one may be used for each side of the vehicle. Strobe switch 207 may be separately connected directly to the strobe module 300 from its driver or passenger accessible mounting location inside the vehicle.

Figure 15:
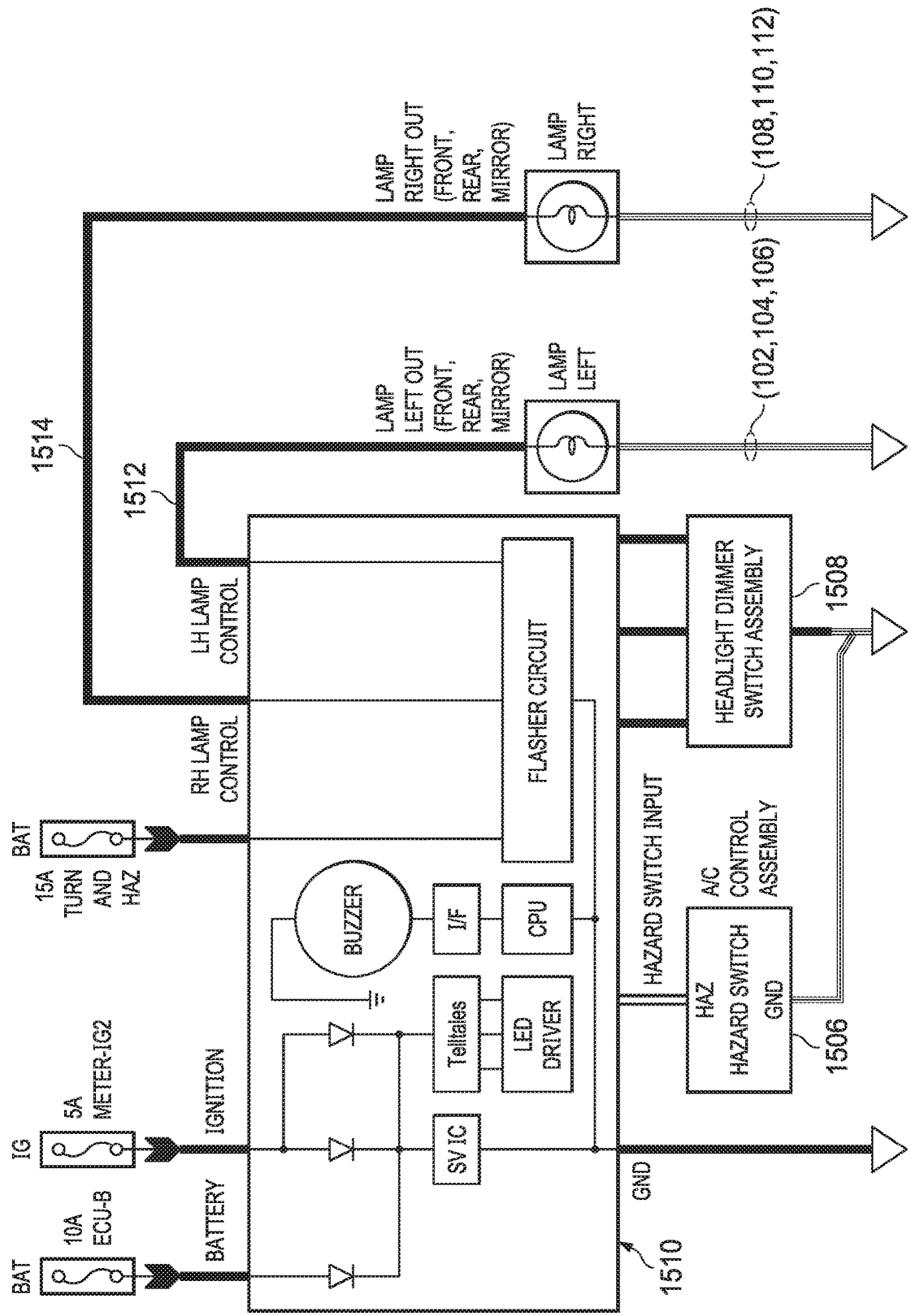
FIG. 15 is a wiring diagram of a flasher system controlled by a body control module (BCM).

Referring now to FIG. 15, a wiring diagram of a flasher system controlled by a BCM is shown. As previously described, BCM systems are not necessarily well documented. However, based on functions provided by various BCMs, certain internal components are known (for example, as shown, interior to BCM 1510). Typically, a BCM will receive inputs both from a hazard switch 1506 as well as turn signal indicators. Left side outputs 1512 controls the left side lamps 102, 104, 106 and a right side output 1514 may control right side lamps 108, 110, 112.

Figure 16A:
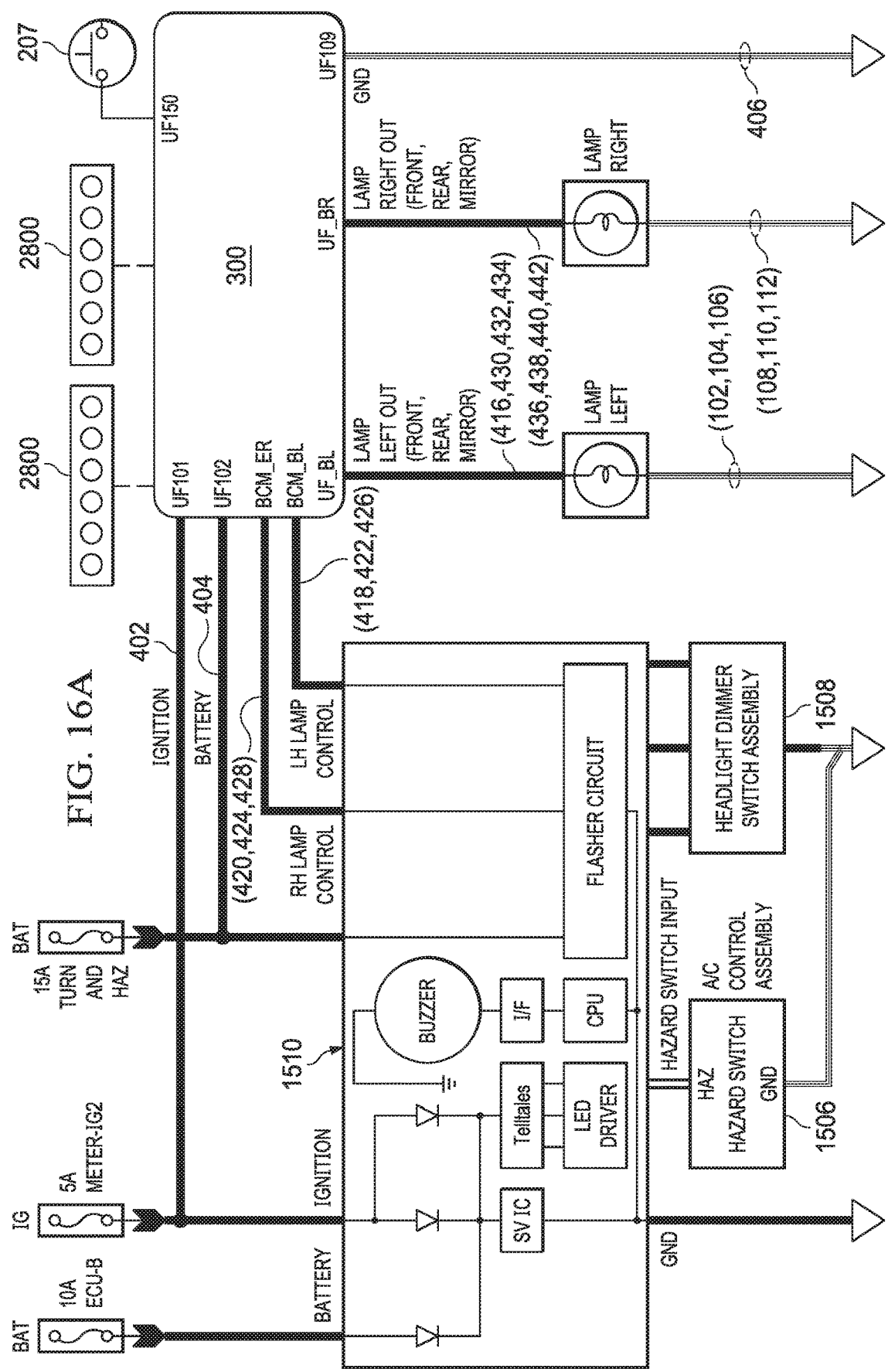
FIG. 16A is a wiring diagram showing an embodiment of a strobe module installed into the BCM controlled flasher system of FIG. 15.

Referring now to FIG. 16A, a wiring diagram showing the strobe module 300 of the present disclosure installed in a BCM system is shown. In the installation of FIG. 16A, the strobe module 300 may be required to be separately connected to the ignition by the ignition connection 402 and to the battery by the battery connection 404. The strobe module 300 then intercepts the output from the BCM 1510 to determine when signal lights or hazard lights have been activated. All or only part of the connections available on the BCM input block 306 may be utilized. These may include a front left lamp input 418, a rear left lamp input 422, a left mirror lamp input 426, as well as the corresponding inputs on the right side of the vehicle such as the front right lamp input 414, the rear right lamp input 422, and the right mirror lamp input 428. Similarly, depending upon the particular configuration all or perhaps only some of the lamp driving outputs of the strobe module 300 may be utilized. For example, regarding the left side of the vehicle, the left mirror lamp output 416, the front left lamp output 430, the rear left lamp output 432, and/or the meter output 434 may be utilized. With regard to the right side of the vehicle, the right mirror lamp output 436, the right front lamp output 438, the right rear lamp output 440, and/or the meter output 442 may be utilized. Lamps may include but are not limited to the left front lamp 102, left mirror lamp 104, and left rear lamp 106. On the right side, the lamps may include but are not limited to the front right lamp 108, the front mirror lamp 110, and the right rear lamp 112. Strobe switch 207 may be separately connected directly to the strobe module 300 from its driver or passenger accessible mounting location inside the vehicle.

Figure 16B:
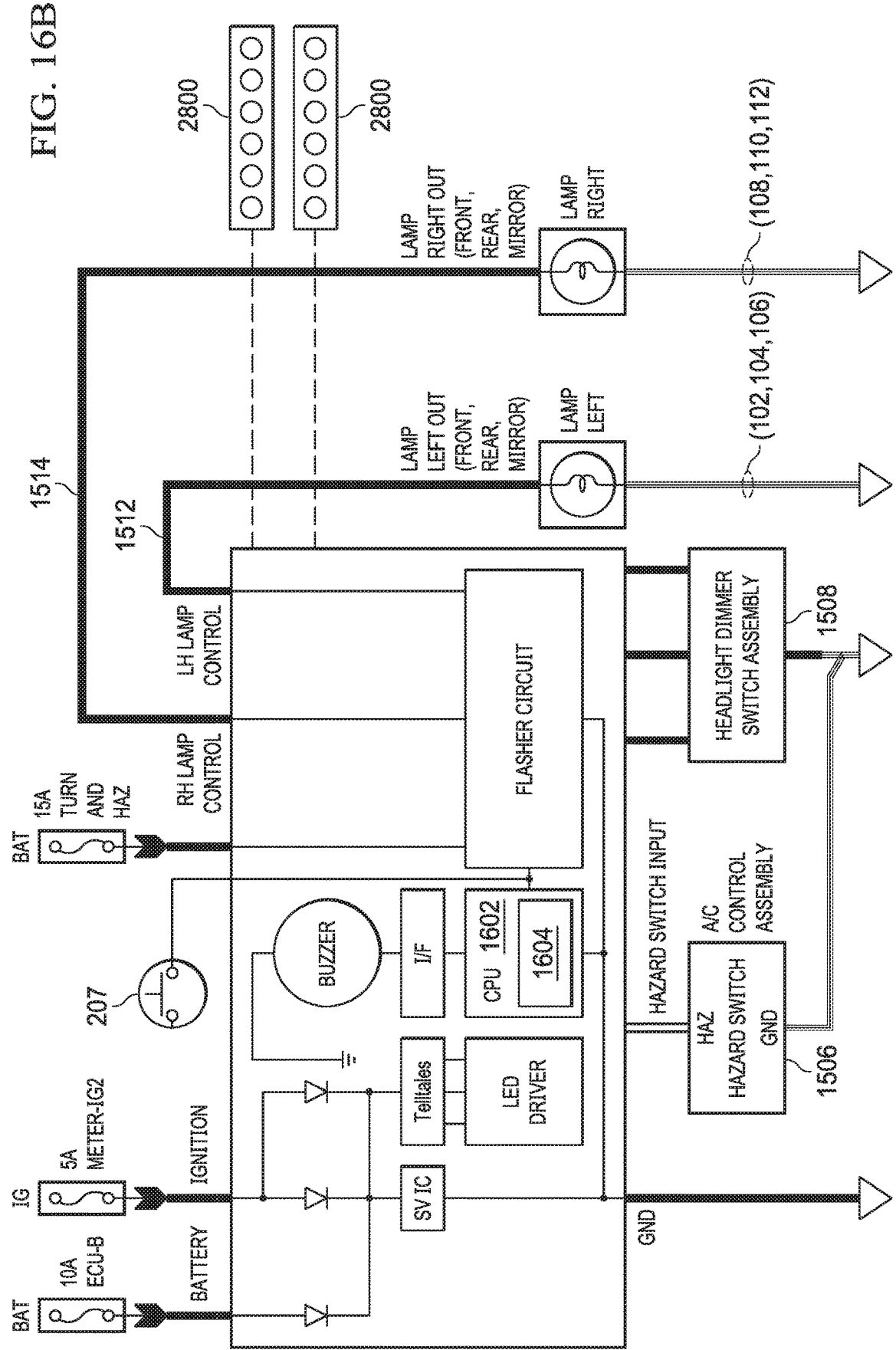
FIG. 16B is a wiring diagram showing an embodiment of a strobe module installed into the BCM controlled flasher system of FIG. 15 via modification of a microcontroller.

Referring now to FIG. 16B, a wiring diagram showing an embodiment of a strobe module installed into the BCM controlled flasher system of FIG. 15 via modification of a microcontroller. As previously described, and as known to those of skill in the art, the BCM 1510 may comprise one or more microcontrollers or central processing units 1602. The CPU 1602 may execute the logic associated with the various functions of the BCM including, but not limited to, operation of the signal lights and hazard lights. Here, the BCM 1502 is configured to directly control the strobing functions of the hazard lights as described herein (in contrast to the system of FIG. 16A where the strobing functions are implemented "downstream" of the BCM). This may be accomplished by an auxiliary chip 1604 that may contain memory and instructions for proper timing of the hazard lights (e.g., a strobe effect or effects). Such an auxiliary chip 1604 may be wired to the BCM 1510 or CPU 1602 directly or may communicate with the BCM 1510 or CPU 1602 via a bus (not shown) such as a controller area network (CAN) bus (many vehicles today are already equipped with a CAN bus). In another embodiment, additional chips or memories are not needed as the BCM 1510 contains all of the necessary logic and timing information to drive the vehicle lights in a strobing fashion in response to inputs from the hazard switch and/or signal stalk.

In some embodiments, the strobe switch 207 may be separately connected and configured to communicated with the BCM 300, the CPU 1602, and/or any auxiliary chip 1604 that may be present. This may require providing one or more leads from the strobe switch 207 to the respective controller. In other embodiments the strobe switch 207 may communicate via CAN bus or other communications network. A BCM or microcontroller operating the hazard lights (e.g., 1510, 1602, 1604) on a vehicle may be programmed or reprogrammed to accept input from the strobe switch to deploy a strobing operation on the existing hazard lights rather than a flashing operation. The strobe switch 207 may be mounted inside the passenger compartment as described.

It should be understood that the various configurations described above and illustrated in FIGS. 5-16B employing various embodiments of strobe modules according to the present disclosure are illustrative only, and should not be taken as exhaustive. One of skill in the art can develop additional configurations employing the functions and abilities of various embodiments of strobe modules (e.g., strobe module 300) described herein.

Figure 17:
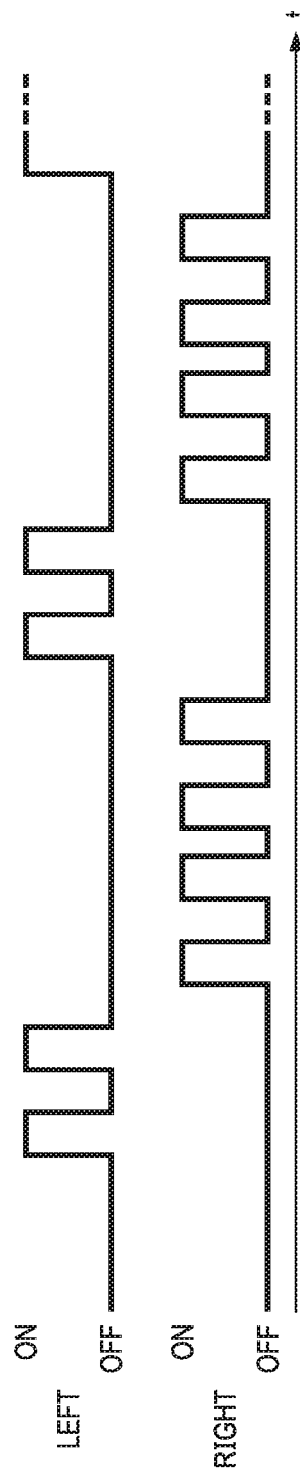
FIG. 17 is a timing diagram showing on and off states for left and right signal lamps over time in a left to right signaling pattern.
Figure 18:
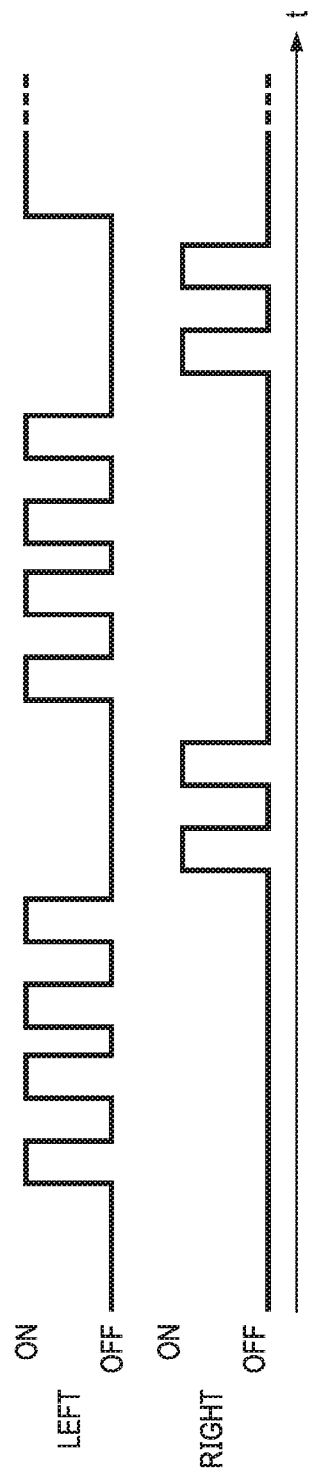
FIG. 18 is a timing diagram showing on and off states for left and right signal lamps over time in a right to left signaling pattern.

In operation, once installation is complete, and depending upon the existing vehicle circuitry and the limitations inherent therein, more than one strobe pattern may be accessed and activated by the driver or user. For example, upon an initial activation of the strobe module 300 in the context of deployment of a hazard switch, the strobe module 300 may be programmed to flash in the traditional manner (e.g., with a cycle of about 2 Hz). An activation of the strobe switch 207, however, may result in the strobe module switching 300 from a slow cycle to a strobing cycle (e.g., around 8 Hz). Further options can be embedded or programmed into strobe module (e.g., using the microcontroller 302) such as strobe pattern that moves from right to left or vice versa. One such pattern is illustrated in FIG. 17 where the left side lights strobe briefly and then cease while the right side lights strobe slightly longer before the cycle repeats. This is suggestive that traffic or other observers of the hazard lights should move to the right. A similar pattern can be developed to suggest movement to the left as shown in FIG. 18.

Figure 19:
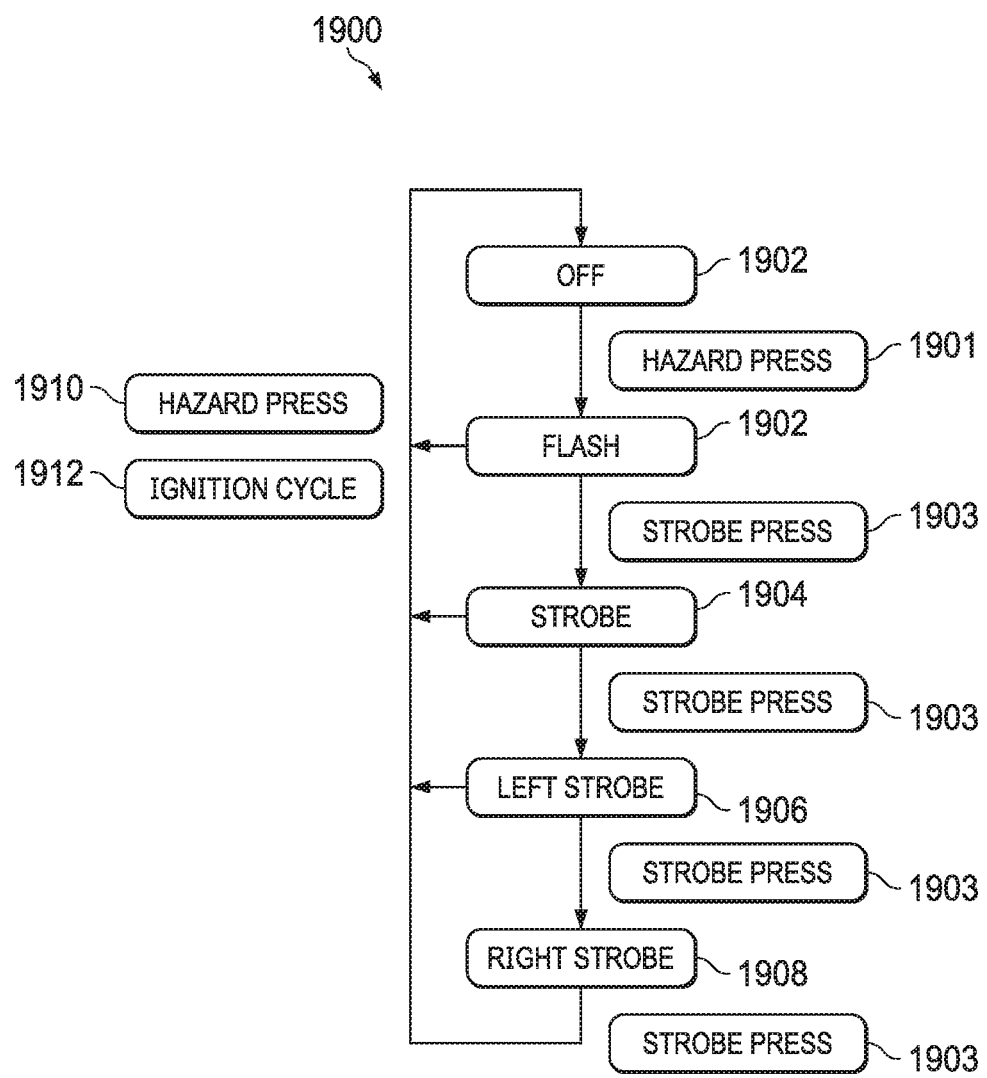
FIG. 19 is a state diagram corresponding to one method of operating a strobe module according to aspects of the present disclosure.

An exemplary state diagram corresponding to the operation of the strobe module 300 is shown in FIG. 19. In some embodiments, multiple button presses or switch throws may be needed to completely access the functionality of the strobe module 300, as shown in FIG. 19. An off state is shown at 1902. A single button press 1901 or switch throw of the hazard switch 206 may move the strobe module 300 to a traditional flashing configuration 1905. A press or throw 1903 of the strobe switch 207 may alter the output of the strobe module 300 to a strobe 1904. In some embodiments, further presses 1903 move the module 300 to a right to left strobe 1906 and a left to right strobe 1908. Depending upon the switch gear available in the existing vehicle into which the strobe module 300 is installed press 1910 of the hazard switch 206 may be used to reset the strobe module to off 1902 from any other state. In another embodiment, cycling or interrupting the power supply to the strobe module through the ignition (e.g., ignition connection 402) may be employed to "reset" the strobe module 300. It will be appreciated that one of skill in the art may be able to derive further control schemes for the strobe module 300 utilizes single presses, multiple presses, and/or long and short presses of the strobe switch 207 alone or in conjunction with the hazard switch 206.

Figure 20:
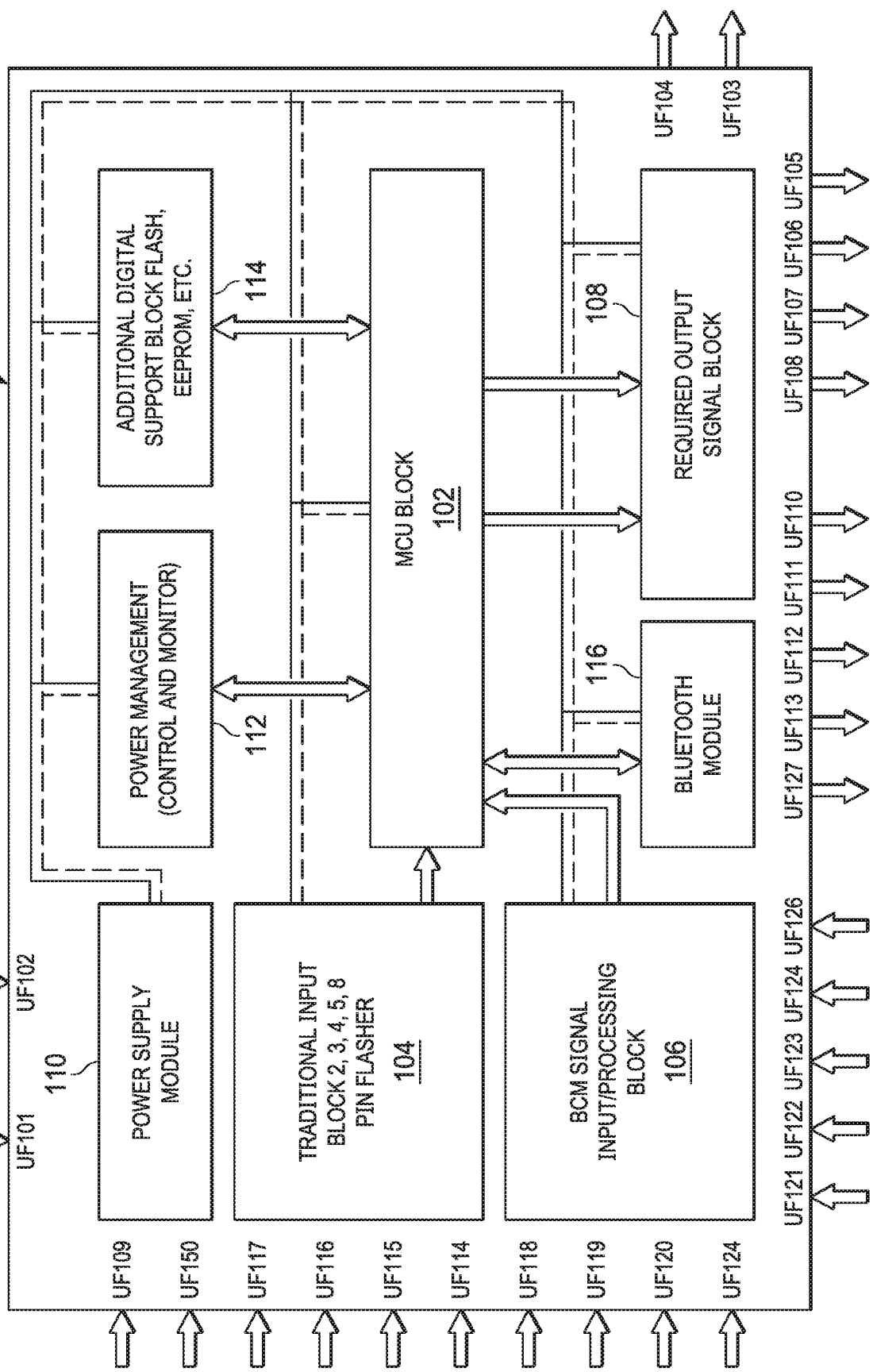
FIG. 20 is a block diagram of a strobe module according to aspects of the present disclosure.
Figure 21:
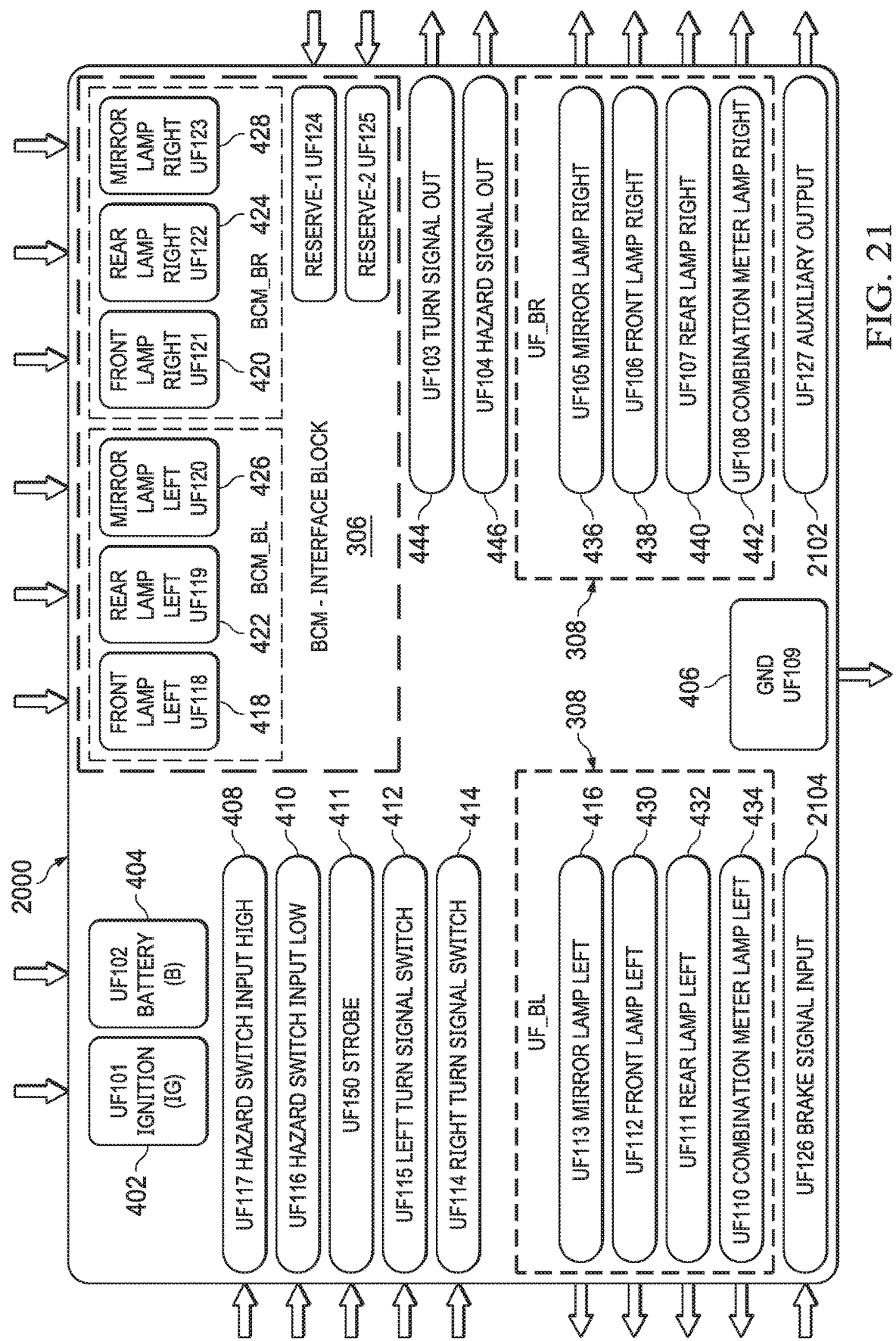
FIG. 21 is a schematic input/output diagram of the strobe module of FIG. 20.

Referring now to FIG. 20, a block diagram of a strobe module 2000 according to aspects of the present disclosure is shown. Referring also to FIG. 21, a schematic input/output diagram of the strobe module 2000 is shown. The strobe module 2000 is substantially similar to the strobe module 300 previously described but has additional inputs and outputs as described herein. The strobe module 2000 has the ability to incorporate additional vehicle lighting that is not a part of usual signal light setup of the vehicle into which it is installed. In one embodiment, the additional, supplemental, or auxiliary vehicle lighting may be a light bar (e.g., light bar 2800 described hereinbelow).

The additional lighting may be purpose-specific (installed specifically to be a part of the strobe effect) but, perhaps more importantly, may be lights that already have a function or use by the subject vehicle. For example, the additional lighting may include headlights, tail lights, fog lights, marker lights, brake lights, internal lights or others. Such lighting that already has a purpose or use on the vehicle may be referred to as multi-purpose lighting. In other words, the multipurpose lighting has an existing use on the vehicle but will gain an additional use by connection to the strobe module 2000, namely, a strobing function. From the point of view of the strobe module 2000, the multi-purpose lighting may be considered multi-purpose auxiliary lighting since it is not a part of the normal standard flasher system that is being augmented or replaced by the functionality provide by the strobe module 2000.

As shown in FIG. 21, the strobe module 2000 may provide an auxiliary light output 2102 that may be used to selectively illuminate or strobe one or more multi-purpose auxiliary lights. In some embodiments, more than one auxiliary light output may be provided. With all auxiliary light outputs, the function of the associated light (which may be one or multiple LEDs) may be to strobe when activated by the output 2102. In this way, the multi-purpose light can be made to strobe along with the existing vehicle hazard flashers, thereby increasing the visibility and utility of the systems of the present disclosure. As previously described, the strobe module 300 is capable of strobing lights associate with one side of the vehicle or the other independently (e.g., to generate a left to right strobe or vice versa). The strobe module 2000 provides the same ability and it may associate the one or more auxiliary light outputs 2102 with either or both "banks" of strobing lights. In other words, the auxiliary light output 2102 may be activated when the left side outputs 416, 430, 432, and/or 434 are activated, when right side outputs 436, 438, 440, and/or 442 are activated, or when either left or right side outputs are activated. In some embodiments, the auxiliary light output 2102 may be activated alone, or independently of the left side outputs 416, 430, 432, and/or 434 or right side outputs 436, 438, 440, and/or 442.

Although the auxiliary light output 2102 could be used to power a light having no additional purpose (e.g., a light or set of lights purposely installed only for strobing, such as light bar 2800 discussed below), the auxiliary light output 2102 is utilized in other embodiments to control or strobe a light that may already be configured to operate in an existing circuit. In one particular embodiment, the auxiliary light output 2102 may be used to activate a vehicle's existing high center mounted stop lamp (HCMSL). The existing HCMSL (or any other auxiliary light) could be disconnected from its original circuit and simply used as a part of the strobing systems of the present disclosure. However, it may be strongly preferred to not only provide strobing operations to the existing light, but also to retain its original function.

As one possible means for allowing consideration and integration of the existing function of the auxiliary multi-purpose light, the strobe module 2000 may provide an auxiliary light input 2104 that accepts input that would otherwise signal or power the associated auxiliary multi-purpose light. This input 2104 may be utilized to signal the strobe module 2000, and specifically the microcontroller 302, when the existing vehicle systems indicate that the auxiliary multi-purpose light should be activated or illuminated whether the strobe module 2000 is currently employing the associated auxiliary multi-purpose light in a strobing capacity or not.

Figure 22:
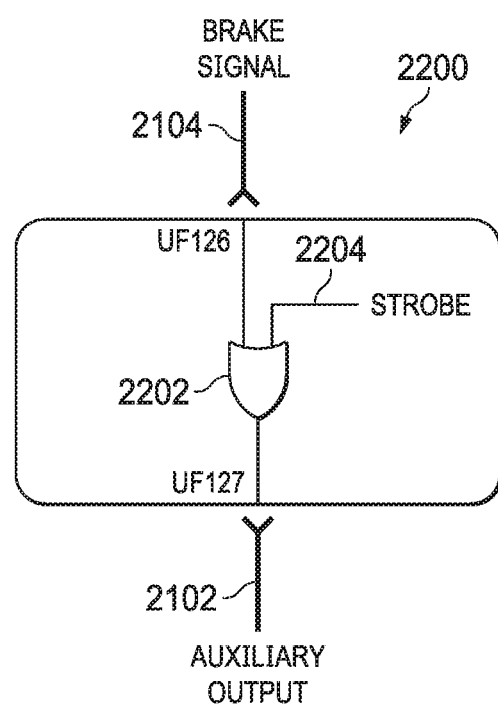
FIG. 22 is a schematic diagram of an OR function implemented by a strobe module of the present disclosure.

Referring now also to FIG. 22, a schematic diagram of an OR function implemented by the strobe module 2000 of the present disclosure is shown. The function of the OR circuit 2200 is represented here logically by the OR gate 2202

(although as explained further below it may not be implemented by a digital gate but by mechanical relays, solid state relays, field effect transistors, bipolar junction transistors, or any other switching scheme that is appropriate for reliable operation of the system). In operation, the circuit 2200 accepts the auxiliary light input 2104 as one input to the OR gate 2202. A second input to the OR gate is generated internally (e.g., by the microcontroller 302) and becomes active when the strobe module 2000 operates to strobe whatever light or lights may be connected to the auxiliary light output 2102.

The OR circuit 2200 may be implemented within the same physical packaging as the other components of the strobe module 2000, or may be implemented externally. Again, the illustrated OR gate 2202 is only a logical representation. Physically, the OR gate 2202 and the functionality of the circuit 2200 may be implemented via mechanical relays, solid state relays, field effect transistors, bipolar junction transistors, or any other switching scheme that is appropriate for reliable operation of the system.

Figure 23:
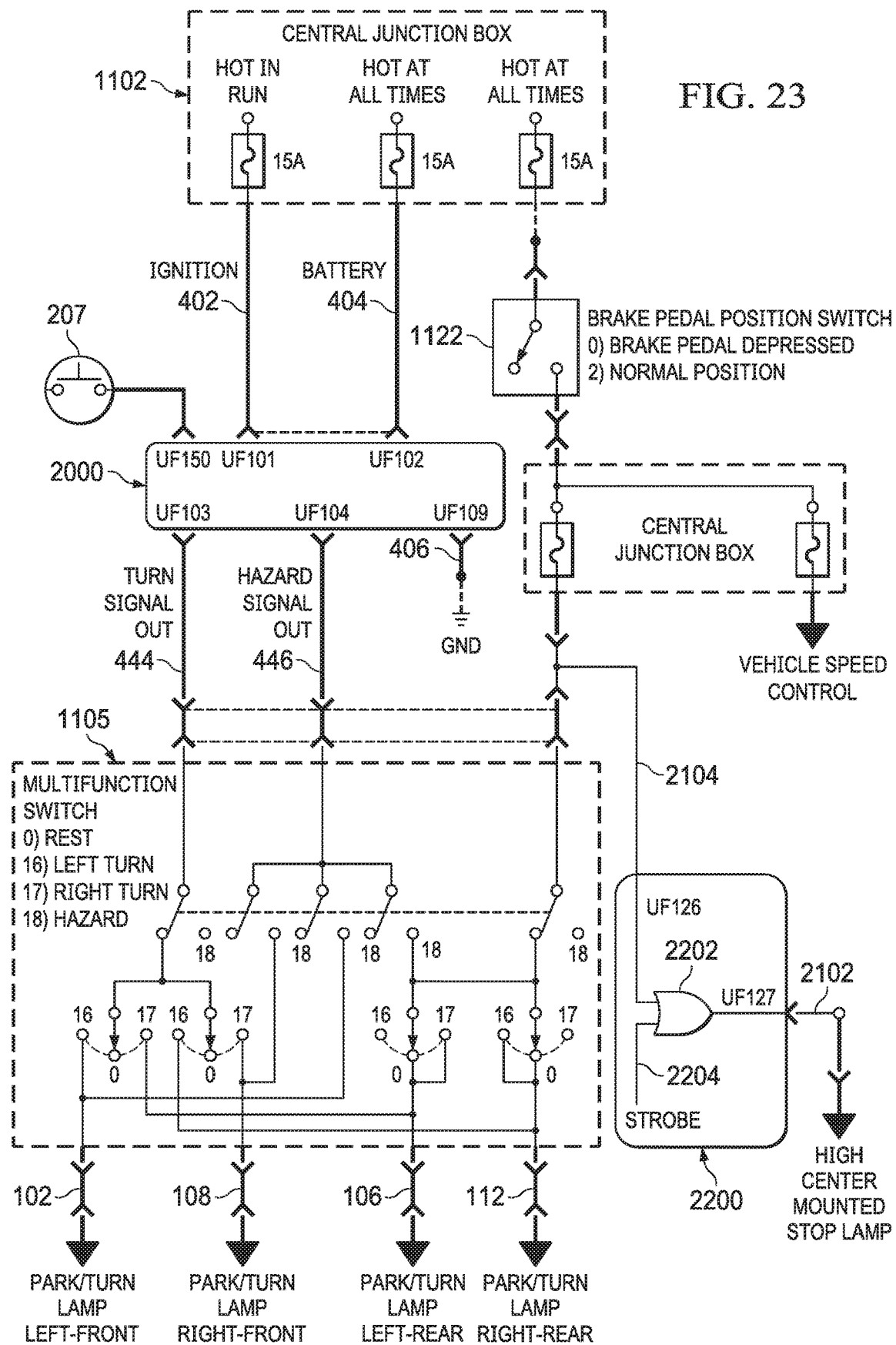
FIG. 23 is a wiring diagram of a strobe module of the present disclosure installed into a five-pin flasher system and additionally controlling a high center mounted stop lamp.

Referring now to FIG. 23, a wiring diagram of the strobe module 2000 installed into a five-pin flasher system and additionally controlling a high center mounted stop lamp (HCMSL) as a multi-purpose auxiliary lamp is shown. It should be understood that the HCMSL is only one option for a multi-purpose auxiliary lamp and the strobe module 2000 is capable of utilizing additional or different multi-purpose auxiliary lamps or lights associated with the vehicle into which the strobe module 2000 is installed. The five-pin flasher system before modification with the strobe module 2000 can be seen back in FIG. 11. The five-pin flasher system including modification with the strobe module 300, that did not include auxiliary light control, can be seen in FIG. 12.

Except where otherwise indicated, the strobe module 2000 integrates with the five-pin system similarly to the manner in which the strobe module 300 does. In the case of the strobe module 2000 having auxiliary multi-purpose light controls, the auxiliary light input 2104 of the OR circuit 2200 is connected to the power lead or signal that would normally feed to the HCMSL. An internal strobe signal 2204 feeds into the logical OR gate 2202 along with the input 2104. If either of these inputs 2104, 2204 are active, the gate 2202 provides a signal or power on the multi-purpose auxiliary output 2102 resulting in illumination of the HCMSL.

From the described arrangement, it should be understood that the application of the brake pedal in the vehicle in which the strobe module 2000 is installed will always result in steady illumination of the HCMSL as a user would expect. Only if the HCMSL is not otherwise activated by the vehicle will the strobe module 2000 be able to activate the same. In this way, function of any auxiliary lamp or light is only enhanced by the strobe module 2000. The HCMSL or any other auxiliary multi-purpose lamp to which the strobe module 2000 is connected may be strobe activated along with the existing hazard flasher lights. In cases where the hazard lights are strobed in groups (e.g., left to right or right to left) the auxiliary multipurpose lamp may be strobed along with one of these groups, or may be strobed as its own groups (e.g., left, center, then right strobe, or vice versa). In some embodiments the connected auxiliary multi-purpose lamps may be strobed alone. It should be appreciated that all of these functions may be controlled by the vehicle strobe switch 207, possibly in conjunction with the vehicle's existing hazard switch (e.g., switch 206 of FIG. 2).

In some embodiments, the strobe module 2000 is activated solely by the switch 270 but may be controlled via Bluetooth or another wireless protocol. The wireless module 316 may be used to allow a user to set or select a particular strobe pattern or protocol. Using wireless communication, the user might select that the HCMSL should be strobed while the existing hazard lights are flashed. The user might also select that all connected lights should strobe, or that a left to right or right to left pattern should be implemented. It should be understood that not only a HCMSL, but any auxiliary light might be employed in a similar manner by the strobe module 2000.

The strobe module 2000 can be integrated into any type of existing hazard flasher system in a similar manner as the strobe module 300 previously described. Further, in any system where deployment of an auxiliary or auxiliary multi-purpose lamp or light is desired (or a plurality of these), the same may be wired an implemented as shown in FIG. 23, for example. Once the strobe module 2000 is installed into the existing vehicle system as described herein, the multi-purpose auxiliary lights may be integrated by connecting the existing output from the existing vehicle's system to these lights to the auxiliary input 2104 associated with the strobe module 2000 and the lights themselves connected to the output 2102. In this way, the original function of the respective auxiliary light is retained while it is also employed as part of the strobing function of the strobe module 2000.

Figure 24:
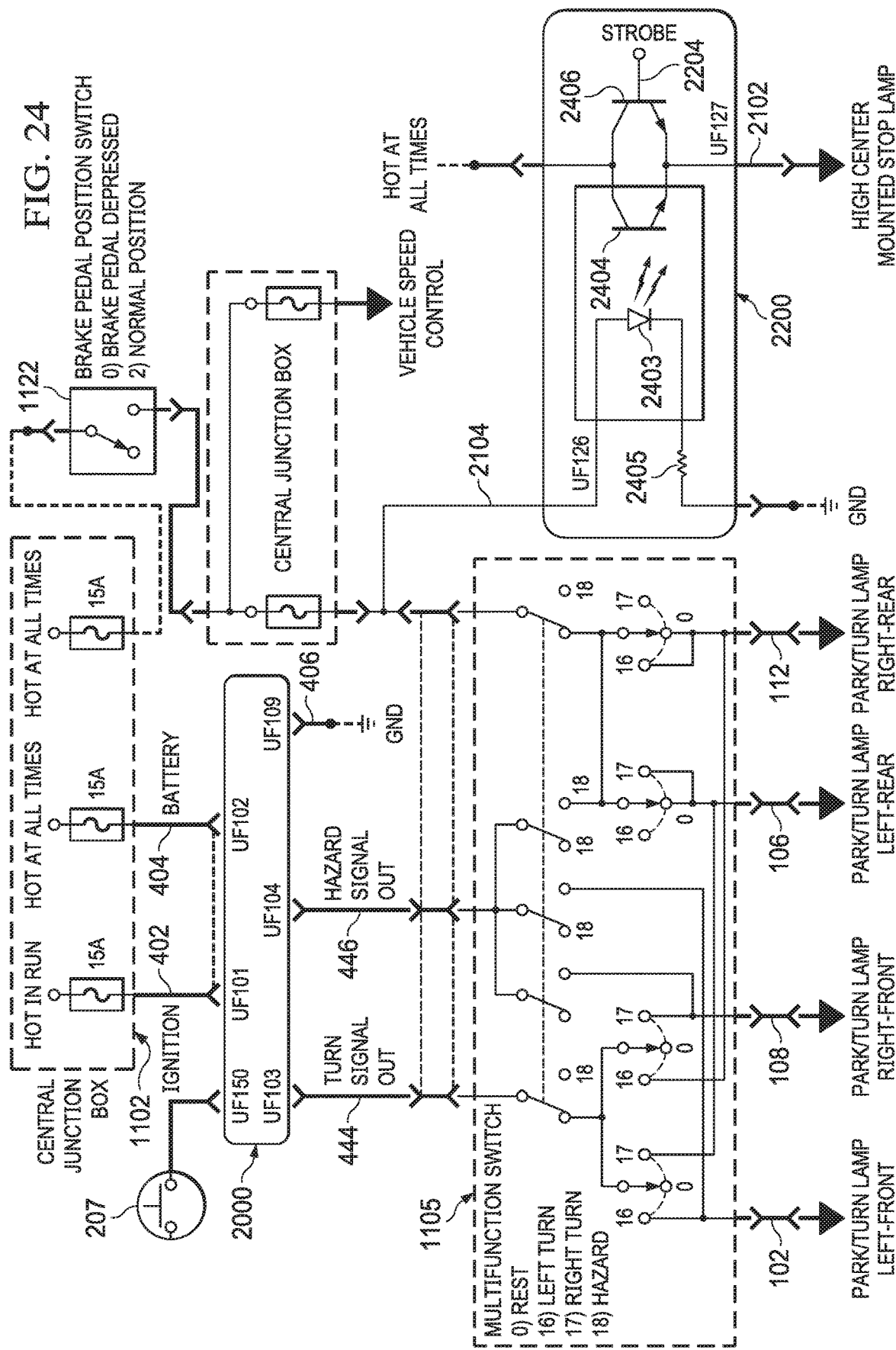
FIG. 24 is a wiring and schematic diagram illustrating further implementation options for a strobe module of the present disclosure installed into a five-pin flasher system and additionally controlling a high center mounted stop lamp.

Referring now to FIG. 24, a wiring and schematic diagram illustrating further implementation options for the strobe module 2000 of the present disclosure installed into a five-pin flasher system and additionally controlling an HCMSL. However, the HCMSL is exemplary only and the multi-purpose auxiliary lighting that may be connected as shown in FIG. 24 is not limited to an HCMSL. FIG. 24 represents one option for isolating and protecting the function of the HCMSL (or other multi-purpose auxiliary light) while incorporating the same into the strobing functions of the strobe module 2000. The OR circuit 2200 (which may be integrated physically with the rest of the strobe module 2000 or may be physically separate as needed) provides the auxiliary input 2104 for taking the output that would otherwise go directly to the HCMSL or other multi-purpose auxiliary light. As a part of the OR circuit 2200, this input 2104 feeds into an optoisolator 2402. The connection from the input 2104 feeds to a light emitting diode (LED) 2403 internal to the optoisolator 2402. If necessary, the LED 2403 may be grounded through a resistor 2405. When the input 2104 becomes active or energized the LED produces photons which are detected by a paired phototransistor 2104. When the phototransistor 2104 is activated by the LED 2403, current and voltage are provided at the output 2102 to power the HCMSL or other auxiliary lighting device. The voltage and current to power the output 2102 may be provided through the power supply module 310, or from a separate full time or ignition switched connection to vehicle power.

In parallel with the phototransistor 2404 is a second transistor 2406 which may be activated to allow current flow by the internal circuitry of the strobe module 2000 (e.g., it may be controlled directly via the microcontroller 302). Internally this may be denoted as strobe signal 2204.

It should be appreciated that the OR circuit 2200 as shown in FIG. 24 allows for the original function of the HCMSL or other multi-purpose auxiliary light to be achieved via the optoisolator 2402 (whether a flash, steady state, or other) while the same device can be activated by the strobe module

2000. Naturally, as long as either the existing vehicle systems or the strobe module 2000 activate the HCMSL or other multi-purpose auxiliary light, the same will illuminate. It should also be appreciated that a steady state illumination by the vehicle systems will override any strobe or any intermittent activation on the part of the strobe module 2000. Thus, existing vehicle functions of the HCMSL or other multi-purpose auxiliary light or not co-opted, but only enhanced.

Figure 25:
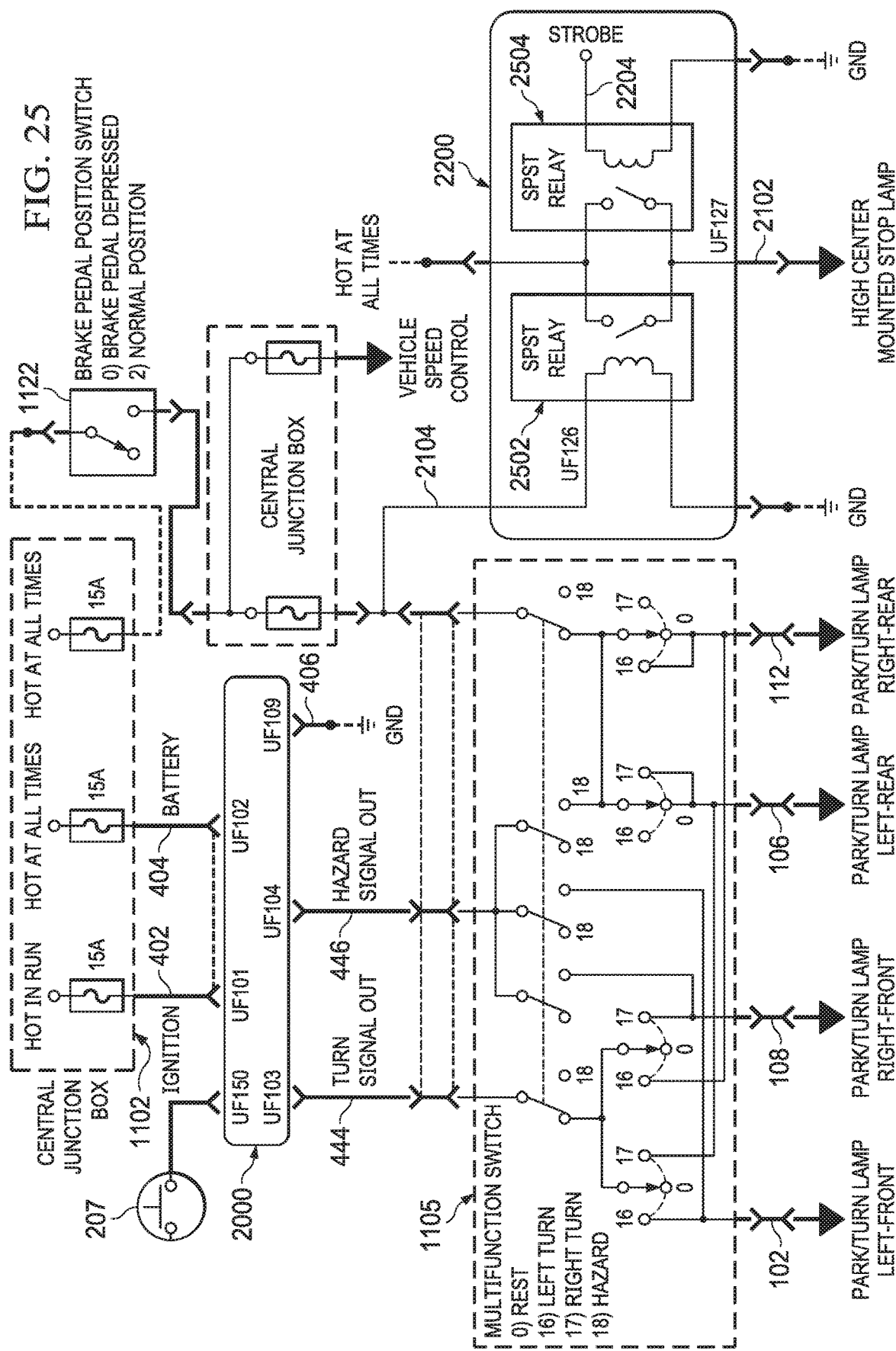
FIG. 25 is another wiring and schematic diagram illustrating further implementation options for a strobe module of the present disclosure installed into a five-pin flasher system and additionally controlling a high center mounted stop lamp.

Referring now to FIG. 25, another wiring and schematic diagram illustrating further implementation options for a strobe module 2000 of the present disclosure installed into a five-pin flasher system and additionally controlling a high center mounted stop lamp is shown. Here the OR circuit 2200 comprises a pair of single pole, single throw (SPST) relays 2502 and 2504. The relay 2502 accepts the input 2104 and, upon activation of the same by the vehicle, closes to supply power and voltage to the HCMSL or other auxiliary light on output 2102. Similarly, relay 2504 closes upon input from the strobe signal 2204. It can be appreciated that if either relay 2502, 2504 closes as a result of activation of input 2104 or strobe signal 2204, respectively, the output 2102 becomes energized. Thus, the system functions substantially similar to that of FIG. 24.

Figure 26A:
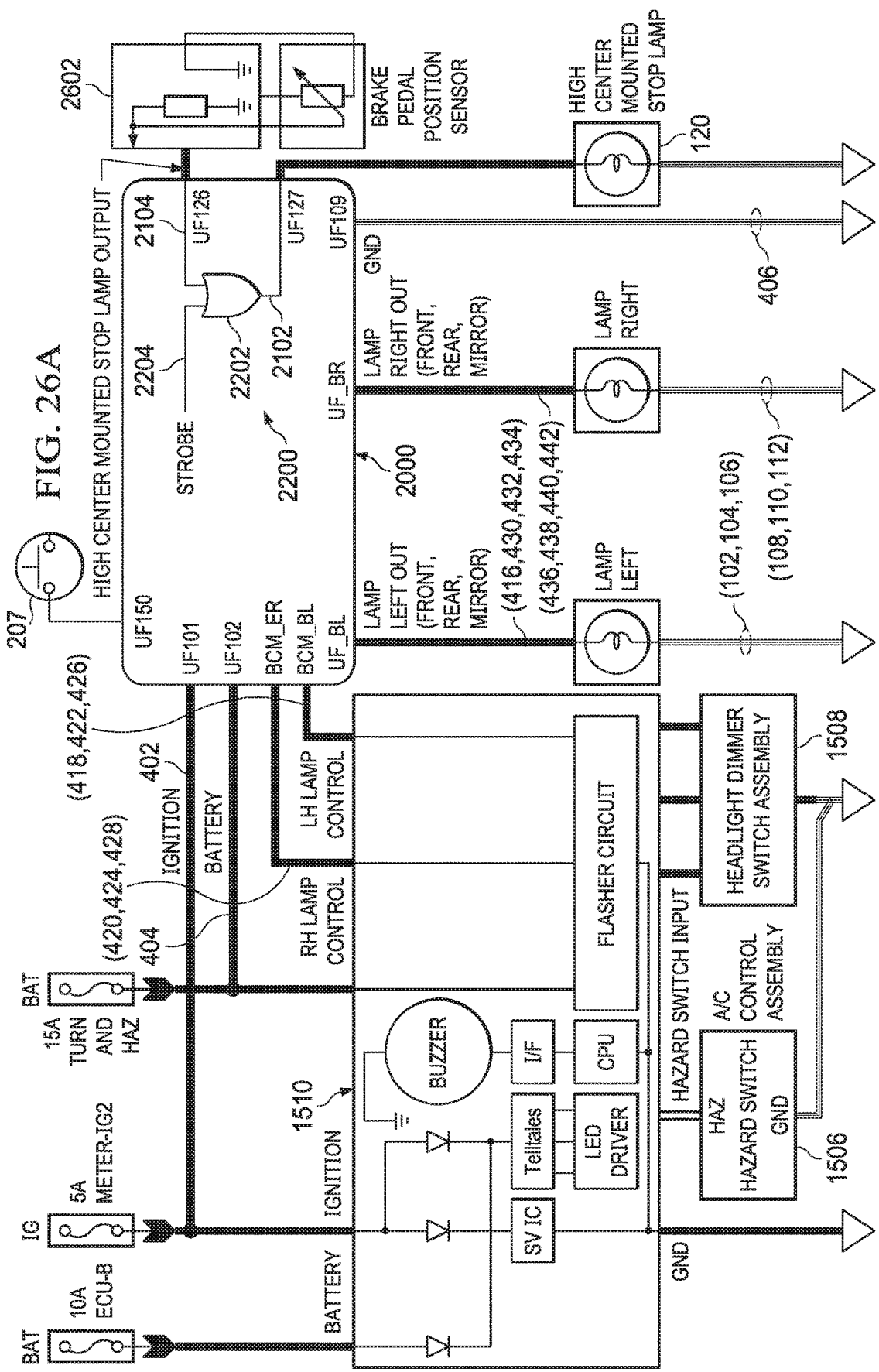
FIG. 26A is a wiring diagram illustrating a strobe module of the present disclosure controlling a high center mounted stop lamp and installed with a BCM flasher system.

Referring now to FIG. 26A a wiring diagram illustrating the strobe module 2000 installed with a BCM flasher system and controlling an HCMSL is shown. The system of FIG. 26A is shown prior to modification in FIG. 15 above. It is also shown after installation of the strobe module 300 (without HCMSL or other auxiliary control) in FIG. 16A. Here in FIG. 26A it can be seen that the strobe module 2000 may be installed into a BCM based system in a substantially similar manner as the system 300 with respect to existing hazard lights. The strobe module 2000 is shown in FIG. 26 with additional control over an HCMSL 120. As with previous embodiments, the HCMSL is exemplary of a multi-purpose auxiliary light but other multi-purpose auxiliary lights may be connected in a similar fashion for inclusion with the strobe functions of the strobe module 2000.

Here, the existing output to the HCMSL 120 is shown as output 2604 from a brake light activation circuit 2602 activated by a driver or vehicle occupant pressing the brake pedal. This output now becomes input to brake signal input 2104 feeding into the OR circuit 2200 or the strobe module 2000. It should be understood that whether the BCM itself controls the HCMSL 120 or whether it is controlled by a separate system or circuit of the automobile (e.g., brake light activation circuit 2602), the strobe module 2000 accepts the vehicle's normal output to the HCMSL 120 into input 2104. As previously described the OR circuit 2200 (which may be internal or external to the rest of the strobe module 2000) activates output 2102 in response to either an internal strobe signal (e.g., from the microcontroller 1602) or activation of the input 2104. Thus, as shown, the strobe module 2000 has functional control over all lights or lamps existing in the vehicle's signal light or hazard light circuit as well as the HCMSL 120 or other multi-purpose auxiliary lights. Thus, the strobe module 2000 can provide strobing functionality as described herein on a BCM controlled automobile setup including both signal or hazard lights as well as the HCMSL and/or other auxiliary or multi-purpose auxiliary lights. Any multi-purpose auxiliary lights will retain their original function (whether as a brake light or otherwise) as well as partake in strobing functionality when they are not otherwise deployed.

Figure 26B:
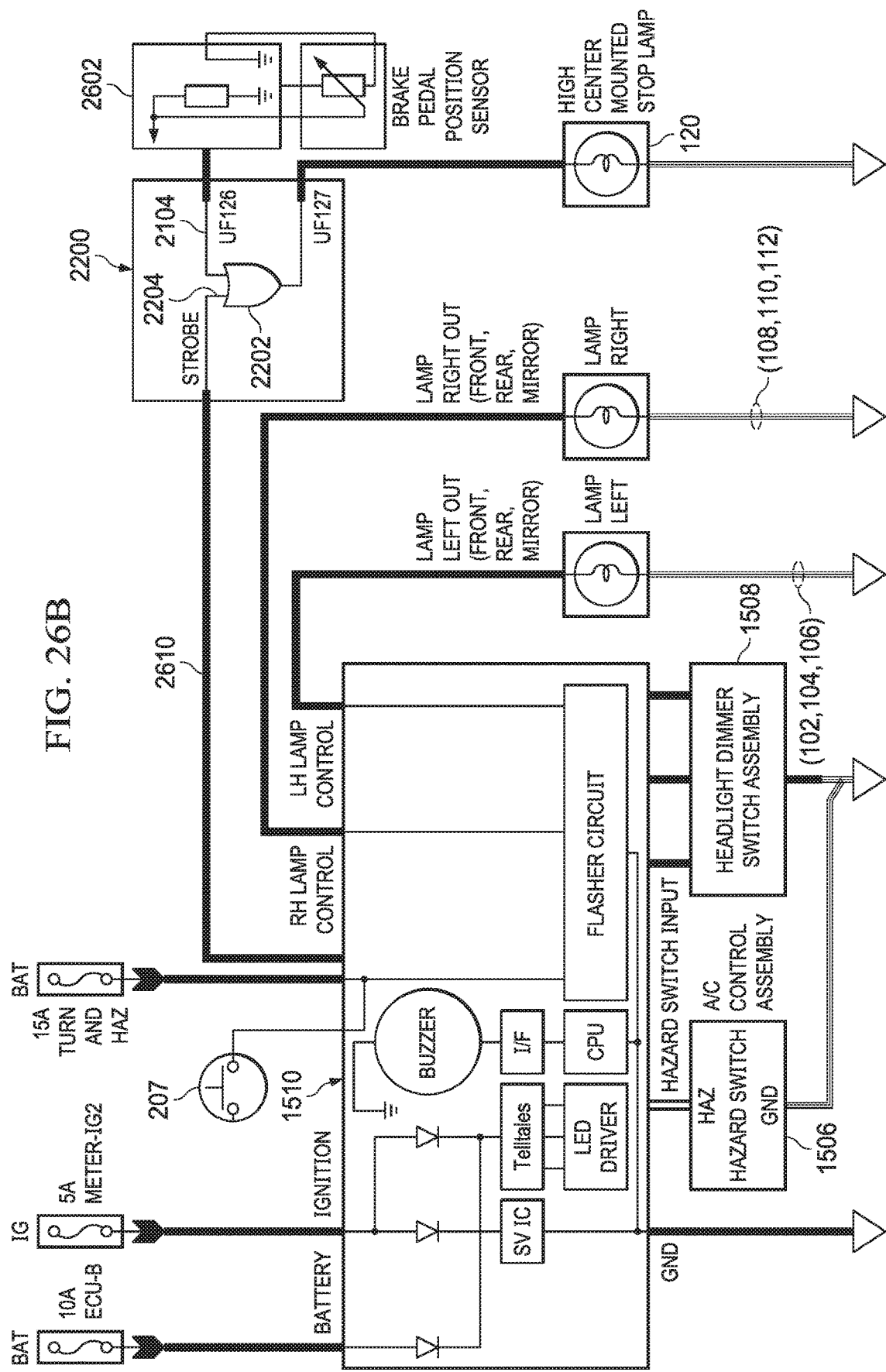
FIG. 26B is a wiring diagram showing an embodiment of a strobe module having multifunction light control capabilities installed into a BCM controlled flasher system via modification of a microcontroller.

FIG. 26B is a wiring diagram showing an embodiment of a strobe module having multi-purpose auxiliary light control capabilities installed into a BCM controlled flasher system via modification of a microcontroller. Similar to the embodiment shown in FIG. 16A, modifications to the existing functions of the BCM 1510 may be accomplished by an auxiliary chip 1604 that may contain memory and instructions for proper timing of the hazard lights (e.g., a strobe effect or effects). Again, such an auxiliary chip 1604 may be wired directly to the BCM 1510 or microcontroller 1602 or may communicate via a bus (not shown) such as a CAN bus. In order to integrate one or more multi-purpose auxiliary lights into a strobing program, one of the outputs from the BCM 1510 that provides a strobing output must be connected to such multipurpose auxiliary light. Such a multi-purpose auxiliary light might be fed by one of the now strobe capable outputs to the existing vehicle flashers (e.g., one or more of 102, 104, 106, 102, 110, or 112).

On the other hand, in some embodiments, a separate strobe capable output 2610 from the BCM 1510 may feed into OR circuit 2200 to the strobe signal lead 2204. Output 2604 from brake activation circuit 2602 is connected to brake signal input 2104. In this manner, strobe activation may be controlled entirely by the BCM 1510 and one or more multi-purpose auxiliary lights, such as the HCMSL 120, may be integrated into the strobe functions while retaining its original function as well.

In another embodiment, additional chips or memories are not needed as the BCM 1510 contains all of the necessary logic and timing information to drive the vehicle lights (including the new output 2610) in a strobing fashion in response to inputs from the hazard switch and/or signal stalk. It should be appreciated that where the BCM 1510 can be made to control the strobing functions directly (either via auxiliary chip 1604 or by original programming or coding of a microcontroller), a separate OR circuit 2200 or may still be necessary to allow the multipurpose auxiliary lights to be made a part of the strobing functions without loss of their original function. In cases of control of multi-purpose auxiliary lights exclusively by the BCM 1510 (e.g., where separate function of the auxiliary light is not needed or intended to be shared with another circuit such as a brake light circuit) all functionality might be achieved exclusively by programming, reprogramming, or augmented the logic on board the BCM 1510.

Figure 27:
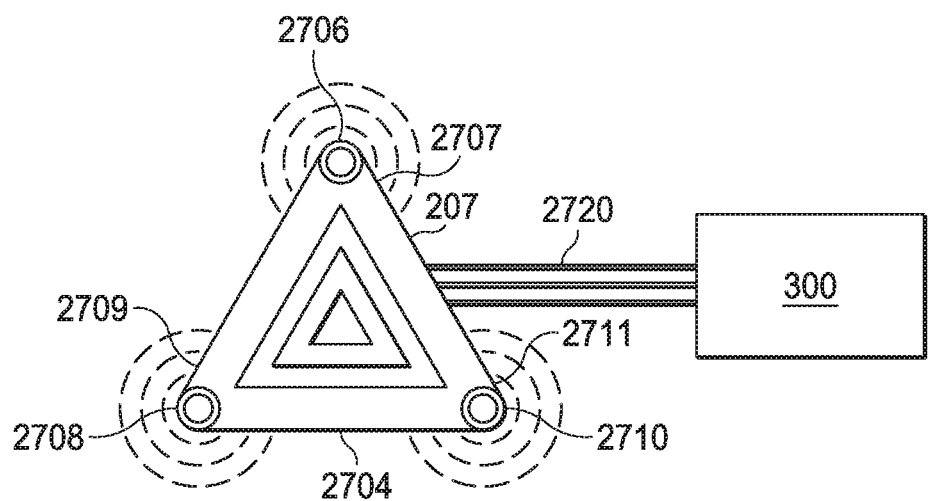
FIG. 27 is a diagram of a strobe switch according to aspects of the present disclosure.

Referring now to FIG. 27, a diagram of the strobe switch 207 is shown. While the strobe switch 207 may have a form factor according to known switch or button technology, in some embodiment, the strobe switch 207 is a function-indicating switch that telegraphs or indicates the mode the associated strobe module 300 (or any other strobe module of the present disclosure) is operating in. In the illustrated embodiment, the switch 207 comprises a body 2704 resembling a warning triangle. The body may be oriented such that it has an upper apex 2707, a lower left apex 2709, and a lower right apex 2911. On or near each of these may be an upper indicator lamp, light or LED. As shown an indicator 2706 is on or near the apex 2707, an indicator 2708 is on or near the apex 2709, and an indicator 2710 is on or near the apex 2719. The body 2704 itself may also be backlighted and lightable (for example, to flash in sync with hazard light operations, and/or to backlight with other dash lights).

The switch 207 may be installed as OEM equipment, or a vehicle may be retrofitted to utilize the same. It may have a similar shape, color, or outline as a known type of hazard flasher switch (non-strobing), or it may be differently colored or otherwise marked to indicate to a user that it is the strobe switch. In some embodiments, given the additional functionality as described herein, the strobe switch 207 may be the only hazard indicating switch in a vehicle (replacing switch 206, for example). The strobe switch 207 may have a plurality of electrical connections 2720 (or may communicate via multi-lead cable or bus) as needed to send and receive necessary signals to/from the associated strobe module 300 (or other according to the present disclosure).

These indicators 2706, 2708, 2710 may illuminate in accordance with the mode of operation of the hazard lights and strobing systems according to the present disclosure. For example, all three LEDs 2706, 2708, 2710 may periodically illuminate in unison, in relation to, or along with the vehicle hazard lights. Thus, a motorist or user can easily discern the mode of operation of the hazard lights by reference to the switch 2700. The switch 2700 may also provide feedback with respect to a directional strobe, if the same has been activated. For example, indicator 2706 may illuminate at a steady state while indicators 2708, 2710 strobe from left to right or vice versa, to indicate the mode of strobing selected. One of skill in the art may devise further indication schemes for use with the indicators 2706, 2708, 2710 such that a user can easily tell from the condition of the switch 207 whether hazard lights are off, flashing, strobing, indicating direction, etc.

In some embodiments, once strobing has been actuated according to any embodiment above, the existing turn signal stalk can be used to provide further input to the system to provide left or right strobing patterns, for example. I Modern vehicles provide a visual indication on the dash or instrument panel (whether analog or virtual) relating to when a signal light is activated, or whether both signal lights (left and right) are active together, which would be indicative of hazard light deployment. The same lights or internal indicators can be configured according to the present disclosure to reflect whether hazard lights have been activated to flash in the traditional slower manner, or to strobe utilizing one of the systems or methods of the present disclosure.

In addition to the mode indication (e.g., flash, strobe, left to right, right to left, etc.) that may be provided by the switch 207 and/or the signal light indicators on the dash, systems and methods of the present disclosure may rely on additional mechanisms to provide user or motorist feedback as to the state of the operation of the hazard lights. In one embodiment, the current mode of operation is displayed on a separate indicator light. In another embodiment, the mode is displayed on navigation screen or a multipurpose touch screen that may be located within the vehicle as part of a climate control, navigation, or other vehicle system. Modes may also be indicated on a radio or entertainment system display. In addition to visual indications, systems and methods of the present disclosure may utilize audio or tactile indicators. Audio sources may include the vehicle stereo, door buzzers, light buzzers, etc. Some of these may be generated by the BCM and played via the vehicle's sound system. In some embodiments, a separate speaker or buzzer may be provided.

Figure 28:
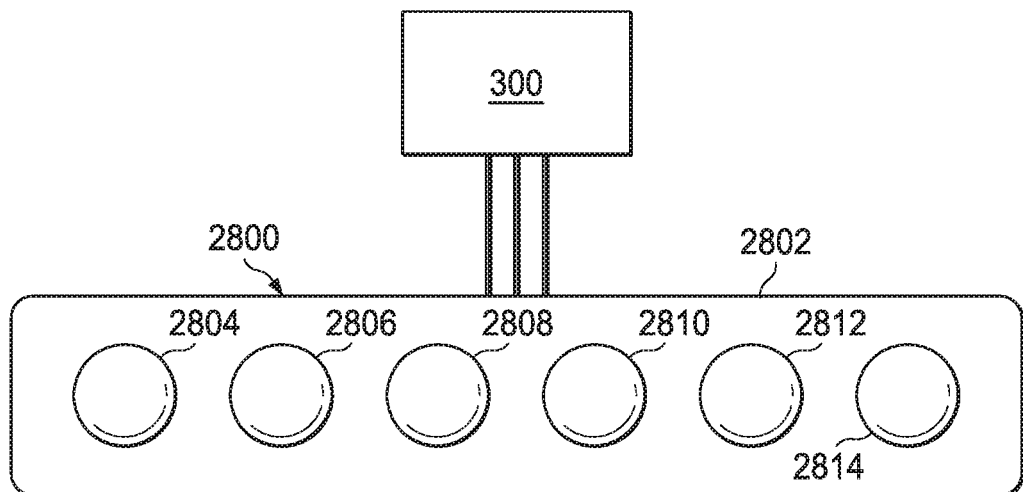
FIG. 28 is a diagram of a supplemental light bar for providing strobing effects according to aspects of the present disclosure.

Referring now to FIG. 28, a plan view of an external vehicle light 2800 according to aspects of the present disclosure is shown. The light 2800 may be a rear tail or signal light or a front marker or signal light (e.g., any of lights 102, 104, 106, 108, 110, 112). However, the light 2800 may also be configured as a supplemental or auxiliary light bar, that is not part of the vehicle's existing lighting setup, and possibly not used for any other purpose. The light 2800 comprises a lighting panel 2802 with plurality of separate lighting elements 2804, 2806, 2808, 2810, 2812, 2814. In some embodiments, the lighting elements are 2804, 2806, 2808, 2810, 2812, 2814 LEDs. The LEDs may illuminate in the appropriate color (e.g., red or yellow). A covering or lens (not shown) may be provided, which may also provide coloring. In other embodiments, the lighting elements 2804, 2806, 2808, 2810, 2812, 2814 comprise incandescent lamps, which may be made to replicate the faster strobing available with LEDs, as described further below.

In normal operation, the lighting elements 2804, 2806, 2808, 2810, 2812, 2814 may operate together, or at least some of them may operate together as a group. For example, if the light 2800 is a tail light, the lighting elements 2804, 2806, 2808, 2810, 2812, 2814 may all light up when the tail lights are activated. Similarly, of the lighting elements 2804, 2806, 2808, 2810, 2812, 2814 serve as signal lights, all or a portion of the lighting elements 2804, 2806, 2808, 2810, 2812, 2814 may light up in accordance with a signal flash. If the light 2800 forms part of the lights associated with hazard flashers, some or all of the lighting elements 2804, 2806, 2808, 2810, 2812, 2814 may illuminate periodically all together to indicate the hazard.

When the light 2800 is deployed within strobing systems and methods of the present disclosure, some or all of the lighting elements 2804, 2806, 2808, 2810, 2812, 2814 may be made to strobe, as described previously. However, in other embodiments, the strobe module 300 (or any other strobe module according to the present disclosure) is provided with the ability to activate one or more of the lighting elements 2804, 2806, 2808, 2810, 2812, 2814 separately from the others. In such case, the individual lighting elements 2804, 2806, 2808, 2810, 2812, 2814 may selectively flash one, or a few (e.g., 2 or 3) at a time. The flashing of the lighting elements 2804, 2806, 2808, 2810, 2812, 2814 may be timed such that at least one light has always illuminated or dimmed at such a rate that a strobing effect is reproduced. Even though any single one of the lighting elements 2804, 2806, 2808, 2810, 2812, 2814 may not flash or cycle quickly enough to be considered strobing, the light 2800 as-a-whole produces a visual effect akin to strobing. Since the cycle of any individual light is somewhat low, even incandescent bulbs may be made to operate as one or more of the lighting elements 2804, 2806, 2808, 2810, 2812, 2814. In some cases, lenses or other coverings may serve to aid in the perception of a strobing effect by diminishing the ease at which the separate lighting elements 2804, 2806, 2808, 2810, 2812, 2814 may be perceived.

In one example, lighting elements 2804, 2808, and 2812 may illuminate while lighting elements 2806, 2810, and 2814 may dim, and vice versa. In another embodiment, the lighting elements 2804, 2806, 2808, 2810, 2812, 2814 may be lit and dimmed two at a time in a round robin or random fashion. In further embodiments, each of the lighting elements 2804, 2806, 2808, 2810, 2812, 2814 illuminates and dims on a separate time schedule, which may be a round robin type schedule or a random schedule. Inside out and outside in rotations are also contemplated, as well as directional sequential illumination that may be helpful indicating a hazard direction as discussed above.

It should be appreciated that the light 2800 need not necessarily have the shape shown. The light 2800 may be configured according to space available on a vehicle and may be configured to be used alone (either OEM or aftermarket) or to augment an existing vehicle tail light, brake light, etc. such that the light 2800 complements the existing light. It should also be understood that a plurality of the lights 2800 may be used on the same vehicle, possible having different physical shapes or arrangements based upon need. FIG. 28 illustrates connection of a pair of lights 2800 as auxiliary lights wire to be controlled by the strobe module 300 (although it should be understood that the lights 2800 could be adapted and configured to work with any other strobe module of the present disclosure). It should also be understood that as many leads as are necessary from the strobe module 300 (or any other strobe module of the present disclosure) may be provided for full operation of each of the lighting elements 2804, 2806, 2808, 2810, 2812, 2814 and/or as many subgroups of these as ae needed to be effect operation as described herein. In some embodiments, the lights 2800 may be connected via auxiliary output 1202.

Figure 29:
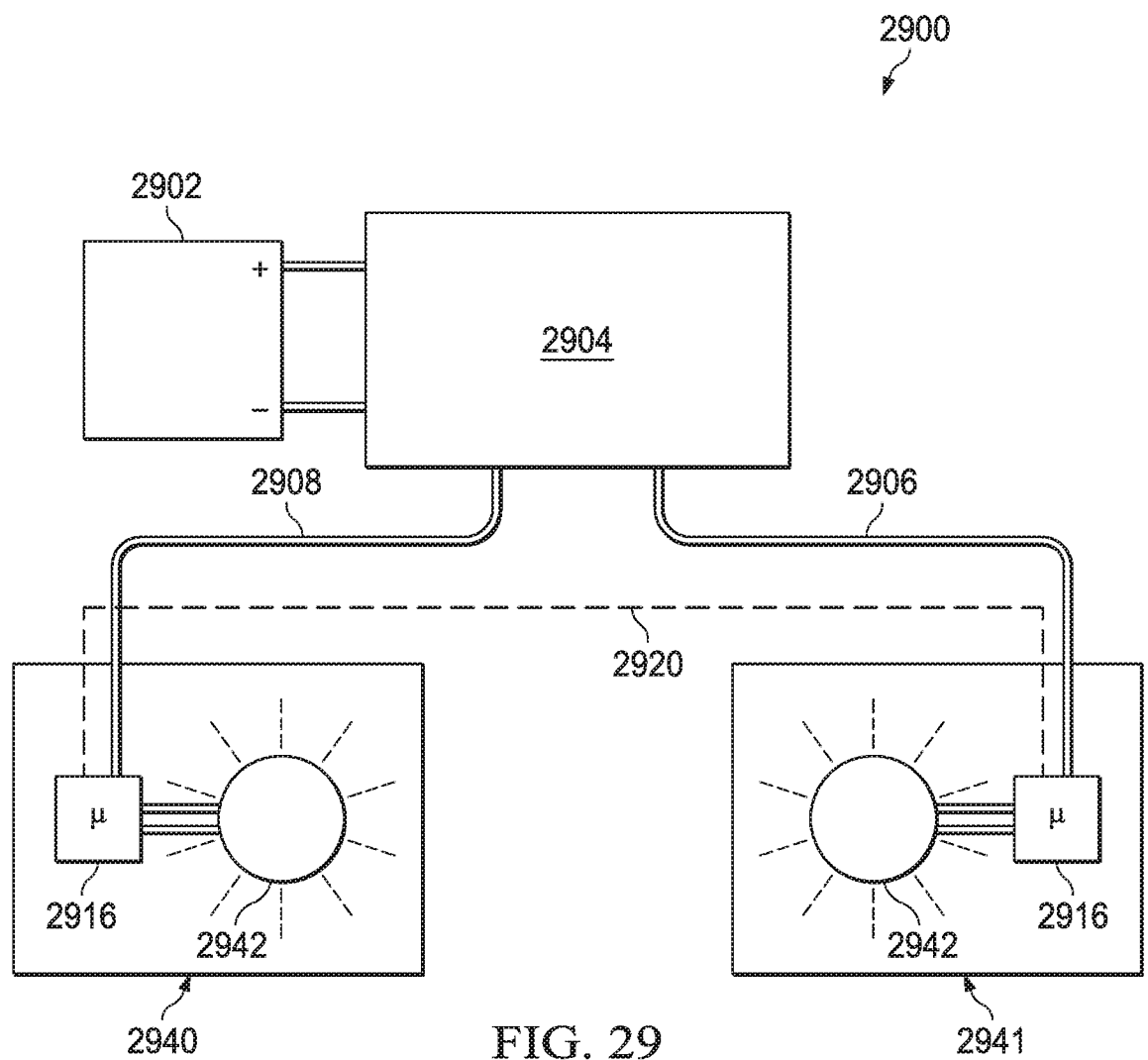
FIG. 29 is a schematic diagram of a non-centralized strobing system for an automobile according to aspects of the present disclosure.

Referring now to FIG. 29, a simplified schematic view of a strobing system 2900 according to aspects of the present disclosure is shown. For simplicity, here only a single left light cluster 2940 and a single right light cluster 1941 are shown, although a vehicle would typically employ at least four (e.g., left and right on front and rear) and possibly more. The system 2900 may not require any modification of a BCM or replacement of a flasher module. Thus, a flasher module 2904 here represents an existing or prior-art type module. It should be understood that the flasher module 2904 may comprise a BCM or other microcontroller system, or even an analog relay. The flasher module 2904, upon activation by the user (e.g., via an existing vehicle hazard light switch, not shown here) periodically connects a 12-volt battery 2902 (or a vehicle 12-volt power supply) to power the respective light clusters 2940, 2941. It should be understood that voltage may vary if the vehicle power system is other than 12 volts. The flasher module 2904 outputs the standard, slower hazard flasher output (i.e., non-strobing).

The light modules 2940, 2941 are equipped to accept a standard, non-strobing hazard or signal light flash, and covert the same into a high visibility strobing as explained herein. The light clusters 2940, 2941 are powered or activated on existing or standard or existing signal light wiring leads 2908, 2906, respectively. A microcontroller 2916 receives the non-strobing standard flash signal/power from the flasher module 2904 and converts the same to a strobing output on the lamp or lamps 2942. Lamps 2942 may be LED or another high cycle rate lamp. Lamps 2942 may also be a light 2800 having multiple elements as described above and being driven appropriately by the microcontroller 2916 rather than a central type strobe module (e.g., strobe module 300).

In some embodiments, an additional power lead (not shown) may be used such that continuous power is available for strobing. In other embodiments, capacitors or batteries may be used within the light clusters 2940, 2941 to provide sufficient power to strobe the lamps 2942 continuously, even though power may only be provided intermittently (at a slower pace, from the relay or standard flasher module 2904).

In some embodiments, strobing activation is desirable only when both light clusters 2940, 2941 are active at once (or all four where four are installed). This would be indicative of hazard light deployment as opposed to signal light deployment. To such end, it may be necessary to provide a means of communication between the light clusters 2940, 2941 (or as many such light clusters as are installed on a vehicle). In one embodiment a signal lead 2920 is provided between the respective light clusters 2940, 2941. In another embodiment, the light clusters 2940, 2941 communicate via various wireless technologies such as Bluetooth®.

In another embodiment, the light clusters 2940, 2941 provide only a standard, non-strobing flash as activated by the module 2904, unless the microprocessor 2916 is activated by another device. Activation may be by a secondary button (e.g. as discussed above), by the associated BCM, or by another vehicle system. In another embodiment, the microcontrollers may be programmed via Bluetooth® using a suitable app running on a Bluetooth® enabled platform. The microprocessors 2916 may drive the respective lamps 2942 in strobing or patterned fashion based upon their activation or programming when they are powered by the module 2904, even intermittently. It should be understood that various internal capacitors, resistors, relays, etc. that may be needed, and as are known in the art, may be provided within the light clusters 2940, 2941.

The light clusters 2940, 2941 may replace factory installed light clusters to allow a vehicle to be upgraded to strobing hazard lights without need to alter BCM programming or to replace a flasher module. In another embodiment, the light clusters 2940, 2941 are installed at the factory in place of prior art devices. It should be understood that four or more light clusters maybe utilized to provide strobing lights on the front and rear of a vehicle.

Figure 30:
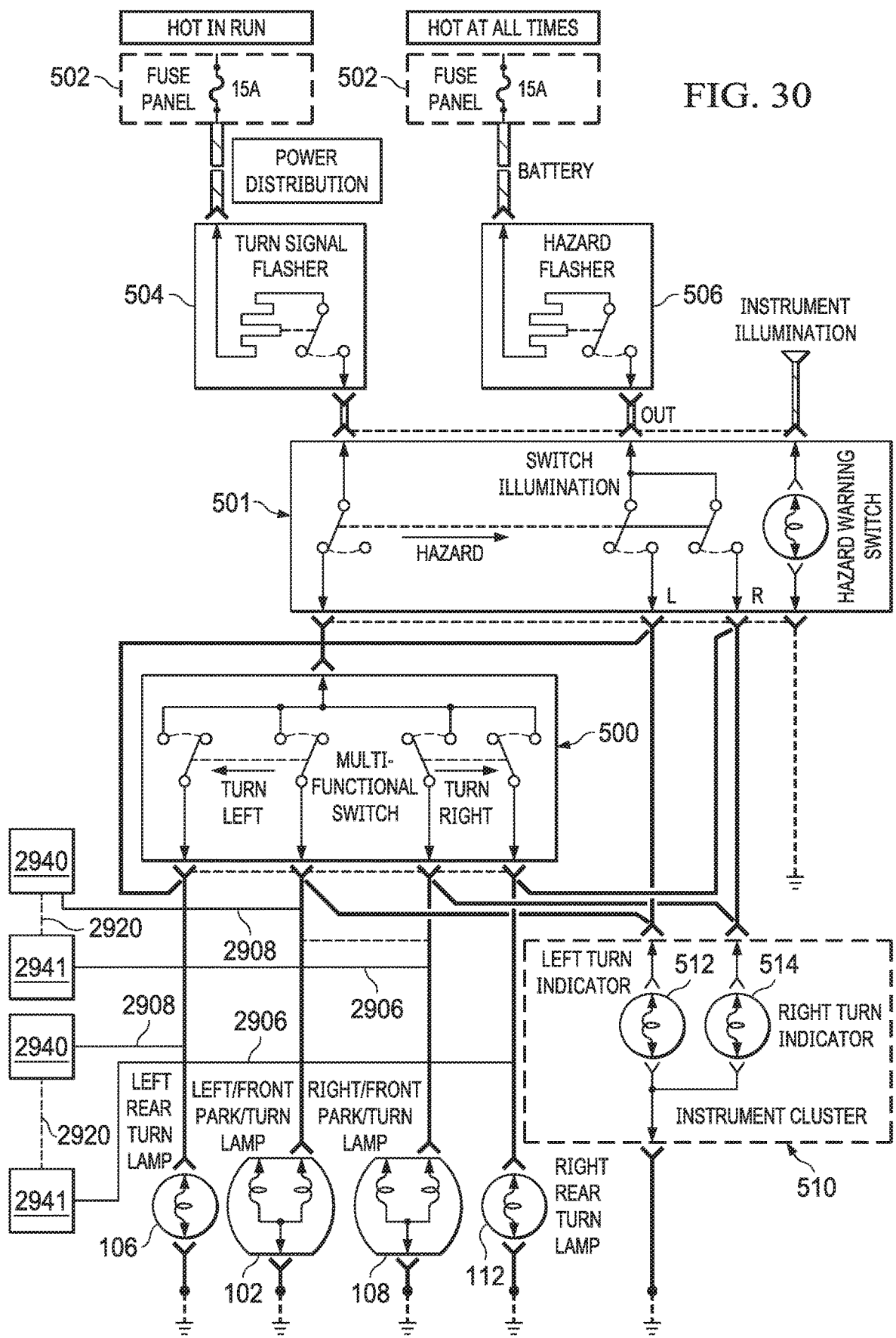
FIG. 30 is a schematic diagram illustrating one possible manner of interfacing the non-centralized strobing system of FIG. 29 with an existing automobile.

Referring now to FIG. 30, a more detailed diagram of installation of a pair of light clusters, two of 2940 and two of 2941, are shown. For purposes of illustration, the existing left rear turn lamp 106, left front turn lamp 102, right front turn lamp 108, and right rear turn lamp 112 are shown in their original configuration. However, it should be understood that these may be replaced completely by the light clusters 2940, 2941. It should also be apparent that nearly any existing light configuration can be adapted for strobing operations using light clusters 2940, 2941 without modification of any existing control computers or relays.

In some newer vehicles, BCMs and other microcontroller are capable of detecting defective lamps. The microcontroller 2916 can be configured to provide an appropriate signal back to whatever device is monitoring lamp condition that is indicative of a functional lamp or cluster. Thus modification of a newer vehicle to utilize light clusters 2940, 2941 would not cause any faults or other indicated malfunctions on the vehicle itself.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional elements.

It is to be understood that where the claims or specification refer to "a" or "an" element, such reference is not be construed that there is only one of that elements.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising of two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A system comprising:
   a first lead connecting to existing vehicle wiring for activating a signal light of a right side of a vehicle;
   a first strobing light module having a first microcontroller connected to the first lead and operating a first strobing light;
   a second lead connecting to existing vehicle wiring for activating a signal light of a left side of the vehicle; and
   a second strobing light module having a second microcontroller connected to the second lead and operating a second strobing light;
   wherein the first and second microcontrollers are communicatively coupled, the first microcontroller providing a first signal to the second microcontroller when the first microcontroller detects activation of the first lead, and the second microcontroller providing a second signal to the first microcontroller when the second microcontroller detects activation of the second lead;
   wherein the first microcontroller strobes the first strobing light upon detecting activation of the first lead and receiving the second signal, and the second microcontroller strobes the second strobing light upon detecting activation of the second lead and receiving the first signal.

2. The system of claim 1, wherein the first light module and second light module replace existing signal lights of the vehicle.

3. The system of claim 2, wherein the first and second strobing light modules replace existing rear signal lights of a vehicle.

4. The system of claim 2, wherein the first and second strobing light modules replace existing front signal lights of a vehicle.

5. The system of claim 1, further comprising:
   a third lead connecting to the existing vehicle wiring for activating a signal light of the right side of a vehicle;
   a third strobing light module having a third microcontroller connected to the third lead and operating a third strobing light;
   a fourth lead connecting to the existing vehicle wiring for activating a signal light of the left side of the vehicle; and
   a fourth strobing light module having a fourth microcontroller connected to the fourth lead and operating a strobing light.

6. The system of claim 5, wherein the third and fourth microcontrollers are communicatively coupled, the third microcontroller providing a third signal to the fourth microcontroller when the third microcontroller detects activation of the third lead, and the fourth microcontroller providing a fourth signal to the third microcontroller when the fourth microcontroller detects activation of the fourth lead; and
   wherein the third microcontroller strobes the third strobing light upon detecting activation of the third lead and receiving the fourth signal, and the fourth microcontroller strobes the fourth strobing light upon detecting activation of the fourth lead and receiving the third signal.

7. The system of claim 6, wherein the first and third microcontroller are communicatively coupled and the third strobing is made to strobe when the first strobing is made to strobe; and
   wherein the second and fourth microcontroller are communicatively coupled and the fourth strobing light is made to strobe when the second strobing light is made to strobe.

8. The system of claim 5, wherein the third and fourth strobing light modules replace existing front signal lights of the vehicle.

9. A system comprising:
   a first set of strobing light modules comprising at least left and right rear signal light replacement lights for a vehicle, each being electrically connected to existing vehicle wiring associated with the left and right rear signal lights of the vehicle, respectively;

wherein the first set of strobing light modules provides a left signal light or a right signal light when indicated by the existing vehicle wiring associated with the left and right rear signal lights of the vehicle, respectively; and wherein the first set of strobing light modules provides a strobing light at least at a left and right rear of the vehicle when the existing vehicle wiring associated with the left and right rear signal lights of the vehicle indicates a hazard flasher operation.

10. The system of claim 9, wherein the first set of strobing light modules comprises:
   a first left strobing light module electrically connected to the existing vehicle wiring associated with a left rear signal light of the vehicle; and
   a second right strobing light module electrically connected to the existing vehicle wiring associated with a right rear signal light of the vehicle.

11. The system of claim 9, wherein the first and second strobing light modules have a communicative coupling between them and are each indicated to strobe by having their associated existing vehicle wiring indicate a signal light and receiving indication on the communicative coupling that the other strobing light module has received signal indication on its associated connection to the vehicle wiring.

12. A method comprising:
   providing a first strobing light module having a first microcontroller operating a first light having strobing and flashing operation;
   providing a second strobing light module having a second microcontroller operating a light having strobing and flashing operation;
   connecting the first and second strobing light modules to existing vehicle wiring that operates left and right signal lights on the vehicle, respectively;
   providing a communicative coupling between the first and second microcontrollers;
   wherein the first and second microcontrollers each communicate to one other when activating their respective light having strobing and flashing operations;
   wherein the first microcontroller flashes its light having strobing and flashing operations if a signal light is indicated to be operated by the existing vehicle wiring and the second microcontroller is not activating its respective light having strobing and flashing operations;
   wherein the second microcontroller flashes its light having strobing and flashing operations if a signal light is indicated to be operated by the existing vehicle wiring and the first microcontroller is not activating it respective light having strobing and flashing operations;
   wherein the first microcontroller strobes its respective light having strobing and flashing operations if a signal light is indicated to be operated by the existing vehicle wiring and the second microcontroller is also activating its respective light having strobing and flashing operations; and
   wherein the second microcontroller strobes its respective light having strobing and flashing operations if a signal light indicated to be operated by the existing vehicle wiring and the first microcontroller is also activating its respective light having strobing and flashing operations.

13. The method of claim 12, further comprising connecting the first and second strobing light modules to existing vehicle wiring that operates front left and right signal lights on the vehicle, respectively.

14. The method of claim 12, further comprising connecting the first and second strobing light modules to existing vehicle wiring that operates rear left and right signal lights on the vehicle, respectively.

15. A kit comprising:
   a pair of strobing light modules comprising left and right signal light replacements for a vehicle, each configured for being electrically connected to existing vehicle wiring associated with the left or right signal lights of the vehicle;
   an electrical lead for communicatively coupling the pair of strobing light modules;
   wherein the pair of strobing light modules provides a left signal light or a right signal light when indicated by the existing vehicle wiring associated with the left and right rear signal lights of the vehicle, respectively; and
   wherein the first set of strobing light modules provides a strobing light when the existing vehicle wiring associated with the left and right rear signal lights of the vehicle indicates a hazard flasher operation.

16. A kit comprising:
   a left strobing light module comprising a microcontroller operating a light having strobing and flashing operation;
   a right strobing light module comprising a microcontroller operating a light having strobing and flashing operation;
   wherein the left and right strobing light modules are each configured for being electrically connected to existing vehicle wiring associated with the left and right signal lights of the vehicle, respectively;
   wherein the left strobing module provides a flashing light when only a left signal is indicated by the existing vehicle wiring;
   wherein the right strobing light module provides a flashing light when only a right signal is indicated by the existing vehicle wiring; and
   wherein the left and right strobing light modules both provide a strobing light when a hazard light is indicated by the existing vehicle wiring by indication of both left and right signals.

* * * * *